(12) United States Patent
Ramachandran

(10) Patent No.: US 8,313,020 B2
(45) Date of Patent: Nov. 20, 2012

(54) AUTOMATED BANKING MACHINE OPERATED RESPONSIVE TO DATA BEARING RECORDS

(75) Inventor: Natarajan Ramachandran, Uniontown, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 748 days.

(21) Appl. No.: 12/288,572

(22) Filed: Oct. 21, 2008

(65) Prior Publication Data

US 2009/0114716 A1 May 7, 2009

Related U.S. Application Data

(60) Provisional application No. 61/000,606, filed on Oct. 26, 2007.

(51) Int. Cl.
*G06Q 40/00* (2012.01)

(52) U.S. Cl. .................. 235/379; 235/380; 705/42
(58) Field of Classification Search .................. 235/379
See application file for complete search history.

(56) References Cited

U.S. PATENT DOCUMENTS

| | | | |
|---|---|---|---|
| 2004/0133516 A1* | 7/2004 | Buchanan et al. | 705/42 |
| 2005/0097046 A1* | 5/2005 | Singfield | 705/42 |
| 2006/0289630 A1* | 12/2006 | Updike et al. | 235/379 |

* cited by examiner

*Primary Examiner* — Thien M. Le
*Assistant Examiner* — Christopher Stanford
(74) *Attorney, Agent, or Firm* — Ralph E. Jocke; Daniel D. Wasil; Walker & Jocke

(57) ABSTRACT

An automated banking machine operates responsive to data bearing records such as user cards. The machine is operative to accept financial checks. The arrangement enables a card-based deposit at a deposit accepting machine to be carried out even when the deposit becomes jammed in the machine prior to transaction recordation.

19 Claims, 27 Drawing Sheets

FIG. 1
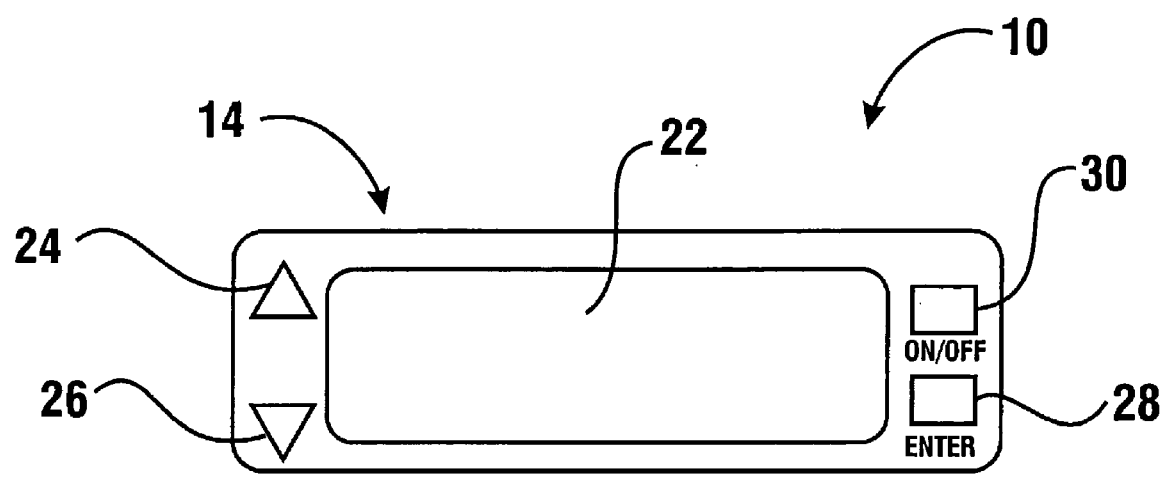
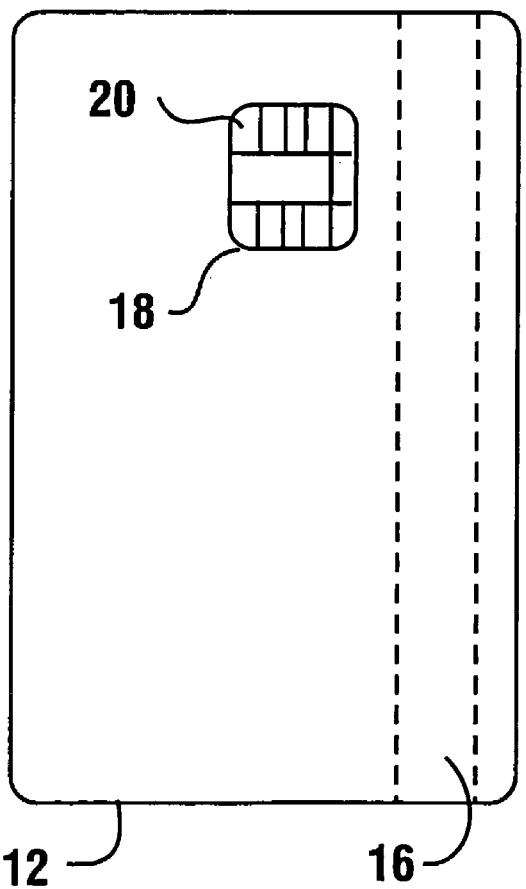

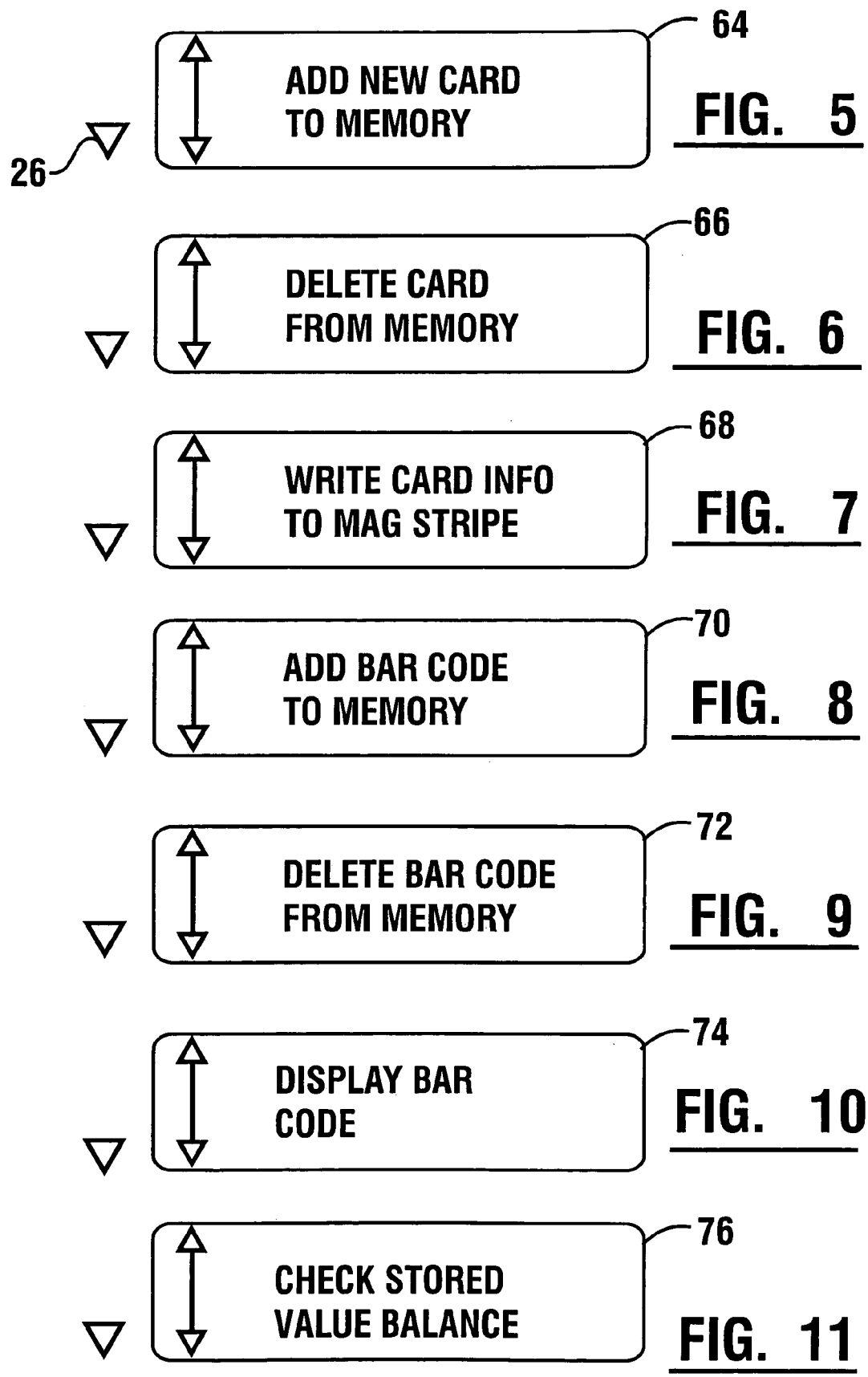

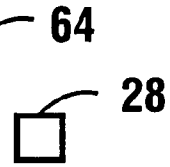
FIG. 15
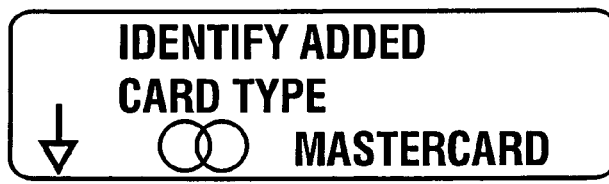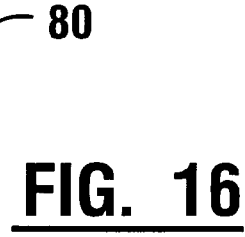
FIG. 16
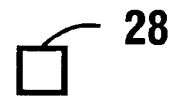
FIG. 17
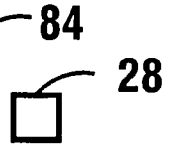
FIG. 18

FIG. 19
FIG. 20

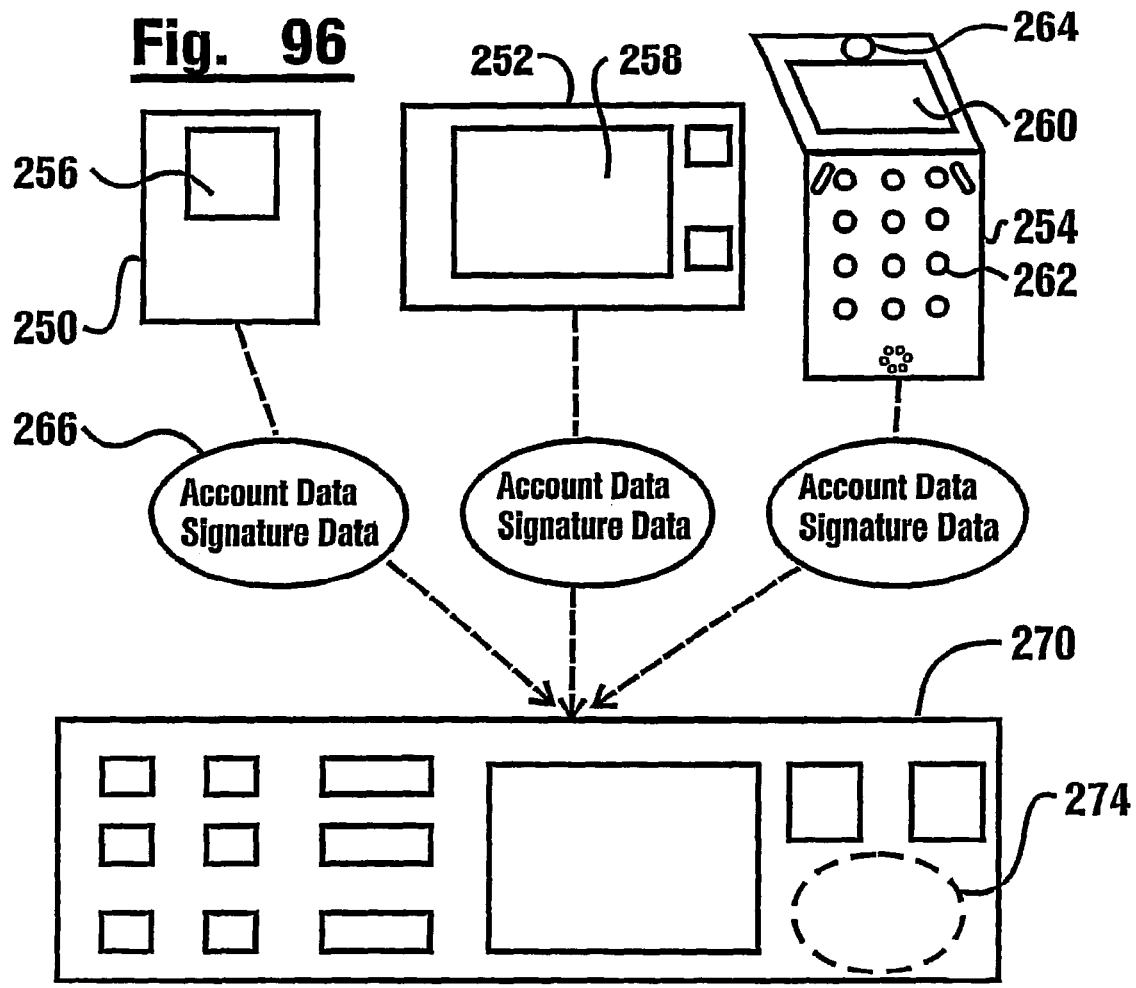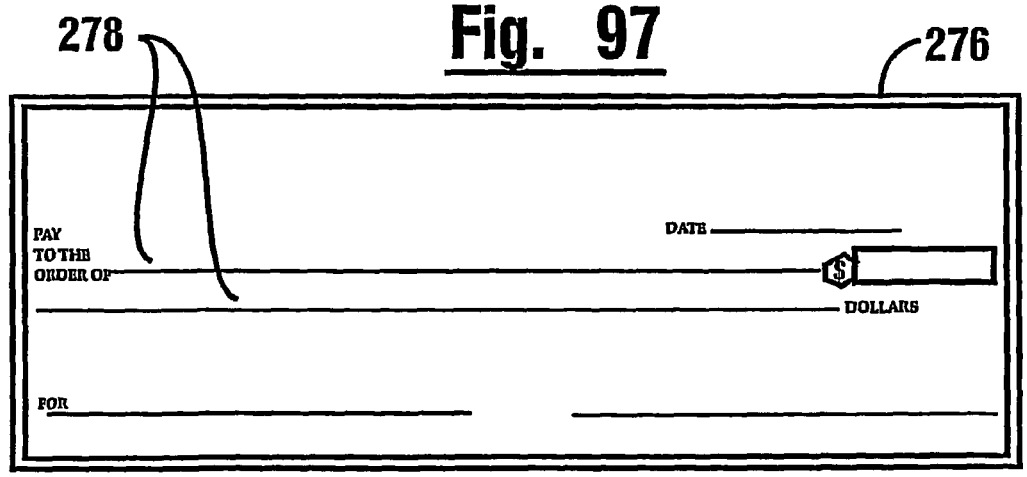

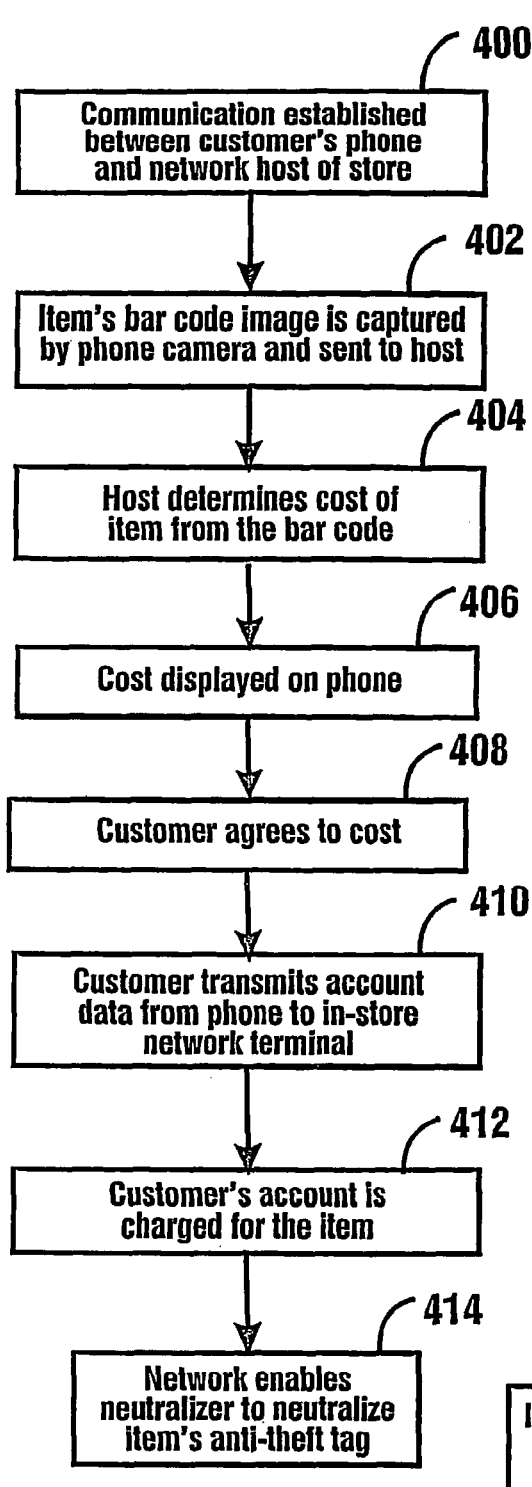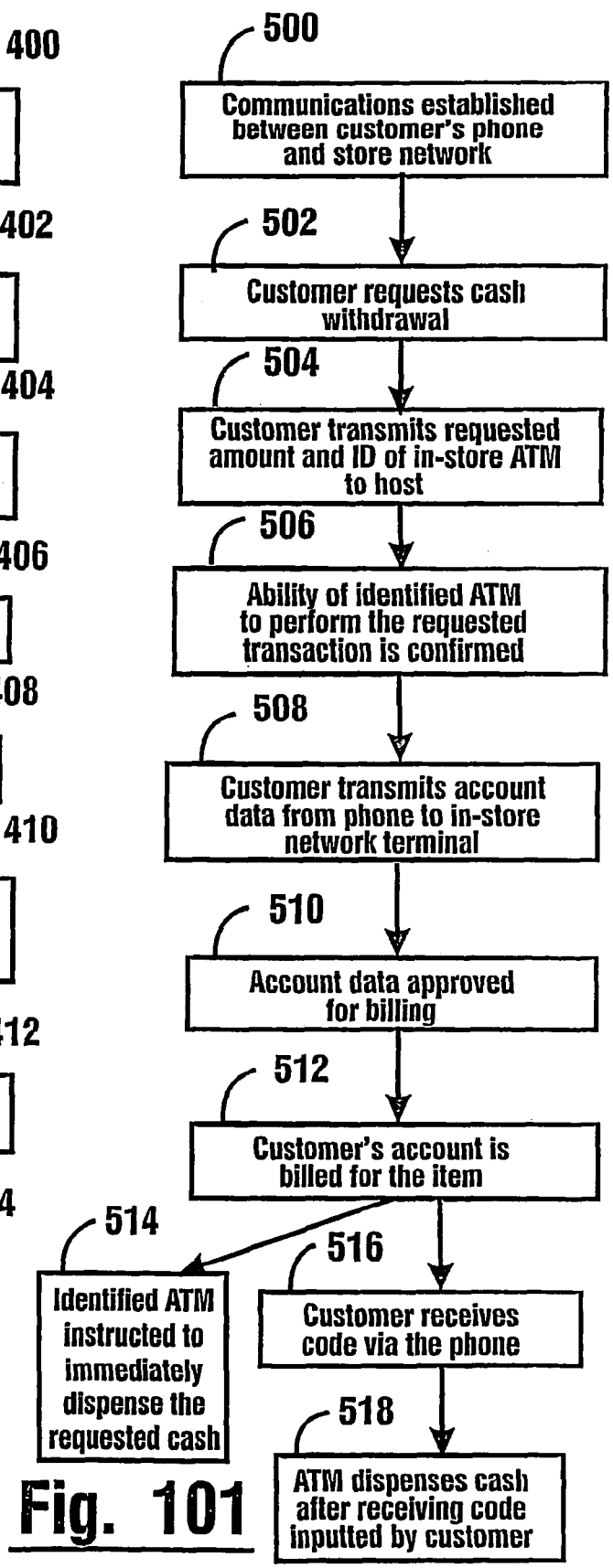
Fig. 100
Fig. 101

AUTOMATED BANKING MACHINE OPERATED RESPONSIVE TO DATA BEARING RECORDS

CROSS REFERENCE TO RELATED APPLICATIONS

This application claims benefit pursuant to 35 U.S.C. §119(e) of U.S. Provisional Application Ser. Nos. 61/000,616 filed Oct. 26, 2007. This application is also a continuation-in-part of U.S. Ser. No. 12/229,318 filed Aug. 21, 2008. Ser. No. 12/229,318 is a continuation-in-part of Ser. No. 11/198,163 filed Nov. 7, 2007. Ser. No. 11/198,163 is a divisional of Ser. No. 10/795,761 filed Mar. 8, 2004. Ser. No. 12/229,318 also claims benefit pursuant to 35 U.S.C. §119(e) of Provisional Application Ser. No. 60/966,053 filed Aug. 24, 2007.

The disclosures of these prior applications are incorporated herein by reference in their entirety.

TECHNICAL FIELD

This invention relates to automated banking machines that operate responsive to data read from data bearing records such as user cards, and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine. An automated teller machine reads customer cards and enables customers to carry out banking transactions. Banking transactions carried out using automated teller machines may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to automatically carry out transactions involving transfers of value.

Automated banking machines may benefit from improvements.

OBJECTS OF EXEMPLARY EMBODIMENTS

It is an object of exemplary embodiments to provide an automated banking machine that operates responsive to data read from data bearing records.

It is a further object of exemplary embodiments to provide a transaction apparatus which enables a user to use a single card which can be changed to conduct transactions using a plurality of the user's accounts.

It is a further object of exemplary embodiments to provide a transaction apparatus which can be used in lieu of a plurality of credit, debit, and other cards and objects.

It is a further object of exemplary embodiments to provide a transaction apparatus that is compact, portable, and lightweight.

It is a further object of exemplary embodiments to provide an apparatus and method for carrying out transactions using a portable hand-held device that enables a user thereof to remotely interact with a transaction device.

It is a further object of exemplary embodiments to enable a portable hand-held device to wirelessly transmit account information during a transaction.

It is a further object of exemplary embodiments to enable a portable hand-held device to wirelessly transmit account information to an electronic check generating system.

It is a further object of exemplary embodiments to enable a portable hand-held device to capture and transmit an image of a merchandise item identifier during the purchase of the item in a self-service checkout.

It is a further object of exemplary embodiments to enable a portable hand-held device to capture and transmit an image of an automated banking machine identifier during a self-service cash withdrawal transaction.

It is a further object of exemplary embodiments to enable a portable hand-held device to store electronic signature data in a memory thereof.

It is a further object of exemplary embodiments to enable a portable hand-held device to wirelessly transmit electronic signature data during a transaction.

It is a further object of exemplary embodiments to enable a portable hand-held device to capture, store, and transmit at least one image of a paper check.

It is a further object of exemplary embodiments to provide a check transaction system that can receive electronic check image data and/or electronic signature data sent from a portable hand-held device via wireless communication.

It is a further object of exemplary embodiments to enable a jammed check inside an automated transaction machine to be retrieved, and the initial transaction request involving the check to be carried out via use of check image data captured with a portable hand-held device.

Further objects of exemplary embodiments will be made apparent in the following Detailed Description of Exemplary Embodiments and the appended claims.

Some of the foregoing objects are accomplished in exemplary embodiments by an apparatus which includes a card which is of a type which includes a magnetic stripe supported thereon. The magnetic stripe may be of a conventional configuration and capable of having magnetic indicia recorded or written thereon. The card also includes a programmable memory which is supported on the card. The programmable memory preferably includes data representative of a plurality of accounts which the user has, such as various credit card accounts, debit card accounts and other accounts.

The exemplary apparatus further includes a portable terminal. The portable terminal is readily portable. The portable terminal is releasably engageable with the card and includes a memory reading device which is operative to read the account data from the memory on the card. The portable terminal also includes an input device which enables the user to select data from the card memory corresponding to any one of the plurality of the user's accounts. The exemplary portable terminal further includes a magnetic writing device which enables the user to write magnetic indicia corresponding to a selected account in the programmable memory to the magnetic stripe on the card. This enables the user to use the card in place of the dedicated credit card for that particular account. The exemplary portable terminal further includes a magnetic stripe erasing device which enables the user to erase the indicia from the magnetic stripe so that the user may subsequently write data corresponding to a different account to the magnetic stripe when desired.

The exemplary card memory may further include data representative of a stored amount. This amount represents a monetary value which the user may use as a cash substitute. The exemplary portable terminal device includes a communications device which enables the user to make the transfers between the accounts for which data is held in memory and the monetary amount stored on the card. In addition the monetary amount stored on the card may be transferred using stationary terminals such as ATMs and point of sale terminals which have stored value card capabilities.

The card memory may further include data representative of visual indicia which are found on a plurality of cards or other objects associated with the user. The visible indicia may include for example, bar code indicia representative of a user's account with a group health plan. Alternatively such visible indicia may include bar code or other indicia associated with a student I.D., employee access card, driver's license, or other types of objects. The visible indicia may also include a reproduction of the user's signature or other identifying characteristics. The portable terminal may include a display upon which the stored visible indicia may be reproduced in response to inputs to an input device. This enables visible indicia to be read with a machine from the display, which serves as a substitute for scanning off the card or object which the user is no longer required to carry. The card memory may also include data representative of icons or other graphics as well as data representative of instructions which are used by a processor in the portable terminal for carrying out transactions.

In some embodiments the portable terminal may further include object reading devices such as a magnetic stripe reader and/or a bar code scanner. Such devices are used to read magnetic indicia from the original credit and debit cards and to transfer such information, which may be stored in the programmable memory of the card used in connection with the invention. Similarly the object reader in the form of a scanner may read the visible indicia such as a bar code from an object so that such indicia may be stored in the memory on the card. The input device of the exemplary terminal is used to input designators which are stored in correlated relation with the data which corresponds to the various types of magnetic stripes and bar codes. The memory on the card may further include data representative of an access code as well as instructions to minimize the risk that an unauthorized user may gain access to the data stored in memory. Alternatively, the card memory may further include data uniquely associated with the user such as fingerprint data or other biometric data. The exemplary terminal may include a reader for reading such data to assure that the user is the person authorized to use the card.

Other exemplary embodiments may be used in connection with check accepting transactions. Exemplary embodiments may be used to transfer image and transaction data related to checks.

BRIEF DESCRIPTION OF DRAWINGS

FIG. 1 shows a top plan view of an exemplary form of a transaction apparatus including a multifunction card and a portable terminal.

FIGS. 5-14 show views of exemplary function selection screens through which a user may select functions to be executed using the transaction apparatus.

FIGS. 15-24 show examples of screens displayed on the portable terminal and associated with the logic flow for adding a new card type to the programmable memory on the multifunction card.

FIG. 96 shows an electronic check-generating arrangement.

FIG. 97 shows an example of an electronic check format prior to adding entries.

FIG. 100 shows steps included in an exemplary self-service checkout during an item purchase.

FIG. 101 shows steps included in an exemplary cash withdrawal transaction.

DETAILED DESCRIPTION OF EXEMPLARY EMBODIMENTS

Figure 2:
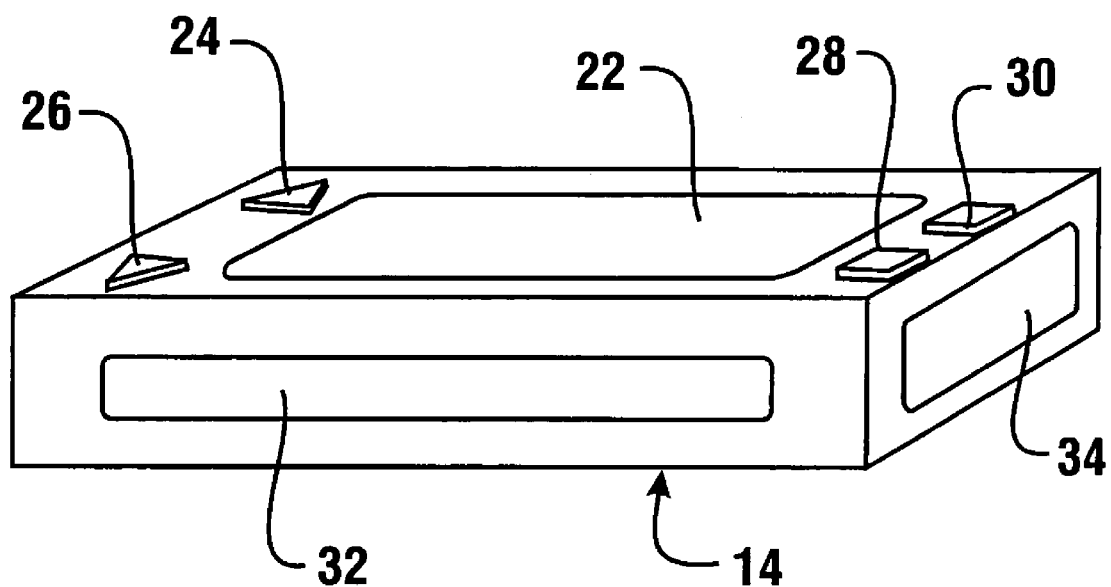
FIG. 2 shows an isometric view of the portable terminal of the type shown in FIG. 1.

Referring now to the drawings and particularly to FIG. 1 there is shown therein a transaction apparatus of one exemplary embodiment generally indicated 10. The apparatus includes a multifunction card 12 and a portable terminal 14. The exemplary portable terminal and multifunction card are releasably engageable in a manner later discussed to enable carrying out a plurality of functions and transactions.

The multifunction card 12 may have the dimensional configuration of conventional credit and debit cards. It includes a magnetic stripe 16 on a rear face thereof. The magnetic stripe is capable of holding magnetic indicia similar to the magnetic stripes on conventional debit, credit and similar cards. Like the stripes on such cards, magnetic stripe 16 is also preferably capable of having the magnetic indicia thereon erased with an erase head or similar device, and having new indicia recorded or written thereon.

Multifunction card 12 further includes a programmable memory 18 supported thereon. Programmable memory 18 includes a plurality of electrical or other contacts 20 which are accessible on the front of the card. In the exemplary embodiment the card and programmable memory are a type and configuration such as is commercially available from a number of suppliers including Diebold, Incorporated, the Assignee of the present invention. The contacts 20 and the magnetic stripe 16 are positioned in predetermined locations on the card to enable the card to be used with a variety of devices. Of course in other embodiments nonconventional orientations and configurations of the magnetic stripe and the programmable memory contacts may be used.

As later explained, multifunction card 12 is designed to be used as a substitute for a plurality of varied types of credit, debit and other cards. However in some embodiments, card 12 may include information on the face or rear thereof so as to identify the particular user to whom the card belongs, an issuer of the card, as well as other data. In some embodiments, the front side of the card may include raised numbers and letters corresponding to a particular credit card account and from which an impression may be made onto a carbon or carbonless form. For example information on the face of the card may correspond to a user's MasterCard®, VISA®, American Express®, Discovery®, Novus®, Diner's Club® or other card. This enables the exemplary multifunction card to be used as the user's regular credit card when purchasing goods or services in establishments that do manual processing of credit card transactions. Of course while in the embodiment discussed, conventional credit card indicia may be included on the front of the multifunction card, in other embodiments special indicia may be presented on the card.

Portable terminal 14 includes a display 22 on the front face thereof. In one exemplary embodiment display 22 is an LCD type display or other suitable display that may be used for displaying words, graphics and other visible indicia in a manner later explained. Portable terminal 14 further includes at least one input device that may be used to input information by a user. In the embodiment shown, the input device includes a manual input device which consists of a plurality of buttons. These buttons include a scroll up button 24 and a scroll down button 26. These scroll up and scroll down buttons 24, 26 which may be referred to hereafter as "up button" and "down button" respectively, are pressed by a user to selectively display items on the display.

The input device of the terminal further includes an enter button 28. The enter button is used in a manner later explained to initiate execution of a function corresponding to the information displayed on display 22. Terminal 14 further includes an on/off button 30. Button 30 is preferably used in the manner later explained to initiate a transaction or to signify completion of a transaction and to turn the terminal off. It should be understood that the input device comprising manual input buttons 24, 26, 28 and 30 are exemplary only and that other embodiments may incorporate other arrangements of manual and other types of input devices.

As shown in FIG. 2 portable terminal 14 further includes a slot 32. Slot 32 extends through the body of the terminal and is sized to enable multifunction card 12 to be passed therethrough. An exemplary embodiment of the portable terminal includes an external object reading device 34 positioned on the exterior of the terminal body. In one embodiment the external object reading device may include a bar code reader which enables reading bar code off of cards and other objects so that information corresponding to such visible indicia may be read and stored in the memory of the multifunction card.

Figure 4:
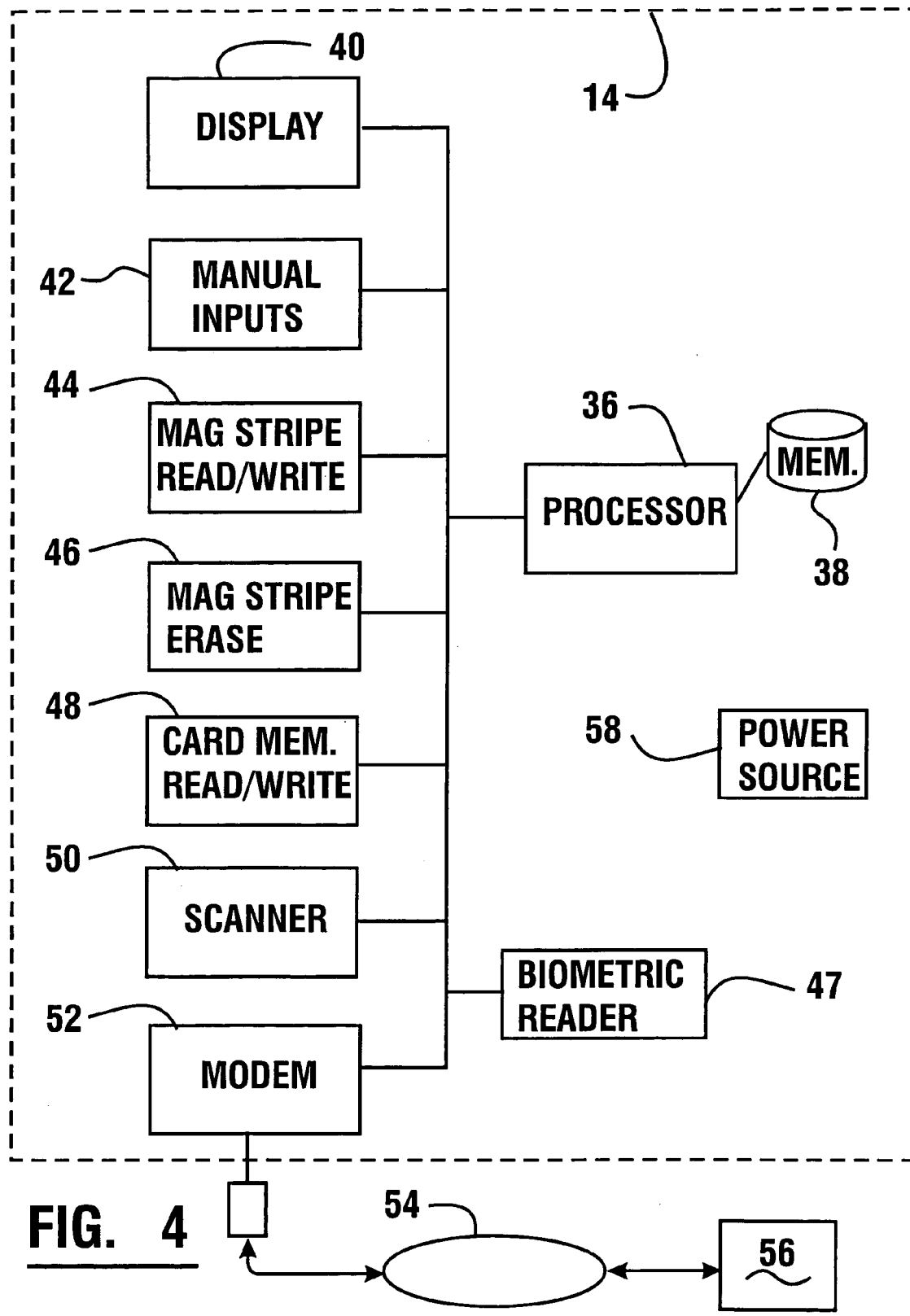
FIG. 4 shows a schematic view of the components of the portable terminal as well as a system through which the portable terminal communicates.
Figure 12:
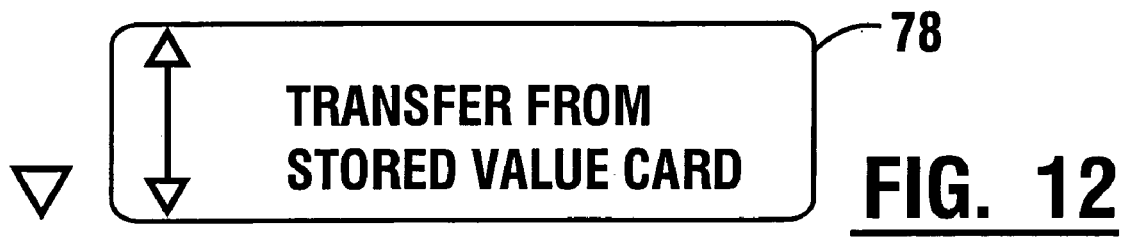

The components which comprise an exemplary embodiment of the portable terminal 14 are schematically indicated in FIG. 4. Terminal 14 includes at least one onboard processor 36 which is in operative connection with the other components of the portable terminal. Processor 36 is also in connection with at least one data store or memory 38. Memory 38 may be a volatile or nonvolatile memory which is capable of holding and recovering data which is received from or delivered to the processor 36.

Processor 36 is in operative connection with other components within the portable terminal 14. These components are represented schematically in FIG. 4 and are indicative of hardware and software components operatively connected with the processor. These components include the display component 40. Display component 40 includes display 22 as well as the other hardware and software devices which enable the display to provide visual outputs in response to processor 36. A manual input component 42 corresponds to a manual input device which in the described exemplary embodiment of the terminal includes buttons 24, 26, 28 and 30. Component 42 includes the hardware and software which enables communicating the inputs from the user through the buttons to the processor so that the processor may carry out the functions of the portable terminal in response thereto.

Portable terminal 14 further includes a magnetic stripe read and write component 44. In the exemplary embodiment this component includes magnetic heads which are selectively operated to read magnetic indicia from the stripe of a card as well as to write magnetic indicia thereto. It should be understood while component 44 shows these functions as combined, it actually represents two separate functions. These are the functions of reading magnetic indicia from a card and writing magnetic indicia to a card stripe. These functions may be separate in other embodiments. Component 44 includes the necessary hardware and software interfaces to the processor 36 to carry out these functions in a manner later discussed. A magnetic stripe erase component 46 is further indicated schematically as part of the portable terminal FIG. 4. This magnetic stripe erase component includes an erase head or other comparable device as well as the hardware and software devices that may be used to selectively erase or otherwise clear magnetic indicia from the magnetic stripe of the multifunction card. In some embodiments the magnetic stripe erase component may be combined with the components which function to read and write indicia to the magnetic stripe of cards. In the exemplary embodiment the heads, which operate to read, write and erase magnetic stripe indicia from credit cards are positioned in the interior of terminal 14 and adjacent to slot 32. This enables the reading, writing and erasing functions to be carried out as a card is passed manually therethrough. It should be understood however that in other embodiments other methods may be provided for reading, writing and erasing magnetic stripe data. Further, in some embodiments the card may alternatively or additionally include a wireless output device such as a programmable radio frequency identification (RFID) output device.

As shown in FIG. 4 portable terminal 14 further includes a card memory read/write component 48. Component 48 serves to read and write data to the programmable memory 18 on multifunction card 12. In the embodiment shown, the memory reading and writing functions are combined. However it should be understood that these are separate functions and may be carried out through separate arrangements of hardware and software. Component 48 also includes electrical contacts which are positioned adjacent to slot 32 in the portable terminal. These electrical contacts are configured to engage the contacts 20 which enable communication with the programmable memory 18 of the multifunction card 12. Component 48 further includes the hardware and software devices required to read data from and write data into the programmable memory on the card.

Portable terminal 14 in the embodiment shown includes a scanner component 50. Scanner component 50 includes bar code scanner 34 or similar device for reading visible indicia from an object. Component 50 further includes the hardware and software devices necessary to communicate with processor 36 and the other components of the portable terminal. It should be understood that while the embodiment of the portable terminal shown includes object reading devices for reading magnetic stripe indicia, visual indicia and indicia stored in the programmable memory of cards, other embodiments may include other types of object reading devices. Likewise other types of object writing devices may be included depending on the particular uses made of the portable terminal.

For example in some embodiments scanner 50 may be a scanner suitable for scanning and reading written indicia. This may include the signature of an authorized user. Data representative of such a signature may be input and produced with the scanning device and stored in the programmable memory of the card. The signature may then be reproduced on the display or transmitted to a remote location for purposes of identifying the authorized user or the authenticity of a transaction.

It should be understood that data representative of a signature can also include an electronic signature, such as a digital signature or a digital certificate that is associated with the user and serves to identify the user. The stored electronic signature can be used as a legally binding signature. Thus, a memory of a hand-held device can include electronic signature data representative of a legally binding user-identifying (written) signature.

Alternative embodiments may include a biometric reader component 47. The biometric reader component may include hardware and software components that can be used to sense a characteristic of a user which uniquely identifies the person as an authorized user. In some embodiments the biometric reader component 47 may include a fingerprint reading device. Alternatively, the reader may include an audio input device which can be used to identify a user by voice. Alternatively, visual readers for identifying unique visible features, or a combination of identifying features of the user may be used. The programmable memory of the card may include data representative of the identifying biometric features of the authorized user or users. This stored data is used to enable authorized users of the card to operate the terminal with the card while others are prevented from such operation.

Terminal 14 in the embodiment shown includes a communications component 52. Communications component 52 may include a modem or other communications devices that are selectively operative under the control of the processor to communicate with other systems and devices located outside and preferably remote from the portable terminal. In some embodiments the communications component 52 may include a connector for communicating through a network 54 to a computer or similar device at a remote location, schematically indicated 56. A connection to the remote location may be selectively made based on an address which is used by the communications component 52 to selectively communicate to the desired remote location.

In one exemplary embodiment the communications component includes a wireless type modem. In such an embodiment network 54 includes a cellular phone network which enables communicating to a transaction network. This is done through computers located at one or more remote addresses which are accessed via a phone number which serves as the address. Alternatively communications component 52 may communicate through a conventional telephone access port which includes a telephone connector on the body of the portable terminal. In other embodiments the communications network 54 may include communications intranets or public networks such as the internet, which selectively enable communication by the portable terminal to selected nodes in the network. In such environments the addresses to which the portable terminal communicates are the addresses of the network nodes which may properly receive transaction messages.

As shown in FIG. 4 the portable terminal includes a power source schematically indicated 58. Power source 58 may include any suitable source of power for the components in the portable terminal. Suitable power sources may include rechargeable or nonrechargeable batteries or connectors to external power sources such as the cigarette lighter of a vehicle. The power source 58 may further include a renewable energy source, such as a solar panel 60 which may be used to provide energy from the sun or other available light source.

Figure 3:
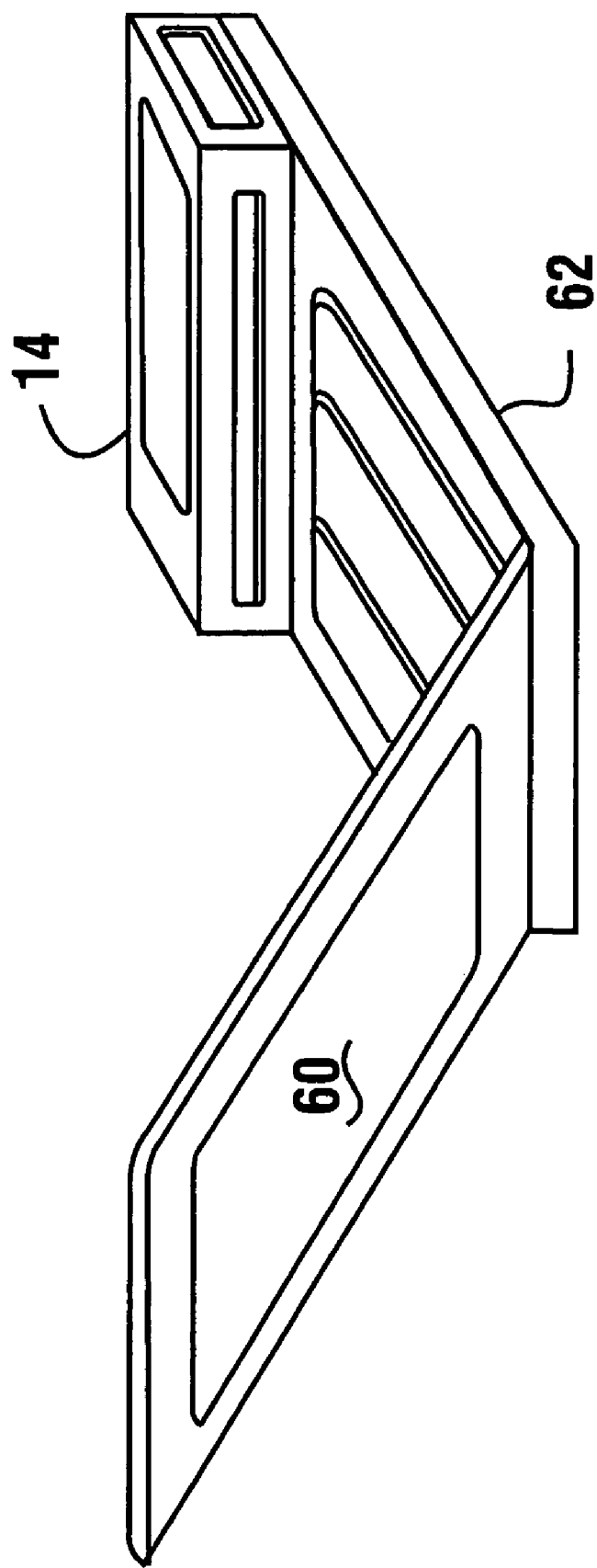
FIG. 3 shows an isometric view of the portable terminal shown in FIG. 2 in combination with a wallet structure.

As shown in FIG. 3 portable terminal 14 may be integrated into a carrier 62 which may take the form of a wallet such as that shown in FIG. 3. Alternatively the carrier may be of a type which performs other functions such as those of a purse, personal digital assistant (PDA), notebook computer, keyfob, pager, mobile phone (e.g., cellular phone, satellite phone, wireless VOIP, etc.) or other component carried by a user.

As demonstrated by the carrier 62 shown in FIG. 3, the portable terminal 14 may be integrated into a wallet type device which includes spaces for holding the multifunction card as well as other credit cards and identification cards. The carrier may further include spaces for holding cash, keys and other items in a manner of a conventional wallet. Similarly the carrier 62 may include a supporting surface for the solar panel 60 as well as other features and components which may be desired by a user. The small size and portability of the terminal 14 of the exemplary embodiment enables it to be integrated into any one of a plurality of carrier type devices while still enabling such devices to carry out their traditional and/or nontraditional functions.

In an exemplary embodiment, the portable terminal 14 operates to perform a plurality of functions. These functions are carried out based on instructions which may be included in whole or in part in the programmable memory 18 of the multifunction card 12. The processor 36 of the portable terminal 14 carries out instruction steps in response to the inputs provided by the user of the card and portable terminal. In exemplary embodiments, the memory 38 in connection with the portable terminal may also include certain programmed instructions which are permanently stored therein so as to facilitate certain operations of the terminal. The programmable memory on the card may also include the data representative of accounts, indicia, access codes, monetary values, graphics, location data and other information which is used in the operation of the apparatus.

In one exemplary embodiment the functions which are enabled to be executed include adding a new card to the memory. This is accomplished by reading information off of a magnetic stripe of an existing dedicated card with the portable terminal and storing it in the programmable memory of the multifunction card. This information can be recovered later and the magnetic indicia written on the magnetic stripe of the multifunction card.

Another function executed in an exemplary embodiment is to selectively delete card data from the memory on the card. This could be done for example when a user no longer desires to use the multifunction card as a substitute for the dedicated card.

Another function or an exemplary embodiment is to write the indicia stored in the memory of the magnetic stripe card onto the magnetic stripe of the multifunction card or perhaps another magnetic stripe card.

Another function which is carried out in an exemplary embodiment is to add visual indicia such as a bar code to the memory of the multifunction card. Likewise, another function is to delete a bar code or other visual indicia stored in the card memory. A further function is to display one of the selected visual indicia such as a bar code or a user's signature which is stored in card memory.

Other functions of embodiments may be to carry out financial transactions without the need to use a stationary terminal. Such functions include checking the cash equivalent value stored in the memory of the multifunction card. Another transaction is to transfer value stored in the memory of the multifunction card to another account. The transfer of funds from an account to the programmable memory on the multifunction card so that it can be used as a cash equivalent therefrom is a further transaction which may be carried out by embodiments.

Figure 95:

The various functions which the described embodiments of the transaction apparatus may carry out and the logic associated therewith are now explained with reference to FIGS. 5-95 which disclose transaction steps carried out by a user in executing the various functions. In the embodiment described, the programmable memory 18 on the card includes data representative of prompt messages. When the multifunction card 12 is extended in the terminal so that the contacts 20 thereon can be read by the connectors of the card memory read/write component 48, the stored instructions which include the prompt messages and the associated logic may be read. The processor 36 then operates the display component 40 to selectively display prompt messages on the display 22 of the terminal 14.

In an exemplary embodiment, security measures are provided to assure that only a proper authorized user is enabled to operate the system. This may be accomplished by requiring a user to input an access code which is known only to them before the terminal functions may be accessed. This access code may be programmed in the programmable memory 18 using a separate terminal device. Alternatively provisions may be made for executing a software program which enables the user to select their access code the first time that the multifunction card is used in connection with the portable terminal. This program may be stored in the memory of the terminal or on the card. In alternative embodiments the card holds biometric data related to authorized users. The biometric data of a user is input through the biometric reader 47. For example, when the reader 47 includes a fingerprint reader a user may place a predetermined finger adjacent to the reader. If the input data corresponds to an authorized user, the terminal may be operated. In some embodiments the user may scan a single fingerprint to gain access. The particular finger selected may be one chosen by and known only to the user. In other embodiments a plurality of fingerprints from one or both hands, may need to be read in a selected order. This may increase the security level.

One form of the logic flow associated with assuring that an authorized user uses the apparatus is demonstrated with reference to FIGS. 89-95. In initiating the operation of the terminal the user is first required to place the multifunction card 12 in the slot 32 of the portable terminal 14. The card is preferably inserted into the slot in a manner which enables the electrical connectors associated with component 48 to engage the contacts 20 on the card. The slot corresponds closely to the width of the card and serves as a guide for positioning the card as it is passed therethrough. A spring loaded finger or other releasable stop may be positioned adjacent the slot to stop the card at the proper depth inside the terminal to engage the contacts. The user preferably knows how to insert the card into the slot in order to achieve this connection based on experience. Alternatively, instructions printed on the face of the card and/or the terminal may instruct the user in how to insert the card. The memory 38 in the terminal 14 may also include data representative of prompts which are displayed on the screen 22 which instruct a user on how to properly insert the multifunction card.

Figure 89:
FIGS. 89-95 show screens displayed on the portable terminal and associated with the logic flow for assuring that a user is authorized to use the terminal.
Figure 90:
Figure 91:

For purposes of this example, the sign on process for a user preferably begins with the display screen 100 shown in FIG. 89. Screen 100 is a blank screen which indicates that the terminal is off. When the user presses the on/off button 30, a screen 102 as shown in FIG. 90 is displayed. Screen 102 preferably includes a prompt which instructs the user to enter their access code.

Figure 92:
Figure 93:

The entry of the user's personal access code is demonstrated in FIG. 91-94. In entering the access code of the embodiment shown, the user starts with a screen 104 shown in FIG. 91. Screen 104 includes seven spaces in which the user may input alphabetical or numerical characters which make up the access code. Pressing the up button 24 when screen 104 is displayed begins a scrolling process in the first space for input of the access code. This causes the screen to change the first space from a blank space to the letter "a." This is shown in FIG. 92 and is represented by a screen 106. Pressing the up button 24 again (or continuing to hold it) changes the first character to the letter "b" as indicated by a screen 108 in FIG. 93. The user may move to subsequent letters by holding or repeatedly pushing the up button, thus scrolling through the alphabet and/or numerical values until the desired first character of the access code is displayed in the first space. Of course the user may scroll backwards by pushing the down button. In this example the letter "b" is the first character of the user's access code and the user indicates that fact by pressing the enter button 28 as schematically indicated in FIG. 93.

After the first character is entered, the user selects the second character of the access code in a similar manner. This is again done by selectively pressing the up and down buttons 24 and 26 until the desired alphabetical or numerical character is displayed in the second space. Once the desired character is displayed in the second space the user presses the enter button 28 to move to the next character. This is represented by screen 110 in FIG. 94. In the embodiment shown the user may enter up to seven characters as the access code. However in the exemplary embodiment the user may not require seven characters and may simply choose to leave certain characters as blanks. In the embodiment shown the user's access code is the five letter word "broom" and the two final characters are simply left blank. After the user indicates this by pressing the enter button 28 to leave blanks for the last two characters, a screen 112 shown in FIG. 95 is displayed.

In screen 112 the user is given the option of either changing their access code or proceeding to a main menu. The user may select the option of changing their access code by pressing the up button 24. This will lead the user through a series of prompt screens to enter a new access code. This series of prompt screens may lead the user through appropriate steps in accordance with the instructions stored in the memory on the card or in the terminal so as to enter a new code. In alternative embodiments a biometric identifier may be used as an access code. In such a system the user would be prompted through the display 40 to input identifying biometric data to the biometric reader 47. For example, if the biometric reader is a fingerprint reader, the user may be prompted to bring a finger that they have preselected adjacent to the reader. The reader 47 would read the fingerprint and produce suitable signals to compare the input data to the data stored on the card. If the input data corresponds to an authorized user, the user is authorized to further operate the terminal. The user may be given the option to change the biometric data, such as to add data for another authorized user, or to change the finger used for providing fingerprint data in the accessing process or to use a sequence of fingerprints to obtain access.

Alternative embodiments may use other processes and criteria to access the card data. Once the user has properly gained access they may be given the option of changing the access code or other sign on procedures. For purposes of this example however the user chooses the option of displaying a main menu which is selected by pressing the down button 26 as indicated schematically in FIG. 95.

The prompt messages in FIGS. 5-13 represent a main menu showing the various transactions that can be conducted with the apparatus. FIG. 5 shows a screen 64 which includes a prompt which queries a user as to whether they wish to add a new card to the memory on the multifunction card. In the embodiment shown the fact that additional options are available by scrolling up or scrolling down are indicated by a dual pointed arrow adjacent to the text displayed. By pressing the down button 26 as indicated schematically, the user may move to screen 66 shown in FIG. 6. This screen indicates the availability of the selection of the transaction to delete a card from memory. Pressing the down button again causes the display of the terminal to provide the screen 68 shown in FIG. 7. This screen provides a prompt corresponding to the transaction in which data stored in the programmable memory of the multifunction card is written to a magnetic stripe.

Scrolling with the down button 26 from screen 68 causes screen 70 in FIG. 8 to be displayed. Screen 70 includes a prompt corresponding to a transaction in which bar code is added to the programmable memory of the multifunction card. FIG. 9 discloses a screen 72 which may be displayed by scrolling with the down button from screen 70. Screen 72 corresponds to deleting a bar code from the memory on the multifunction card. Screen 74 shown in FIG. 10 includes a prompt to the user which enables selection of a transaction in which bar codes stored in the memory may be displayed.

Figure 13:

FIG. 11 shows a screen 76 which includes a prompt which corresponds to a transaction in which a user may check the cash value represented by data stored on the programmable memory of the card. Such data corresponds to a cash value which enables the multifunction card to be used in a manner identical to cash. From FIG. 11 a user may scroll to a screen 78 shown in FIG. 12 which prompts the user to select an available transaction in which value may be transferred from the stored value on the multifunction card. FIG. 13 shows a screen 80 with a prompt which enables the user to select a transaction in which value will be transferred onto the memory of the multifunction card.

Figure 14:
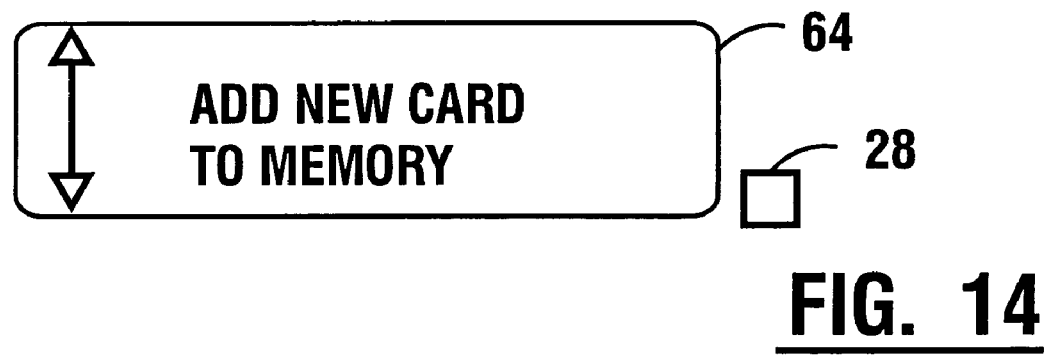

In the exemplary embodiment the prompts in the screens of the main menu enable scrolling back to prior screens either by pushing the up or down buttons. As shown in FIG. 13 by pressing the down button from screen 80 the user causes the first screen 64 to again be displayed. Of course the user can move up and down by pressing buttons 26 and 24 which enables them to select any of the transactions available in the main menu. For purposes of a first example if a user wishes to add a new card to memory they can manually depress the enter button 28 of the input device as represented schematically in FIG. 14. Pressing the enter button 28 from screen 64 causes the processor 36 to begin executing the instructions stored in the programmable memory of the card and/or memory 38 of the terminal to add a new card into the memory.

This routine begins as schematically indicated in FIG. 15 with screen 64. FIG. 15 is identical to FIG. 14, the screen being repeated herein for the sake of clarity. In response to a user pressing the enter button 28 a screen 80 of the type shown in FIG. 16 is presented. This screen includes a screen prompt which prompts the user to identify the type of card to be added. The memory on the multifunction card or the terminal preferably includes data representative of icons of major card types. These may include for example the icons representative of the logos for MasterCard®D, VISA®, American Express®, Novus®, Discovery® and/or other common card types which a user is likely to want to enter. In screen 80 a MasterCard® logo is displayed by way of example, with an arrow indicating that other selections are available by pressing the down button 26.

By pressing the down button from screen 80, screen 82 shown in FIG. 17 is displayed. This prompt screen includes the VISA® designator and logo, and allows the user to indicate that the card they are about to add is a VISA® card. The arrows adjacent to the VISA® logo displayed on the screen pointing both up and down indicates that the user may press the up or down buttons to display other card types. For purposes of this example it will be assumed that the card that the user wishes to add to the memory is a VISA® card. To indicate this, the user presses the enter button 28 as indicated in FIG. 17.

In the operation of the described embodiment the user is now requested to input a card identifier to distinguish the particular type of VISA® card which they are about to add to memory. This is done through a screen 84 which prompts a user to input a plurality of alphabetical or numerical characters which serve as a designator to identify the particular card. As shown in FIG. 18 the interface described enables a user to select letters of the alphabet to identify this particular type of card. For example by pressing and holding the up and down buttons the user is enabled to scroll through letters of the alphabet until they find the first letter of the designator they wish to input. When the letter is displayed, they can enter that as the first letter of the designator by pressing the enter button 28. They can then move on to the next letter of the designator selecting it with the up and down buttons. When a space is desired to be entered the user can leave the blank space which is preferably included as the initial option. In the case of screen 84 the designator is BP_VISA which may be a designator for a VISA® card provided by British Petroleum. Once the user has entered their desired designator any leftover spaces may be simply left blank by repeatedly pushing the enter button 28. After all the spaces are filled the input of the designator is complete.

Screen 86 shown in FIG. 19 indicates the input of an alternative designator. In this screen the designator input is "KEY_BANK_ATM." This may indicate for example that the card which is being input is the debit card which corresponds to the user's account at Key Bank. It should be understood that the particular designator used is purely in the discretion of the user and the user is free to use highly descriptive terminology or a secret code which is known only to them to identify their various cards. In the exemplary embodiment sufficient security is provided for accessing the memory on the multifunction card that the user is enabled to use descriptive terminology as a designator if they wish to do so.

Figure 21:
Figure 22:

Once the designator has been input, the instructions read from the memory on the card or in the terminal causes a screen 88 shown in FIG. 20 to be displayed on the display 22. Screen 88 includes a prompt message to remove the stored value card from engagement with the portable terminal 14. Once the terminal senses that the stored value card has been removed by the disengagement of the contacts thereon with the portable terminal, a screen 90 as shown in FIG. 21 is displayed. Screen 90 includes a prompt for the user to pass their original BP_VISA card through the portable terminal. As shown in the exemplary embodiment the display further visually instructs the user on how to pass the original card through the terminal so that it is properly read by the magnetic stripe reading device. In response to the screen 90 a user preferably passes their original card through the slot 32 in the portable terminal. On sensing the proper reading of the magnetic stripe on the card, screen 92 shown in FIG. 22 is displayed. Screen 92 indicates to the user that the stripe has been properly read and that they should now reinsert the multifunction card face up.

It should be understood that the stored instructions may include provisions for a time out routine. In the event that the user fails to proceed to the next step at any point in the transaction, the time out returns the terminal to the main menu or to an off condition. Such a time out routine or failure routine may be accompanied by appropriate user prompts to advise the user why the terminal has proceeded to shut itself off or return to the main menu.

Figure 23:
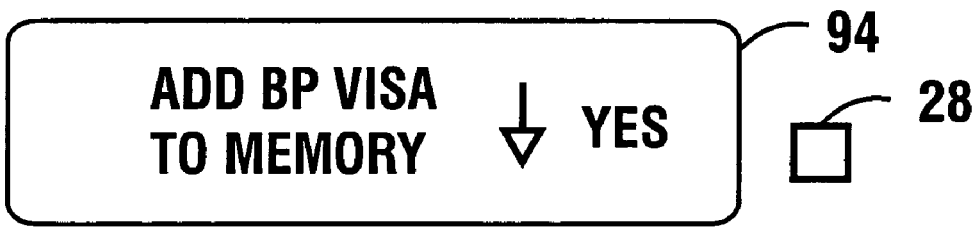
Figure 24:
Figure 94:
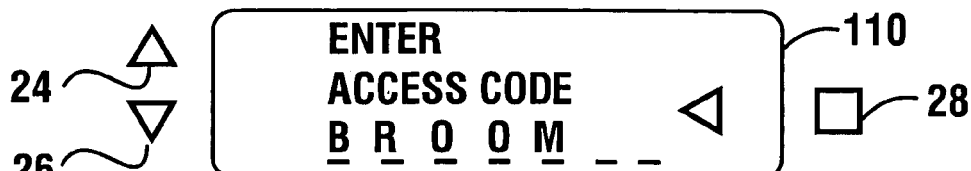

If from screen 92 the user reinserts the multifunction card into the slot 32, the logic flow next moves to display a screen 94 shown in FIG. 23. Screen 94 prompts the user as to whether they wish to add the BP_VISA card to the memory of the multifunction card. As shown in FIG. 94 the screen includes the default response which is "yes" with an arrow adjacent thereto which indicates to the user that they may change to other than the default response by pressing the down button 26. In this example the user wishes to add the card to the memory of the multifunction card, in which case the enter button 28 is pressed while screen 94 is displayed. This results in screen 96 shown in FIG. 24 being displayed, which indicates that the function has been carried out successfully. The user may press button 30 once to turn the terminal off or twice to return to the main menu.

Figure 25:
FIGS. 25-31 show a series of screens displayed on the programmable terminal and associated with the logic flow for deleting a card from the programmable memory on the multifunction card.

The logic associated with deleting information concerning a card from the memory of the multifunction card is now demonstrated with reference to FIGS. 25-31. This process begins with a screen 98. Screen 98 corresponds to screen 66 shown in FIG. 6 of the main menu. To choose this operation the user presses the enter button 28 as schematically indicated in FIG. 25. This causes the screen 114 shown in FIG. 26 to be displayed.

Figure 26:
Figure 27:
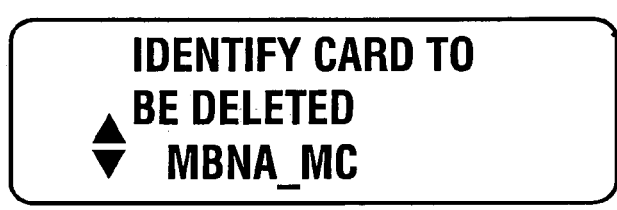

Screen 114 prompts a user to select which of the cards that are stored in the programmable memory on the card is to be deleted. The cards are referenced through displayed the designators which have been previously input by the user. Screen 114 displays the first one of these cards which has the designator "KEY_BANK_ATM." The arrows next to the designator indicate that the user may select other cards by pressing the up or down button. As shown in FIG. 26 the user presses the down button 26 which causes the display to move to a screen 116 shown in FIG. 27. Screen 116 displays the next card designator which is "MBNA_MC" which the user has previously input to designate an MBNA MasterCard. Assuming that the user wishes to select this card as the card to be deleted, they press the enter button 28 as schematically indicated in FIG. 27. Pressing the enter button from screen 116 causes a confirmation screen 118 shown in FIG. 28 to be displayed. This screen prompts the user to confirm that they want to delete that card. An arrow displayed next to the default option which is "yes" advises a user that they can change to another option by pressing the down button.

Figure 28:
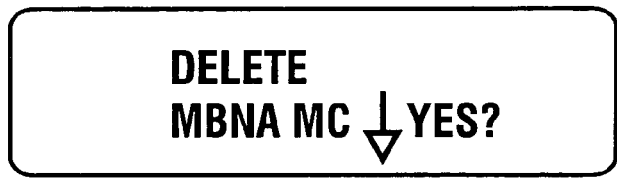
Figure 29:

In screen 118 shown in FIG. 28 if the user presses the enter button 28 as schematically indicated therein the terminal next displays screen 120 shown in FIG. 29 in which the terminal outputs an indication that the card has been deleted.

Figure 30:
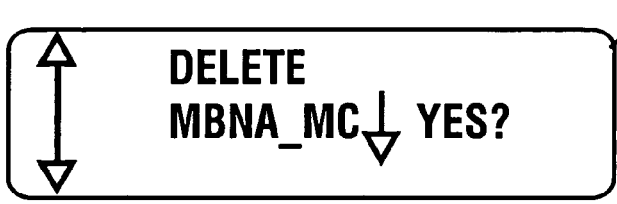
Figure 31:
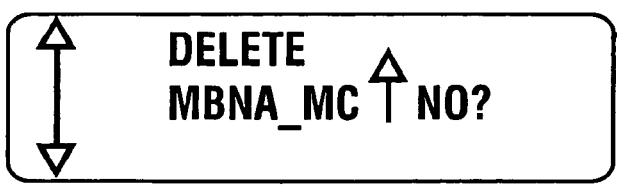
Figure 32:
FIGS. 32-42 show screens displayed on the portable terminal and associated with the logic flow for writing selected card information to the magnetic stripe of the multifunction card.
Figure 33:

Alternatively if from screen 118 shown in FIG. 28 the user presses the down button 26 as schematically indicated in FIG. 30, a screen 122 shown in FIG. 21 as displayed. Screen 122 shows that the selected card will not be deleted and pressing the enter button 28 from this screen will return the terminal to the main menu. Alternatively, pressing the up button 24 in the screen 122 returns to the screen 118. It can be appreciated that the stored programmed instructions enable a user to correct errors that are made in the course of operating the input devices on the terminal.

The execution of the steps which enable the exemplary apparatus to configure the multifunction card so it may be used as a substitute for any one of a plurality of original magnetic stripe credit or debit cards, is now explained with reference to FIGS. 32-42. The logic executed to carry out this function begins with a screen 124. Screen 124 is identical to screen 68 of the main menu. As shown schematically with reference to FIG. 32, pressing the enter button 28 from screen 124 causes a screen 126 shown in FIG. 33 to be displayed. Screen 126 includes a prompt requesting that the user identify the card in the memory whose identifying indicia is to be transferred to the magnetic stripe of the multifunction card. The user is enabled to scroll through the designators for the cards stored in memory by pushing the buttons 24 and 26.

Figure 34:
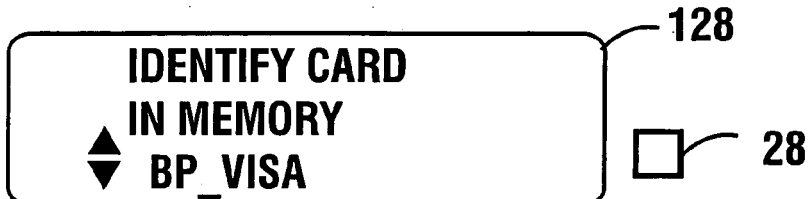

As indicated by a screen 128 in FIG. 34, the user selects the card data stored in correlated relation with the designator "BP_VISA" in the memory of the multifunction card by scrolling with the buttons until this designator is displayed and then pressing the enter button 28.

In response to the selection of the particular card in memory the indicia corresponding to the magnetic indicia on the "BP_VISA" card which has been stored in the memory of the multifunction card is transferred to the memory 38 of the terminal. Similarly the instructions which the processor will need to execute to complete the steps of writing the magnetic indicia onto the multifunction card are transferred temporarily into the memory of the terminal so that the steps may be completed with the memory of the multifunction card disengaged from the terminal.

Figure 35:
Figure 36:

Once the necessary information has been loaded into the memory of the terminal a screen 130 shown in FIG. 35 is displayed. Screen 130 includes a prompt instructing the user to remove the multifunction card from engagement with the portable terminal. Upon sensing the disengagement of the multifunction card the screen 132 shown in FIG. 36 is presented by the portable terminal. Screen 132 includes a prompt for the user to pass the stored value card through slot 32 in the terminal. The prompt preferably includes instructions on the orientation of the card and the magnetic stripe. This is done so that any indicia that has been previously been recorded on the magnetic stripe of the multifunction card is erased.

Figure 37:

In response to screen 132 the user preferably passes the multifunction card through the portable terminal such that the magnetic stripe passes through an area of the slot in connection with an erase head which clears the magnetic stripe. Upon sensing that the card has been passed through the terminal, a screen 134 shown in FIG. 37 is displayed by the portable terminal. The sensing can be done with the spring loaded finger in the slot or with another suitable stripe or card sensing device in the slot.

Figure 38:

The portable terminal then further operates under control of the processor and the instructions stored in its memory 38 to display the screen 136 shown in FIG. 38. Screen 136 includes a prompt which includes an instruction for the user to now pass the multifunction card through the slot 32 in a different orientation so that the magnetic indicia corresponding to the selected BP_VISA card may be written to the magnetic stripe of the multifunction card. It should be noted that in the embodiment shown, the orientation of the card for erasing the stripe and for writing indicia to the stripe are different. This is done because a different head is used for erasing as opposed to reading and writing. In alternative embodiments a single head may perform both the erasing and writing functions or alternatively multiple heads may be aligned in the slot so that the card is passed in the same manner to carry out both the erasing, reading and writing functions.

Figure 39:

The exemplary embodiment includes appropriate sensors and instructions so that if the multifunction card is inserted wrong, the screen such as screen 138 shown in FIG. 39 is displayed. This may be done based on the sensing finger sensing the card but the magnetic head not sensing the stripe which indicates an improper card orientation, or in other ways. This screen is displayed so that if the user begins to insert the card improperly they are prompted to make a correction. Removal of the card may return the terminal to the screen 136 or may abort the instruction sequence such as by displaying the screen 140 shown in FIG. 42.

Figure 40:
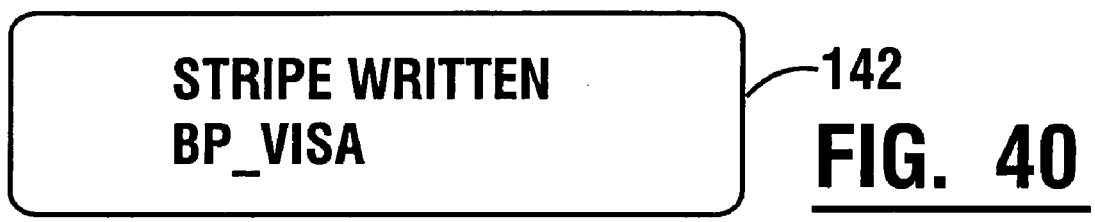
Figure 41:

If however the card has been passed through the portable terminal properly a screen 142 shown in FIG. 40 is presented. This screen indicates that the indicia corresponding to the magnetic indicia on the original BP_VISA card has been written to the magnetic stripe on the multifunction card. From screen 142 the terminal then moves to display a screen 144 shown in FIG. 41 indicating that the transaction is complete and the user may turn off the portable terminal by pressing the on/off button 30.

Figure 42:
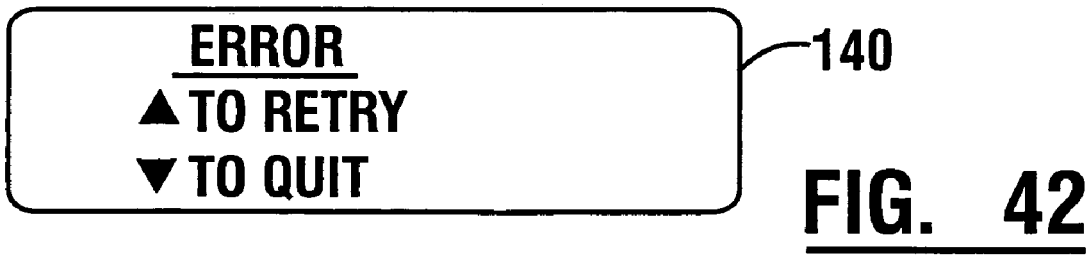

If for any reason an error has been sensed in carrying out the transaction, a screen 140 shown in FIG. 42 preferably appears. The user may then select either the option to retry the transaction to write the material to the card by pressing the up arrow, or may quit by pressing the down arrow which will return the terminal to the main menu. Alternatively, in an exemplary embodiment, pressing the on/off button 30 from screen 140 is also a suitable way to end the transaction.

Assuming that the selected card data has been written to the magnetic stripe on the multifunction card 12, the user may now take the multifunction card and present it to any standard transaction terminal which accepts that type of magnetic stripe card. For example if a user wishes to charge goods or services to their BP_VISA account, they may present that card to a merchant who passes the stripe through a point of sale terminal, electronic cash register or other appropriate terminal. This will result in the user's BP_VISA account being charged for those goods or services. Similarly if a user wishes to get cash out of an ATM and charge it to their BP_VISA account they may present the multifunction card to an ATM. The ATM may be operated in the usual manner as one would operate it using the original BP_VISA card.

The multifunction card may be configured to include the user's signature in a space on a face of the card. This would enable a merchant accepting the card to compare a user's signature on a transaction receipt to the signature on the card. Alternatively, or in addition, a reproduction of the user's signature may be stored in the memory on the card. The user could display a reproduction of their signature on the screen of the terminal so that a merchant could verify the signature. Alternatively, user identifying electronic signature data may be transmitted through a communications device such as modem or infrared transmitter, or otherwise read from the terminal into the merchant's system, so that the merchant may store the electronic signature data from the terminal with the transaction data.

In alternative methods of operation the merchant may use an electronic signature capture system for transaction receipts. In such a system the merchant's computer system may include software to compare the signals generated by the user's actual signature on an electronic signature pad to the signature data stored on the card. Such comparisons would provide an indication where the signature data does not correspond to a sufficient degree, which may suggest that the user of the card is not the authorized user.

After completing a transaction the user may choose to leave the magnetic stripe data for the selected card on the stripe. Alternatively the user may choose to change the magnetic stripe to a different card. For example if the multifunction card has embossed data on the front corresponding to one particular card, the user may choose to return the magnetic stripe indicia to correspond with the indicia embossed on the front of the card. Alternatively the user may choose to completely erase the magnetic stripe data as may be done by returning the multifunction card to the terminal and repeating the steps associated with writing card data to the magnetic stripe up through the point in the steps where the magnetic indicia is erased from the magnetic stripe. The user may then exit the routine by pressing the on/off button leaving the card with a blank stripe. In embodiments where no information is embossed on the front of the multifunction card users may find this advantageous as the multifunction card is of absolutely no value as a credit or debit card unless the access code has been appropriately entered.

Exemplary embodiments may also be used to selectively record and display visible indicia such as a bar code. These functions are graphically represented and the logic flow associated therewith explained with reference to FIGS. 43-61.

Figure 43:
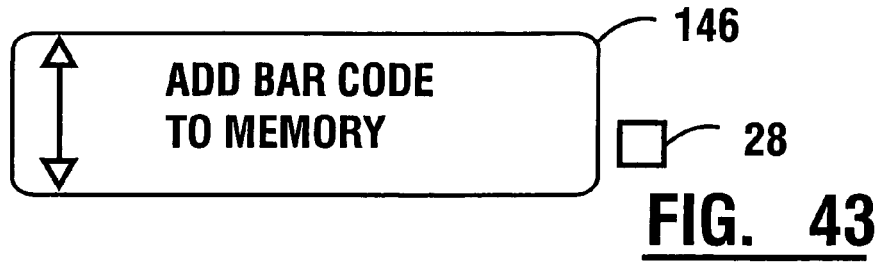
FIGS. 43-52 show screens displayed on the portable terminal and associated with the logic flow for adding a bar code to the programmable memory on the multifunction card.
Figure 44:
Figure 45:
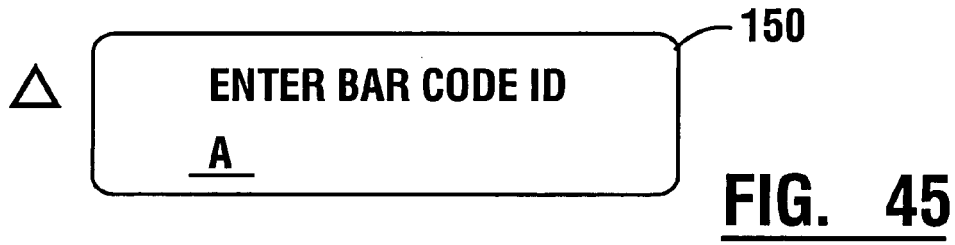
Figure 46:
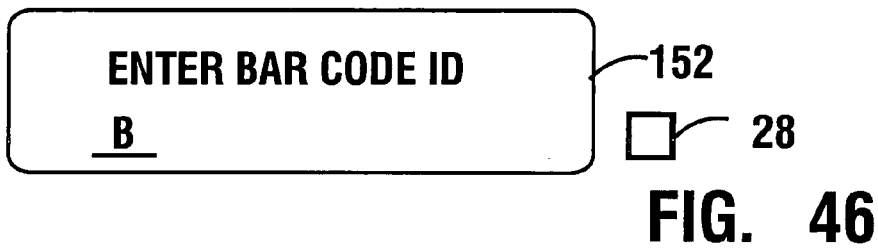

FIG. 43 shows a screen 146. Screen 146 is identical to screen 70 shown in FIG. 8 of the main menu. To select this function a user presses the enter button 28 from the main menu as schematically indicated in FIG. 43. From screen 146 a screen 148 is presented as shown in FIG. 44. Screen 148 prompts a user to enter a bar code ID or designator corresponding to a bar code that is to be read from an object. This is done in a manner similar to the entry of designators for credit or debit cards or entry of the access code. The user scrolls through alphabetical and numerical characters by pressing the up and down buttons 24 and 26 as represented by screens 150 and 152 shown in FIGS. 45 and 46 respectively, until a desired character is displayed in a desired position. When the desired character is reached, the enter button 28 is pressed at which point the user moves on to the next character.

Figure 47:
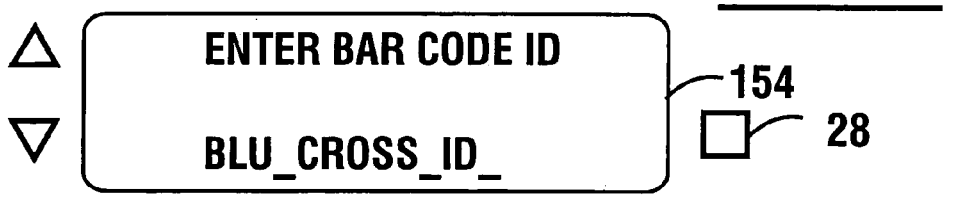

For purposes of this example it will be assumed that the user is going to scan a bar code off of a medical benefits identification card which the user has chosen to designate "BLU_CROSS ID." This is represented in FIG. 47 by a screen 154. The user indicates that they have completed the designator by pressing the enter button 28 a sufficient number of times to null any remaining spaces in the available spaces entry for characters.

Figure 48:
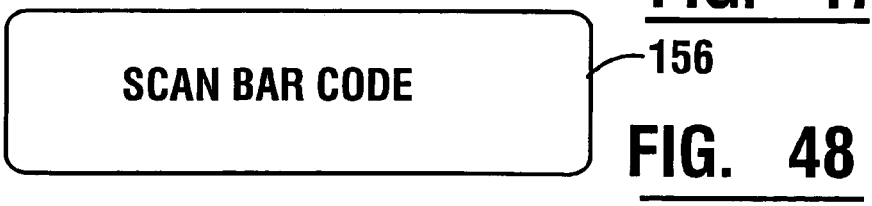
Figure 49:

Once the terminal is advised that the entire ID has been entered, the logic flow operates to display the prompt shown in screen 156 and FIG. 48. This prompt instructs a user to scan the bar code off the object such as their Blue Cross® identification card. The process also operates to initiate operation of the scanner component 50. The user then brings their identification card in proximity to the scanning device 34 on the housing of the portable terminal and the processor operates in response to the stored instructions to capture the bar code data on the card. When the bar code data has been captured, the screen 158 shown in FIG. 49 is displayed. As previously discussed, if the bar code cannot be read or is not read in a sufficient time, the instructions may include provisions for returning the terminal to screen 146 or providing a screen such as screen 160 shown in FIG. 52 in which the user is given the option to either quit or retry scanning the bar code.

Figure 50:
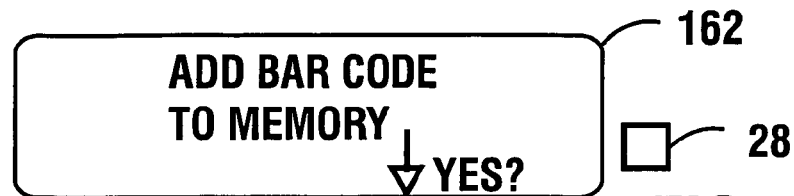
Figure 51:
Figure 52:

Assuming that the bar code is properly read as indicated by screen 158, the terminal then displays screen 162 shown in FIG. 50 which prompts a user as to whether they wish to add this bar code to the memory on the multifunction card. As is the case with prior prompts the default value is "yes", but the user is enabled to change the default to a "no" by pressing button 26. For purposes of this example it will be assumed that the user wishes to add the bar code for their medical identification card to the memory which they do by pressing button 28 in response to screen 162. In response to the user pressing the enter button the screen 164 shown in FIG. 51 is displayed. The user can now turn the terminal off by pressing button 30.

It should be understood that while the type of visual indicia added to the memory on the multifunction card in the foregoing example is bar code associated with a medical plan, other types of bar code may be added. For example the multifunction card may be used to store data representative of bar code associated with a driver's license, student identification card, employee access card, library card or any other type of bar code. In addition the system may be configured to read and store other types of visual indicia which are capable of being read, stored and reproduced.

Figure 53:
FIGS. 53-56 show screens displayed by the programmable terminal and associated with the logic flow for displaying a bar code corresponding to information stored on the programmable memory of the multifunction card.

When a user desires to use the terminal to display one of the bar codes or other indicia stored in memory, they may do so from a screen 166 shown in FIG. 53. Screen 166 is identical to screen 74 in the main menu. To proceed with the display of a selected bar code the user presses the enter button 28 as schematically indicated.

Figure 54:

In response to the user selecting the display bar code routine from the main menu, the terminal proceeds to display a screen 168 shown in FIG. 54. Screen 168 asks the user to identify the bar code that they wish to display. The user is enabled to select designators for the various bar codes stored in the memory of the multifunction card. This is done using the up and down buttons on the terminal device.

Figure 55:
Figure 56:
Figure 57:
FIGS. 57-61 show screens displayed on the portable terminal and associated with the logic flow for deleting a bar code from the programmable memory on the multifunction card.
Figure 58:

Assuming for purposes of this example that the user wishes to display their medical plan ID, the designators for the various stored bar code indicia are scrolled through by pressing the buttons until the medical plan ID designator is displayed, which is represented by a screen 170 in FIG. 55. In response to pressing the enter button 28 the processor is operative to retrieve the data corresponding to the bar code in the memory and to display a reproduction of the bar code on the terminal. This is represented by a screen 172 in FIG. 56. The displayed reproduction of the bar code may be scanned from the display 22 of the portable terminal using the scanner or similar bar code reading device which is schematically represented by a scanner 174 in FIG. 56. Thus the user may identify themselves to a medical provider as a participant in their medical plan and the user may input their identifying information in the conventional manner using the same scanner that is used for scanning a regular identification card. When the scanning process is finished, the user can discontinue the display of the bar code by pressing on/off button 30.

The bar codes which have previously been stored in the memory associated with the multifunction card may also be selectively erased therefrom. This may be done for example when a user's regular card is replaced such that a new bar code or other visual indicia is associated therewith. Alternatively a user may simply wish to discontinue the use of a particular card. This may happen for example with regard to a library card which a user had been using in a city where they previously resided. Once the user moves they no longer use that library. Likewise a user may delete their driver's license data when they move to another state and obtain a new license.

Figure 59:
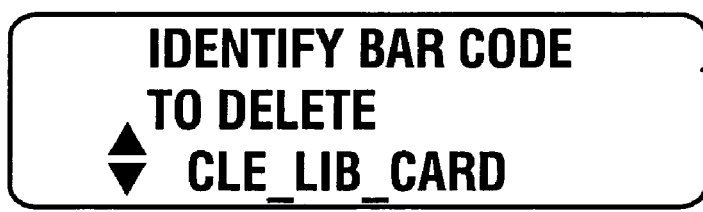
Figure 60:
Figure 61:

The deletion of a bar code from the memory is represented by the logic flow associated with FIGS. 57-61. The screen 176 corresponds with the screen 72 in the main menu, and includes a prompt which enables a user to select the logic which operates to delete a bar code from the memory. The user selects this transaction by pressing the enter button 28. A screen 178 is then displayed which asks a user to identify the bar code they wish to delete from the memory. The user selects the bar code by pressing the up and down buttons 24 and 26. As shown in FIG. 59 the user selects a card which has the associated designator "CLE_LIB_CARD" stored in association therewith in the memory of the multifunction card. This is represented by a screen 180. Pressing the enter button 30 with the bar code designator displayed causes a screen 182 shown in FIG. 60 to be displayed. Screen 182 queries the user as to whether they in fact wish to delete that particular bar code. The user is enabled to change from the default setting by pressing the down button. As schematically represented in FIG. 60, assuming the user wishes to delete that particular bar code from memory they press the enter button 28. This causes a screen 184 shown in FIG. 61 to be displayed on the portable terminal. This screen includes the prompt message to indicate that the bar code has been deleted. The user may then exit the routine by pressing the on/off button 30.

It should be understood that while the described embodiment operates to store and to reproduce visible indicia corresponding to bar code, other embodiments may produce other forms of indicia. This may include visual indicia that is intended to be read by machines for identification purposes as well as indicia intended to be read by the human eye. Any form of indicia which can be read, stored in the memory of the multifunction card and/or displayed on the portable terminal is intended to be encompassed by the present invention. As previously discussed, a user's signature is a further example of visual indicia that may be stored and selectively reproduced. Such indicia may also be transmitted by the terminal to a remote system and used to verify the authenticity of a transaction or for other purposes.

The exemplary embodiment also operates as a stored value card system and transaction apparatus which operates to store value equivalent to a cash value in the memory of the multifunction card, as well as to transfer value between the card and various accounts. The programmable memory 18 on the multifunction card 12 may include therein any one of a number of different public or proprietary schemes for storing information representative of cash value. This value storage method may be compatible with other terminals which may read the memory and transfer data representative of value to or from the memory, while also operating to transfer funds between accounts of the user and providers of goods, services or cash.

It should be understood that the multifunction card of exemplary embodiments may store value in one or several forms of proprietary schemes. For example the card may have cash value stored and associated with a Mondex® scheme. It may have a different cash value stored and associated with a VISA® CASH scheme. The card may also store data representative of cash values in any one of several other schemes. Although the present embodiment will be described with respect to a card in which value representative of cash is stored thereon with respect to a single scheme, it should be understood that multiple schemes may be used. Further in the following description in which amounts may be transferred between accounts of the user, it is within the capability of exemplary embodiments to transfer amounts between one stored value proprietary scheme stored in the programmable memory of the card to another proprietary scheme stored within the card. Such transfers may be made in a manner similar to transfers between accounts which are carried out by the terminal as described hereafter, although it should be understood that in such situations additional steps are carried out by the processor in the portable terminal so as to decrement and increment the various stored value amounts stored in the memory of the card.

To facilitate accounting for such transactions it will also be desirable for a portable terminal to connect to various remote locations which provide gateways to electronic transaction systems and networks which assure that funds are properly accounted for. For example, communication will be carried out with various remote systems to assure that indications are provided that a user has transferred cash value on their card from one stored value card scheme to another.

Figure 62:
FIGS. 62 and 63 show screens displayed on the portable terminal and associated with the logic flow for checking the stored cash value represented by the data stored in the programmable memory on the multifunction card.
Figure 63:
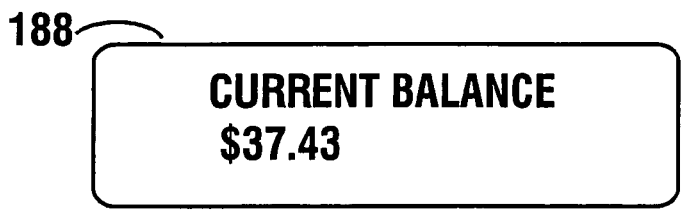

One of the common functions that a user will execute in connection with the exemplary apparatus is to check the stored value representative of cash that is stored on the programmable memory of the multifunction card. This is represented by the logic flow described with reference to FIGS. 62 and 63. FIG. 62 shows a screen 186. Screen 186 corresponds to screen 76 of the main menu. Screen 186 prompts a user as to whether they wish to check the stored value balance on their multifunction card. To do so the user presses the enter button 28. In response to the user selecting this item from the main menu the memory of the card is read and processor 36 causes a screen 188 shown in FIG. 63 to be displayed on the portable terminal. This screen indicates to the user the current cash value stored on the card. If the multifunction card includes stored value schemes for several different programs, intermediate screens may be provided to prompt the user to select one of the several stored value schemes which are employed on the card. As shown in FIG. 63 when a user has finished displaying the stored value amount they may exit by pressing the on/off button 30.

Figure 64:
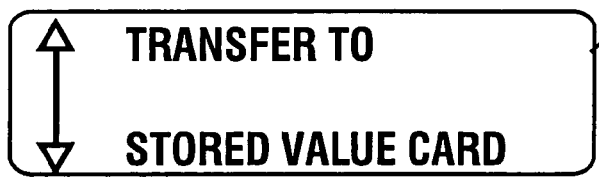
FIGS. 64-74 show screens displayed on the portable terminal and associated with the logic flow for transferring cash value to the programmable memory on the multifunction card.
Figure 65:

The transfer of funds to the memory of the stored value card is represented by FIGS. 64-74. FIG. 64 shows a screen 190. Screen 190 corresponds to screen 80 in FIG. 13 of the main menu. A user selects the transaction which includes a transfer of value to their stored value card (which is the multifunction card) by pressing the enter button 28 when screen 190 is displayed.

To transfer value representative of cash value onto the memory of the multifunction card, a source of the money to be transferred is identified. This is done by the processor operating in response to the instructions stored on the card to display a screen 192 shown in FIG. 65. Screen 192 prompts a user to identify the source of the money to be added into the memory of the card. The user is enabled to select the source by pressing the up and down buttons which causes the various sources of available funds to be selected. Such sources may include money stored in stored value schemes on the memory of the card itself. In the case of screen 192 if the user indicates that they want the source of funds to be their BP_VISA card, this is indicated by pressing the enter button 28 when this card designator is displayed.

Figure 66:
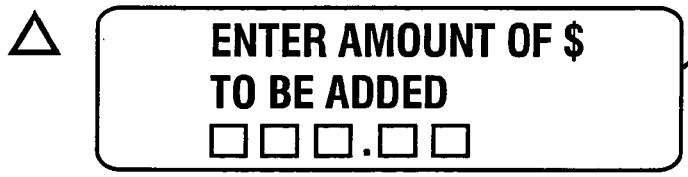
Figure 67:
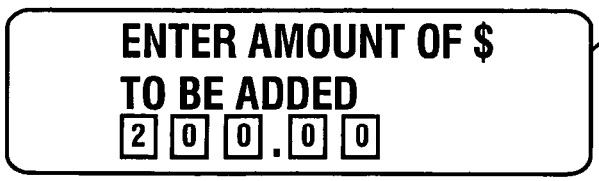
Figure 68:
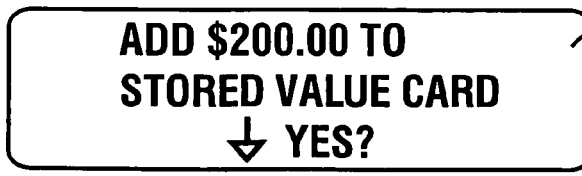

After the source of the funds is designated, a screen 194 shown in FIG. 66 is displayed. This screen prompts the user to enter the amount of money to be added to the card. This is done by the user entering a numerical amount in a manner similar to the way that access codes and designators have been previously entered. However in the exemplary embodiment only numerals may be entered in this step. The user enters the numerical values by scrolling to the particular numerical value desired and then hitting the enter button 28. This causes the program logic to move to the next value. After all the value characters have been entered as represented by screen 196 in FIG. 67 the user is prompted through a screen 198 shown in FIG. 68 as to whether they want to add the amount input to their stored value card. As shown in screen 198 the default value is "yes" however the user may change this to "no" by pressing the down button. For purposes of this example it will be assumed that the user wishes to add that amount and so indicates by pressing the enter button 28.

In response to the user indicating that they wish to add this amount to the data representative of value in the memory of the multifunction card, the processor operates in response to instructions stored on the card memory to contact the remote location appropriate to obtain funds from the user's BP_VISA account, and to indicate that the amount has been transferred onto the user's stored value card. In one embodiment this is accomplished by the processor causing the communications component 52 to dial up the remote location. This is done using the address appropriate for making the connection which is preferably stored in memory on the card. In this case the address may be a telephone number. In alternative forms the address which the communications component uses to contact the appropriate location may be a node or TCP/IP address in a computer system such as a private intranet or public system such as the internet. The particular approach depends on the nature of the system in which the portable terminal 14 is intended to operate.

Figure 69:
Figure 70:

The portable terminal exchanges messages with the remote location and the computer system therein, which operates to charge the user's account for the funds which are to be transferred as cash value onto the stored value card. Alternatively the terminal may communicate to a number of locations to indicate both the charge to the user's account as well as to track accounting entries, so that it is recorded that the user now has such funds available in their particular stored value scheme. Various transaction messages are transferred between one or more remote locations and the portable terminal so as to accomplish the transfer of funds. These messages may be in an ISO 8583 format or appropriate variants thereof, or other proprietary message formats of suitable types, so as to accomplish the transfer of funds and a record thereof. In one exemplary embodiment, while the remote terminal is connecting to the address a screen 200 shown in FIG. 69 is presented on the display of the remote terminal. As the remote terminal exchanges messages with the remote locations to transfer the funds after the connection has been made, the display of the remote terminal may present the screen 202 shown in FIG. 70 to indicate that the transaction is going forward.

Figure 71:
Figure 72:
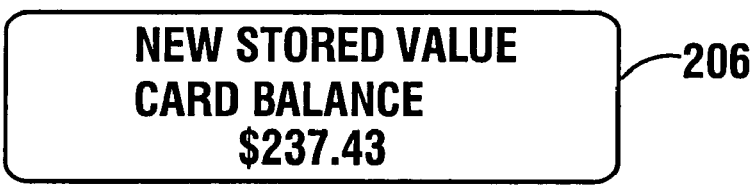

If the transaction is successfully completed the remote terminal displays a screen 204 shown in FIG. 71 to indicate a transaction has been approved. The logic next moves to cause a screen 206 to be displayed. Screen 206 which is shown in FIG. 72 is operative to show the user the new stored value balance stored on the multifunction card.

Figure 73:
Figure 74:
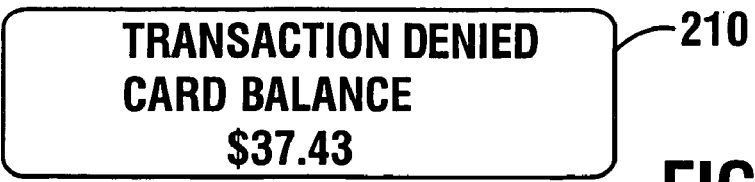

If for some reason the terminal is unable to make connections to the remote location, either because it is unable to make a connection or because of some other malfunction, a screen 208 shown in FIG. 73 may be displayed. This screen prompts a user to select whether to retry the transaction or to quit. Similarly the user may decide to turn the terminal off by pressing the on/off button 30. Alternatively the user's request to transfer the funds may be denied by the remote location, such as because it would put the user over their credit limit. In such circumstances the instructions stored in the multifunction card are received from the remote location and causes screen 210 shown in FIG. 74 to be presented on the terminal. This screen shows the user that the transaction was denied and that their card balance remains at the prior amount. Of course the user is free to again attempt the transaction using a different source of funds, or alternatively to transfer funds from a different stored value scheme stored on the memory of the card.

The exemplary embodiment also enables transferring the value from the stored value card to one of the user's accounts. This may include for example a checking or savings account which the user maintains with a financial institution. Alternatively this may include transferring value from one stored value scheme stored on the card to another stored value scheme stored on the card.

Figure 75:
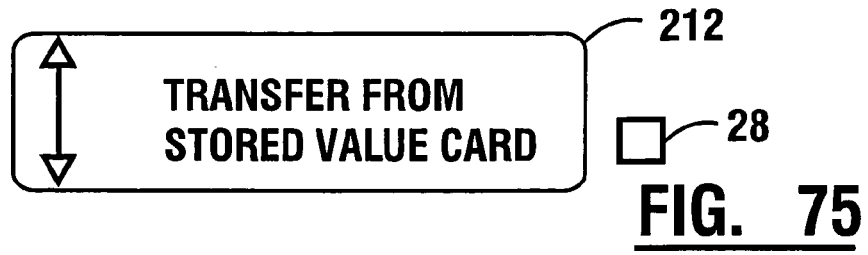
FIGS. 75-88 show screens displayed on the portable terminal and associated with the logic flow for transferring value from the programmable memory on the multifunction card to a selected user account.

The transfer of value from the stored value card is commenced in an exemplary embodiment from a screen 212 shown in FIG. 75. Screen 212 corresponds to screen 78 in the main menu. Pressing the enter button from this screen causes the processor to execute various instructions on the multifunction card associated with this transaction.

Figure 76:

In executing the transfer from the card the user is next prompted through a screen 214 shown in FIG. 76 to identify a destination of the funds. This is done by user using the up and down buttons to select one of the available destinations. In this case the user has selected the account associated with the designator "KEY_BANK_ATM." The selection is made by pressing the enter button 28.

Figure 77:
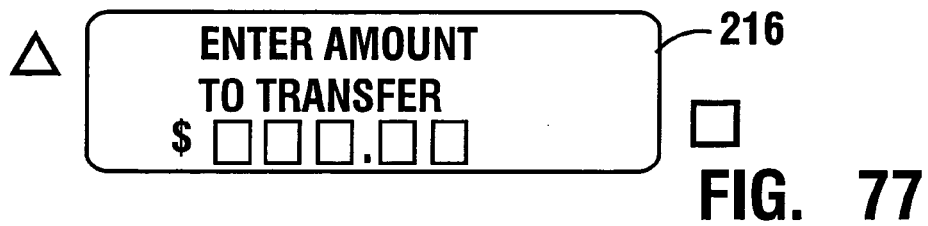
Figure 78:
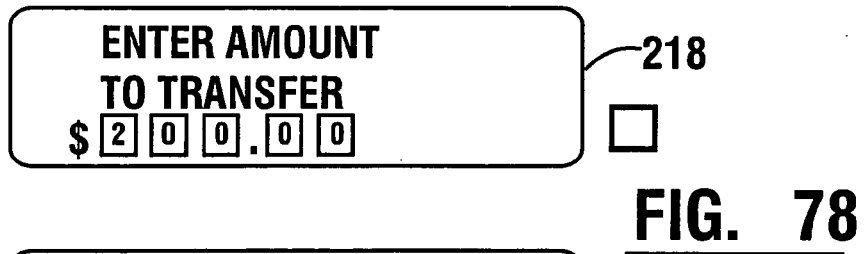

As shown in FIG. 77 the user must next enter an amount to be transferred from the memory of the stored value card into the designated account. The user must enter an amount which is prompted through a screen 216. The entry of an amount is accomplished in the manner previously described by using the up and down buttons and the enter button. In the case of this example the user enters an amount to transfer of $200 as indicated by screen 218 in FIG. 78.

Figure 79:
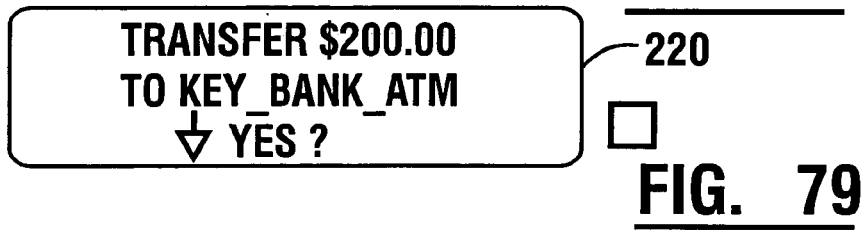
Figure 80:
Figure 81:

In response to the user entering the transfer amount the terminal next operates to display a screen 220 shown in FIG. 79 in which the user is asked to confirm that they wish to make the transfer to the particular account. In the situations where the user is obtaining funds from financial institutions or other sources where they may have multiple accounts, the user may be prompted through additional screens to select particular accounts that may be held at the institutions which are sources of funds. This is demonstrated in FIGS. 80 and 81. For example in screen 222 the user is first prompted to state whether they wish to transfer funds to savings. By pressing the down button the user may cause screen 224 to be displayed which then asks them if they prefer to transfer the funds into checking. For purposes of this example it will be assumed that the user wishes to transfer the funds to checking, which they select by pressing button 28 as shown in FIG. 81.

When the user is transferring funds to or from a debit card account, the PIN number uniquely associated with the user's account is required to be input to gain access. The nature of the account which the user has identified as the destination or source of funds, is generally indicative that a PIN number is required for access thereto. The instructions stored in memory on the card or the memory of the terminal may cause screens associated with the entry of a PIN number and/or the selection of various accounts to be displayed when particular accounts are selected.

Figure 82:
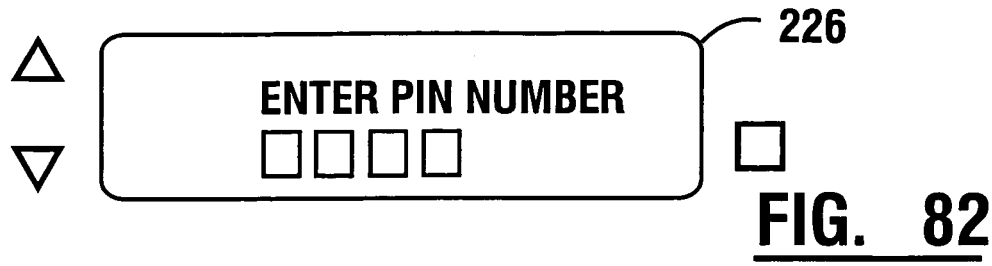
Figure 83:
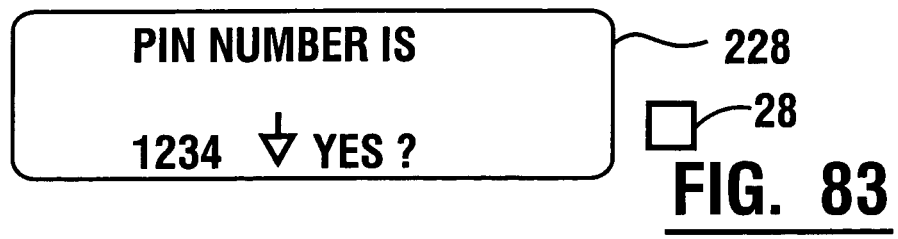

In the present example because a bank account which requires the entry of a PIN number is being used as the destination of the funds, the stored instructions cause a screen 226 shown in FIG. 82 to be displayed. Screen 226 prompts the user to input a PIN number. The user inputs their PIN number either by alphabetic or numerical characters in the manner previously described for entry of designators and numerical values into the remote terminal. Once the user has completed the input of their PIN number as indicated by a screen 228 in FIG. 83, they are presented with a prompt that asks them to confirm the PIN number input. Confirming the input in response to this prompt is done by pressing the enter button 28. In embodiments where the biometrics reader is used, biometric data may be used in addition to or in lieu of a PIN to identify the user to a remote system. Alternatively, a user's PIN number may be stored on the card. If the user has first identified themselves with an access code or biometric data to operate the terminal with the card, the level of security may be considered already sufficient that the PIN may be recalled from memory and forwarded by the terminal. Alternatively, the user may be required to input biometric data and in response to the proper biometric input the PIN is recovered from the card memory and output by the terminal.

Figure 84:
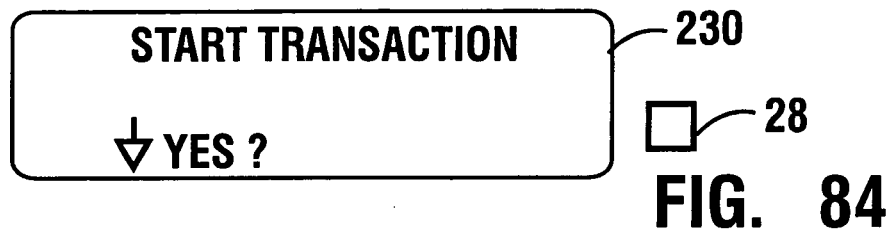
Figure 85:
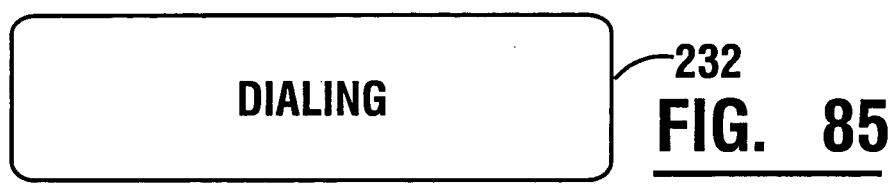
Figure 86:

After the data required to conduct a transaction has been input, the user is questioned concerning whether they wish for the transaction to proceed. As shown in FIG. 84 a screen 230 is presented which prompts the user to confirm that they wish the transaction to go forward. Confirmation is presented by pressing the enter button. In response thereto the remote terminal contacts the appropriate computer address to transfer the funds to the account designated. While this is being done, the screens 232 and 235 shown in FIGS. 85 and 86 are displayed. As previously discussed contact may be via a phone system or by computer network to the appropriate address.

Figure 87:
Figure 88:
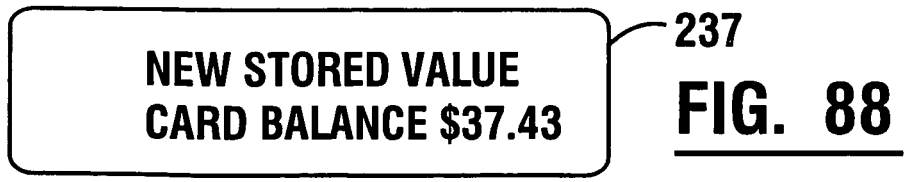

If the transaction is successfully completed the instructions cause the screen 236 shown in FIG. 87 to be displayed. In the exemplary embodiment the instructions then cause the display of the screen 237 which shows the user the amount of value remaining on the card.

While various methods of communicating between the remote terminal and the remote locations may be used, in one exemplary embodiment it is desirable for the communications device to include a wireless modem. The wireless modem enables communication over a cellular telephone network. Appropriate encryption is provided to enhance security. This enables a user to transfer funds between the multifunction card and their various accounts from any convenient location where the user happens to be. This may be particularly advantageous when a user finds that they are in need of cash and do not have an automated teller machine or a telephone line readily available. The user is enabled to load cash value onto the multifunction card so they can complete their transactions.

In addition while the exemplary embodiment has been described as being used to make transactions from value stored on the card to various accounts of the user, exemplary embodiments may also be used to transfer funds from the stored value card of one user to the stored value card of another user. This enables users to carry out the equivalent of cash transactions using stored value cards. In such circumstances the terminal would contact the appropriate remote locations for recording the transfers of funds for accounting purposes, if necessary. Alternatively if sufficient security is provided, the electronic information corresponding to cash value may be deemed sufficiently self-authenticating so that no independent accounting of the cash value need be kept in an external system.

Alternative embodiments can permit cards to be used in various ways. For example, an authorized user can create duplicate credit or debit cards. These additional cards can be provided to trusted friends or family members on a temporary basis. This will enable such individuals to access funds of the user when needed. This may be appropriate, for example, when family members are traveling and are separated from the primary card user.

Also, as previously discussed, a user is able to continue to use a large number of credit cards, debit cards, and other various forms of cards and objects bearing indicia, without having to physically carry those cards on their person. As a result, the user is enabled to keep such cards at home or another secure location where they are less likely to be lost or stolen.

Furthermore, an exemplary form is highly flexible in configuration and can accommodate a number of different types of transactions depending on the instructions stored in the memory of the multifunction card and/or the portable terminal. As a result, the apparatus and method of an exemplary embodiment is highly and readily adaptable to the carrying out of different or additional transaction types, whether financial or otherwise.

Furthermore, a financial transaction may require plural types of information from a customer. Such required transaction data may include the customer's financial account information and the customer's signature. As previously discussed, a user's signature can be stored in a programmable memory for later use in transactions. The stored signature can be used as a legally binding electronic signature. The stored electronic signature can comprise data representative of a handwritten signature. For example, the electronic signature can be a reproduction of a signature, such as a scanned handwritten signature. Alternatively, the signature may be data which a user has agreed will have the legal effect as a written signature, or data which identifies the user. For example, as previously discussed, data representative of a signature can include an electronic signature, such as a digital signature or a digital certificate. The electronic signature can be linked with the user's identification in a data store, and thus can be used to uniquely identify the user. Thus, signature data (e.g., data representative of a signature) can be stored in the programmable memory of a user's portable hand-held device (e.g., a phone).

In an exemplary embodiment, user account data can also be stored along with the signature data. That is, account data and signature data (and other data) can be stored in the programmable memory of a user's portable hand-held device (e.g., multifunction card, terminal, phone). Hand-held devices have been previously discussed.

The stored account data can comprise checking account data. In an exemplary embodiment, a merchant transaction system is operative to receive account data stored in a customer's portable hand-held device. Data representative of the user's signature and/or the user's financial account information can be transmitted from the user's (customer's) portable hand-held device to the merchant's transaction system. Wireless communication can be used to transmit/receive data between the user's hand-held device (or the user's terminal) and the transaction system. For example, data may be transmitted/received via a communications device (e.g., modem, infrared transmitter, RFID, Bluetooth device, or similar technology). In an exemplary embodiment the range of communication between the user's hand-held device and the transaction system can be limited to a specific distance, such as a few inches to a few feet. The use of a limited wireless communication range can avoid interference and permit communication only with the other device. The communication may also be encrypted to ensure confidentiality of data. The merchant system can store the received financial account data and signature data.

The account data stored in the hand-held device can be used in generating an electronic check. A merchant transaction system includes an electronic check template in storage in a computer (which may be a local computer or a network host computer in operative connection with the local computer). Alternatively, the merchant system can be operative to communicate with a third party which has the electronic check template and can generate electronic checks (and/or carry out the transaction) for the merchant. The check template includes software operative to receive customer account data to create an electronic check. The customer account data can include the necessary information required by a merchant to accept a check as payment for a purchase. For example, the account data may include checking account number (and/or bank routing number), check number, name, address, phone number, bank name, or combinations thereof.

The electronic check-generating template can also have the check made payable to the merchant. The template can be programmed to set the payee as the merchant by default but have the ability to allow the merchant to change the payee. The template can also receive purchase data from the merchant computer. This enables the template to automatically insert the amount of a purchase into the electronically generated check. That is, the purchase amount data can be used as the check amount. The check template can also insert the current date (and other information, e.g., time, store identification number, etc.) into the generated check.

FIG. 96 shows an electronic check-generating arrangement. A customer owns or has access to a portable hand-held device, e.g., a card 250, terminal 252, or phone 254. The hand-held devices include a programmable memory 256. A hand-held device may also include other features, such as a display screen 258, 260, function buttons or keys 262, and/or a camera 264. The phone 254 may comprise a video cell phone. The customer's account data and/or signature 266 can be remotely wirelessly transmitted or read from the hand-held device (e.g., phone 254) to a merchant's terminal 270, e.g., a checkout terminal or computer. As previously discussed, the merchant terminal 270 may be connected to a network. The merchant terminal 270 is in operative connection with an electronic check generating template 274.

As shown in FIG. 97, the base electronic check template 274 can include a starting check format 276 having the sections or fields 278 empty. The template software is able to fill these check fields 278 with the data necessary to generate a legal financial check. The check fields to be filled may include the check value, the customer bank account number, payee, date, and the signature.

As previously discussed, a reproduction of the user's signature may be stored in the memory of a user's portable hand-held device (e.g., card or phone). The user can display a reproduction of their signature on a display screen of the user's hand-held device (or terminal) so that the merchant can verify the signature. Verification may include visually comparing the electronic signature to a handwritten signature already on a user card or to a sample of the user's signature freshly handwritten in view of the merchant.

Alternatively, with the merchant system having the customer's signature data, the merchant can display a reproduction of the signature on the merchant's own display screen for use in signature verification. Of course, if the signatures lack acceptable correspondence in the verification process, then the merchant can end the transaction. In other arrangements, signature comparison software may be used to determine the validity of the customer's signature. Alternatively, in other embodiments other approaches to signature verification, such as ways of validating electronic signatures, may be used.

After the merchant system obtains the account data and signature from the user, then the electronic check (with user account data and signature) can be completed. The merchant system can store the received financial account data and signature data along with the transaction data (e.g., purchase amount). The check-generating template software in the merchant's system is able use the obtained electronic signature as the signature in generating the electronic check. That is, the electronic check template can insert the user's electronic signature or other corresponding data into the electronic check. The merchant system can display an image of the completed check on a display screen for viewing by the customer and the merchant for final approval.

The electronic check template can also insert a check number into the generated check. The check number can be received from the customer. The programmable memory of the customer's hand-held device can increment check numbers. For example, the last check number can be stored in the memory. The value of one can be added to the stored check number prior to transmission of the check number to the merchant system. Alternatively, the last check number can be incremented to create the next check number prior to storage of the check number in the programmable memory. This next check number can then be stored with the other checking account data. The next check number (along with the other account data) can then be received by the merchant system. Thus use of check numbering enables a customer to more efficiently maintain a record of the checks drawn from their checking account.

Figure 98:
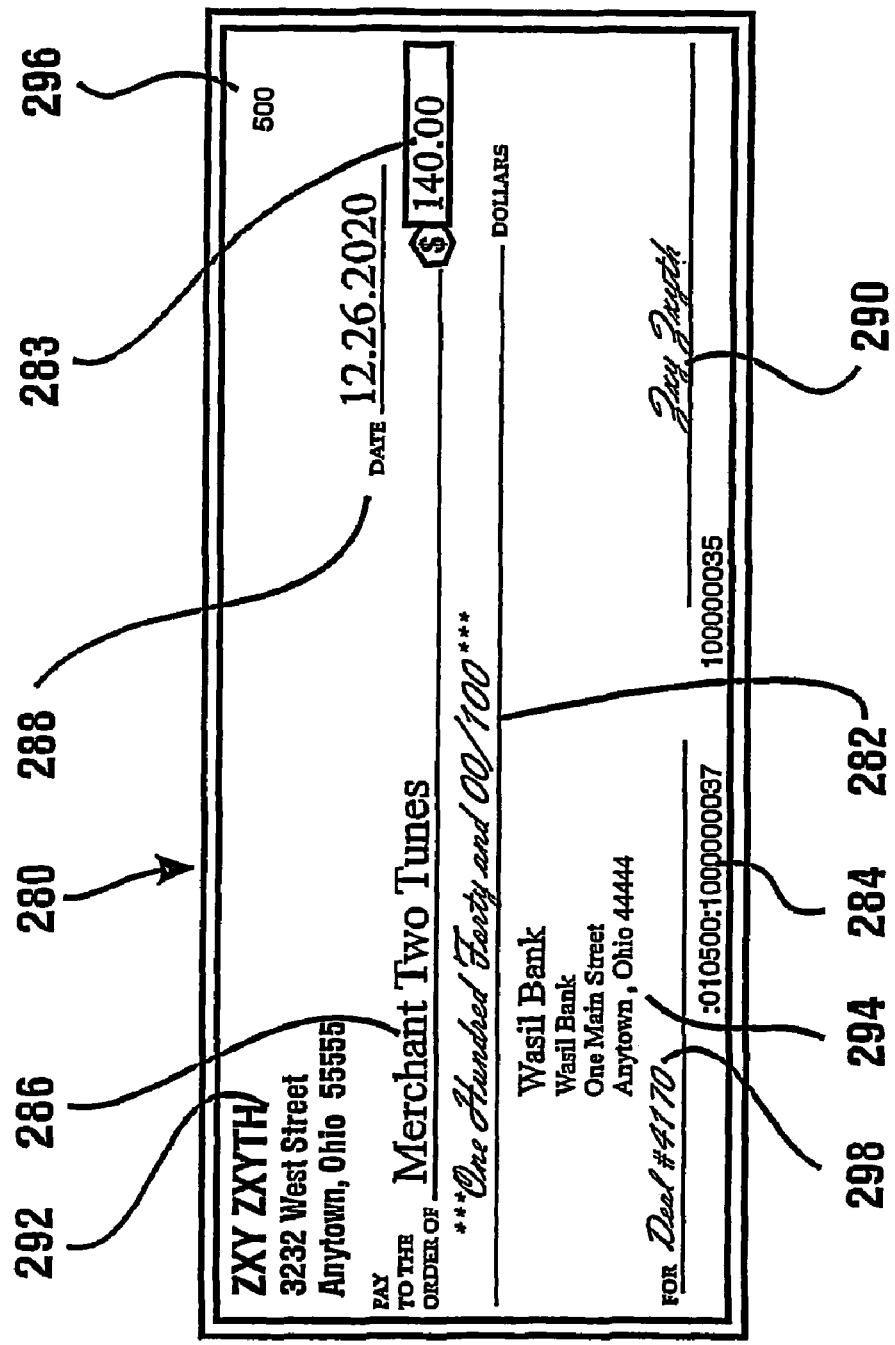
FIG. 98 shows an example of a completed electronic check.

FIG. 98 shows a completed electronic check 280 generated by the merchant system. The check 280 has entries in the check fields. Respective entries include the written check value 282, the numeric check value 283, the customer checking account/routing number 284, the merchant as payee 286, the date 288, and the customer's signature 290. The check generating software is also operative to insert other entries, such as customer address 292, bank name and address 294, check number 296, and merchant transaction number 298. The completed check is acceptable by the merchant as payment for a transaction.

The merchant system can transmit the completed electronic check to a bank or electronic clearing house for account settlement. The electronic check can be transmitted in electronic format. In an exemplary arrangement, the check is transmitted by the merchant terminal, the check is processed by the check clearing house, and the canceled (i.e., cleared) check is returned to the merchant terminal, all in a short time period. A canceled electronic check can contain a (unique) marking indicative of its cancellation. Of course this approach is exemplary and in other embodiments other approaches may be used.

The merchant system can have a printer device capable of printing a copy of the check (which may be canceled) for the customer. Merchants can also add their own indicia to a printed check, with the indicia (e.g., a stamped marking) acknowledging receipt of customer payment. A canceled check image can be stored in memory of the hand-held device (e.g., phone). The storage of a canceled check in the hand-held device can serve as receipt of payment.

There are many processes in which the hand-held device may receive the check image data. A check image may be received into the hand-held device via the user's terminal or via other known transmission methods. Wireless data transmission can be carried out. For example, Bluetooth technology can be implemented.

Also, it should be understood that the customer can receive (from the merchant terminal) and store an image of a completed check in the hand-held device (e.g., phone). This enables the customer to view the legally binding check using the hand-held device, have the check print out in paper form, and/or transmit the electronic check to a bank for account settlement. Thus, a customer can have a merchant generate a check on their behalf, and then have the generated check stored in their hand-held device (for later use).

As discussed in more detail later, a check image can also be received or captured into a user's hand-held device via a camera built into the hand-held device (e.g., phone or videophone). For example, as previously discussed, a merchant system can display an image of a generated check on a display screen. Thus, an image of the displayed check can be captured by the camera. Likewise, an image of an original check (e.g., a paper check) can also be captured by the camera. A captured check image can be stored in memory of the hand-held device.

A user's portable hand-held device can also be used in a self-service checkout transaction. The portable hand-held device enables self-service checkout in retail establishments not normally associated therewith. A retail store can have purchasable items (e.g., clothing) with an identification (e.g., bar code, RFID tag) and an anti-theft tag associated therewith. The anti-theft device needs to be neutralized before the item can properly leave the store, otherwise an alarm will be tripped (via sensors adjacent store exits). The anti-theft tag may be of the type that can be sensed and neutralized at a distance (e.g., using magnetic sensed tag, RF backscatter tag, RFID tag, or other tag types that can be "neutralized" on contact or from a short distance). The bar code (or similar identification indicia) may be attached to the item. Alternatively, a single bar code may correspond to a plurality of like items. For example, the bar code may be located on a common support device (e.g., shelf) for a plurality of the items.

Figure 99:
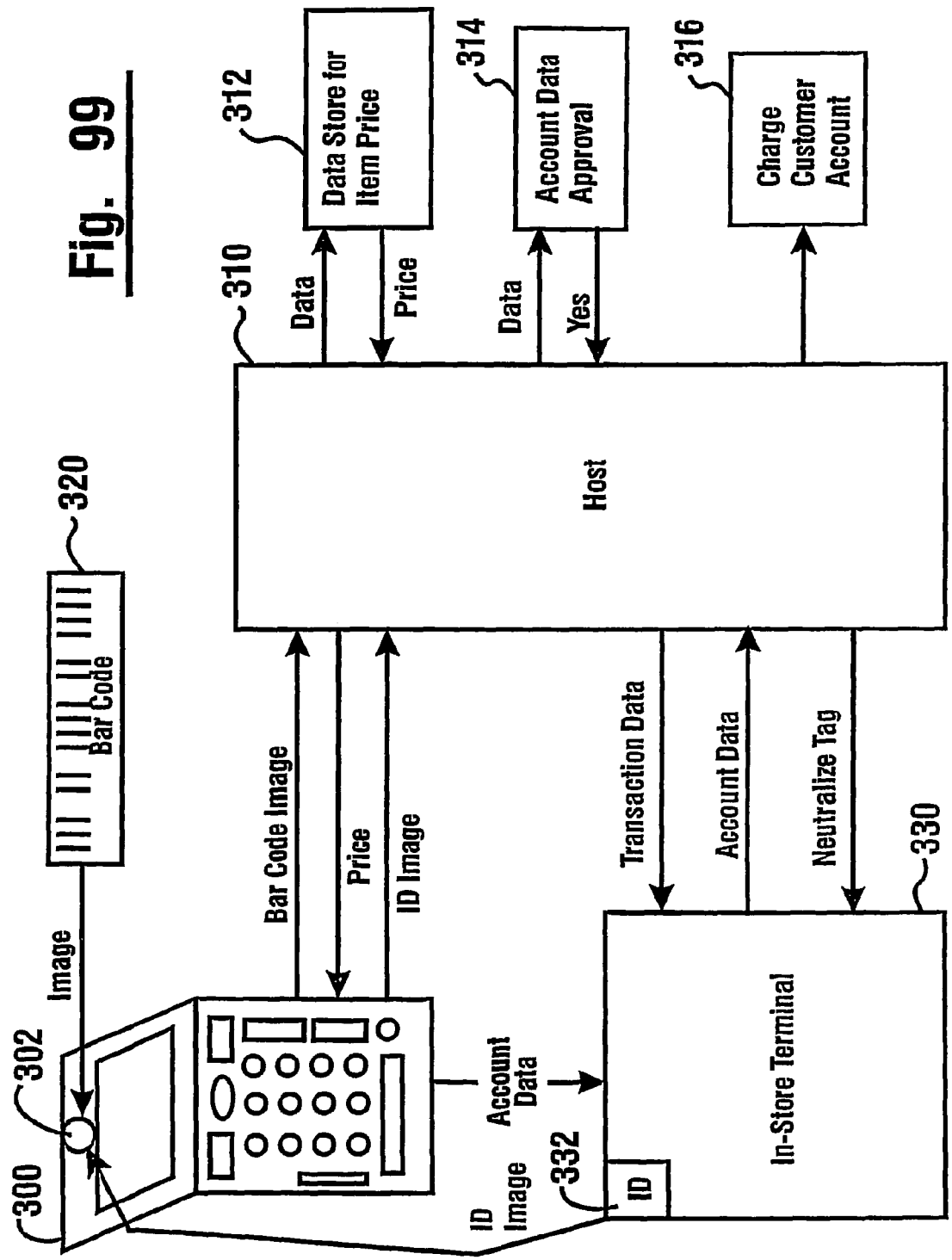
FIG. 99 shows an exemplary form of a transaction payment arrangement for an item purchase.

As shown together in FIG. 99 and FIG. 100, an exemplary embodiment a self-service checkout for an item purchase can be accomplished using the customer's portable hand-held device 300 (e.g., phone). The user operates the phone to dial a phone number to establish communication (step 400) with a transaction payment system associated with a particular retail store (or the particular retail item). The phone number can be the phone number assigned to that particular store which has the item that the customer desires to purchase. The store's phone number and instructions can be readily displayed throughout the store for the customer's benefit. The transaction payment system may be located in the store and/or on a network linked with a plurality of other stores so they can share a common network host. That is, at least part of the transaction system (which can include a host with one or more computers) may be remotely located from the store. The transaction system can match the phone number that the customer called to the particular retail facility assigned to that phone number. Therefore, the transaction system is able to know the exact merchandise establishment at which the customer is attempting to purchase an item. The transaction system is able to accept purchase payment and cause the item's anti-theft tag to be neutralized or disabled or inactive. The transaction system can also handle billing for the purchase.

The customer has a camera 302 which can communicate with the phone 300, e.g., the camera may be part of the phone (e.g., videophone). After the customer's phone has established communication (step 400) with the store's network host 310, the purchaser points the phone camera at the bar code 320 corresponding to the item. An image of the bar code 320 (or data representative of the image) is captured and sent (step 402) to the transaction system (e.g., host) 310. The transaction system can resolve the bar code data and process the data to determine the price of the item corresponding to the bar code (step 404). For example, the transaction system may convert the digital image of the bar code to numerical data, and then make a comparison of this numerical data to price data to determine the item's price. Data in a data store 312 can be utilized to make the corresponding data comparison. This price information can be transmitted back for display (or by audible quote) on the purchaser's phone (step 406). The customer can verify and agree (step 408) to the price as being correct to continue the transaction. Alternatively, the price information may be displayed on a purchaser-viewable display screen in the store. If the purchaser disagrees with the determined price (or decides not to continue the purchase) then the customer has the capability of terminating the transaction.

In other embodiments, if a customer ends a transaction process the transaction system can call back the customer via the phone and offer a lower or discounted price for the item. The lower price may be calculated by using statistical analysis based on a variety of customer factors, such as demographics, types of accounts, account balances, purchase history, credit history, etc. The discounted price may also be linked to other factors, such as the customer being required to open a new line of credit. Information about the customer may be obtainable via the customer's phone number, or the customer may be requested to provide more information to determine if a discounted price applies to that customer. In other embodiments, a loyal (repeat) customer may also be presented price discounts.

Continuing with the purchase, the transaction payment system requests the buyer to transmit their account billing data. As previously discussed, a customer account may be associated with MasterCard®, VISA®, American Express®, Novus®, Discover®, or other common accounts, such as checking, savings, mutual fund, and money market accounts. The account data is stored in memory in the user's hand-held device. The stored account data (and electronic signature if necessary) may be transmitted in a manner previously discussed, e.g., the user's phone (or other hand-held device) transmits the user's account data.

The account data may be transmitted (step 410) wirelessly from the customer's hand-held device to an in-store merchant terminal 330. The transaction system can include the merchant's terminal. The transaction may be handled locally via the merchant's in-store terminal, which can comprise a computer, communication devices, and communicate with the host. Alternatively, the merchant's terminal can pass the received account data (and signature if necessary) to another (network host) computer located remotely from the store. The merchant's terminal can have access to the identification of the store in which the terminal is located, and access to identification(s) of the store's neutralizer(s). The identification data may be stored locally in terminal memory. The merchant's network terminal can transmit the stored (store and neutralizer) ID data to the network host. This ID data may be sent along with the customer's account data from the merchant's terminal to the host.

In other embodiments the account data may be transmitted from the phone directly (e.g., via a phone network) to the remote host computer, without use of the merchant's terminal. For example, the account data (and a PIN if necessary) may be transmitted by entering data via the phone keys. Thus, a transaction system can be located only locally (e.g., as the in-store terminal), or partially located both locally and remotely (e.g., as a combination of the in-store terminal and remote host), or completely located remotely.

The transaction system can communicate with other finance systems 314 to determine whether user-provided account data is acceptable in paying for an item. It should be understood that it is within the scope of some embodiments for other data or information (e.g., store location/ID, more customer identification, yes/no prompts) to be communicated between the customer's phone and the transaction system in order to carry out a purchase transaction. Upon the customer's account data being approved for transaction, the customer's account 316 can be charged the item's cost (step 412).

After payment for the purchase has been approved by the transaction payment system, the security tag can be neutralized (step 414). The user places the purchased item adjacent to an in-store tag neutralizer device (if not already adjacent thereto). The neutralizer device may be on an item shelf, or at a self-service checkout area of the store, or part of an in-store merchant transaction system. The transaction system can communicate with the tag neutralizing device. The transaction system can cause the neutralizing device to neutralize the security tag corresponding to the particular purchased item.

In other embodiments the transaction system may communicate with the tag neutralizer via the customer's phone. For example, the transaction system can send a code to the customer's phone. The code may comprise a unique audible frequency tone that is recognizable by the tag neutralizer as an instruction to cause neutralization of a particular item's tag. The code may be stored in the phone and later played when the customer is ready to exit the store, or the customer may be instructed to place the phone adjacent the neutralizer prior to sending the tone.

In the exemplary embodiment the anti-theft tag cannot be neutralized until after the user's account has been charged for the item. However, the tag may be neutralized simultaneously with the user's account getting billed for the item. Once the item has been neutralized, the user can carry the purchased item out of the store without the item tripping the alarm. The arrangement enables a person to check out items at a store shelf, at a self-service check out area, or anyplace a device for neutralizing the anti-theft tag can be located.

As previously discussed, in some embodiments the transaction system can communicate with the tag neutralizing device. In other arrangements there can be feedback between the neutralizer device and the transaction system. The transaction system can use the feedback to verify usage of the neutralizer device (and authenticity of the transaction). The transaction system can also use the feedback to ensure that the customer is using the correct neutralizing device.

In an exemplary feedback arrangement, the neutralizer has an identifier (e.g., number, symbol, marking, etc.) which the customer's phone camera can capture and send to the transaction payment system. The neutralizer may have a permanently assigned number as an identifier. Alternatively, the neutralizer may have a changeable identifier. For example, the neutralizer can have an output device that can display the latest identifier sent from the transaction system (e.g., host). The displayed identifier may comprise a transaction symbol or number (e.g., random number, date, time, or any combination thereof).

The transaction system has the neutralizer's identifier stored in memory. If the image of the identifier received from the phone camera does not match or correspond to an identifier currently stored in the transaction system's memory for that particular neutralizer, then the transaction system does not recognize the neutralizer (or the transaction) as valid. Hence, the transaction system does not attempt to neutralize the tag. The purchase transaction is terminated and nullified. The feedback arrangement reduces the risk of the system being tricked, and ensures that the customer is at the proper neutralizer.

In other arrangements the transaction process can be carried out with the item's identifier being read with a device other than a phone camera. For example, the customer's hand-held device (e.g., phone) may include a bar code reader. Thus, a bar code may be read with the bar code reader, instead of via a camera. The bar code can be read as a number, and the number transmitted as data (instead of an image) to the transaction system. Alternatively, the phone may have a processor and software that can convert an image to data. Thus, the phone can transform a captured bar code image into data (e.g., a number) prior to transmitting the data (e.g., number) to the transaction system. Likewise, if an item's identifier comprises an RFID tag, then the customer's hand-held device (e.g., phone) may include an RFID tag reader. Again, the customer's hand-held device (e.g., phone) can transmit an item's identifier as a number instead of as an image. It should be understood that other communication arrangements between the hand-held device and the transaction payment system are within the scope of the invention. For example, one-way or two-way Internet communication between the hand-held device and the transaction system may be used. The hand-held device may transmit an item's identifier information to the transaction payment system via the Internet. The hand-held device can have wireless link with the Internet. Thus, the hand-held device can transmit data (image and/or numerical data) to the Internet address of the transaction system.

In another exemplary embodiment the item to be purchased includes at least one RFID tag as an anti-theft tag. The neutralizer can be operated to change the programming of the item's RFID tag. For example, the RFID tag can be changed to a unique number (e.g., transaction number) for that shopping visit. The unique number can be recognized as acceptable by the security system. If any other RFID value other than the unique number is sensed as the item goes by the store's exit sensor, then the alarm sounds.

In other embodiments the anti-theft tag neutralizing (or reprogramming of an RFID tag) can be accomplished through the user's portable hand-held device (e.g., phone). The phone is placed adjacent to the item having the tag. The transaction system sends a specific signal or code through the phone which is receivable by the anti-theft tag to cause neutralization (or reprogramming) thereof.

As previously discussed, in some embodiments the transaction system can send the charge transaction. In other arrangements an in-store computer can be used to send the charge transaction, and the store computer can also be used to confirm that the store received payment for the item. If the phone is dialed into the store computer for providing pictures and account data, then the store computer can route the transaction to the bank. Alternatively, a store computer can accrue what is being bought and total the payment owed. When the user is ready to leave the store they disconnect their call with the store computer. The store computer has the bank computer call back the user's phone. The bank, such as through a person or through an automated system such as an interactive voice response system, advises the user that they will owe so much to the store. The user can authorize the purchase agreement with the bank via inputs to the phone, such as spoken inputs and/or the pressing of phone keys. Once the store is notified that authorization for payment has occurred, then the store can let the item (or items) out of the store without the alarm sounding. For example, the store can let an item having an (RFID) number corresponding to the bar code pass through the security system without requiring tag neutralization or modification.

A further exemplary operation of purchasing a merchant item via a self-service checkout using a customer's phone 300 can also be described with regard to FIG. 99. The customer uses their phone to call the store's (toll free) phone number. As previously discussed, the phone number may be displayed throughout the store. The phone number may be assigned to that particular store or it may be a phone number shared by several stores. Nevertheless, the call is answered by the transaction system host 310, and communication is established between customer's phone and the host. The customer is instructed to transmit an image of the item's identifier (e.g., bar code 320). The identifier image is captured by the phone's camera 302 and transmitted via the phone to network host. The host 310 obtains a price corresponding to the received identifier. As previously discussed, the price assigned to the item's identifier may be determined by the host computer or it may be provided from a secondary data source 312. Nevertheless, a price is matched with the item via the item's identifier (e.g., bar code). The price of the item transmitted from the host (or secondary source) back to the customer's phone and displayed thereon. The customer then must agree to the displayed price to continue the purchase, else the transaction is terminated by the host. A termination may include notifying the customer of such act. It should also be understood that the customer may also terminate the transaction at any time prior to payment. Agreement can be acknowledged via the pressing of a particular phone button(s), providing voice input(s), or both depending on the particular system.

Following agreement, the customer is requested by the host to transmit an image of an identification (ID) 332 of the in-store terminal/neutralizer 330 at which the customer wants to make the payment. The ID image is captured by the phone camera and transmitted to host. The host must recognize the ID as valid to continue the checkout, else the purchase transaction is terminated by the host. After ID validation, the host places transaction data (e.g., description of item, price of item, etc.) that corresponds to the customer's purchase in the payment queue of the particular terminal/neutralizer corresponding to the ID. The customer is notified (e.g., by the host and/or the terminal/neutralizer) that the terminal/neutralizer is ready to accept payment for their purchase. The terminal/neutralizer is able to display the transactions in the payment queue. The payment queue contains the order in which the transactions are to be paid. The payment queue may be a first-in first-out type of queue. For example, the transaction in the queue may be ordered based on time. Only one transaction can be paid for at a time. That is, the terminal/neutralizer views only one transaction as being "active" for payment. Any account data received by the terminal/neutralizer will be applied toward the currently active transaction. The payment queue can be adjusted by the customer (if necessary) to ensure that their transaction is displayed as the active transaction.

The customer then transmits account data from their phone 300 to the terminal/neutralizer 330. The terminal/neutralizer 330 transmits this received account data to the host 310. The host seeks approval of the account data as being acceptable for the transaction payment. The process of approval may include other financial sources 314, as is well known. If the transaction is denied payment approval, then the host terminates the transaction.

If the customer's account data is approved for payment, then the customer's account 316 is correlated with payment for the item(s) in the purchase. After the host is notified of payment, then the host instructs the particular terminal/neutralizer 330 to function to neutralize the item's anti-theft tag. This act may range from simply turning on the neutralizer to having the neutralizer only neutralize a specific tag. The operation of security tag neutralizers is well known and need not be discussed further. The customer can next place (e.g., locate, wave, scan) the item adjacent to the terminal/neutralizer (if not already placed) and the item's tag is neutralized. The customer can then exit the store with the purchased item, without the item tripping any security alarms.

The portable hand-held device (e.g., phone) also enables a user thereof to obtain cash in a manner similar to making an item purchase. A user of the portable hand-held device can obtain cash from an ATM located in a retail establishment (e.g., merchant store, restaurant, sporting facility). For example, an in-store ATM can be on the store's computer network. The ATM can be a recycler type of ATM that can both receive currency and dispense received currency. A recycler ATM enables the retail establishment to efficiently make use of excess cash.

Figure 102:
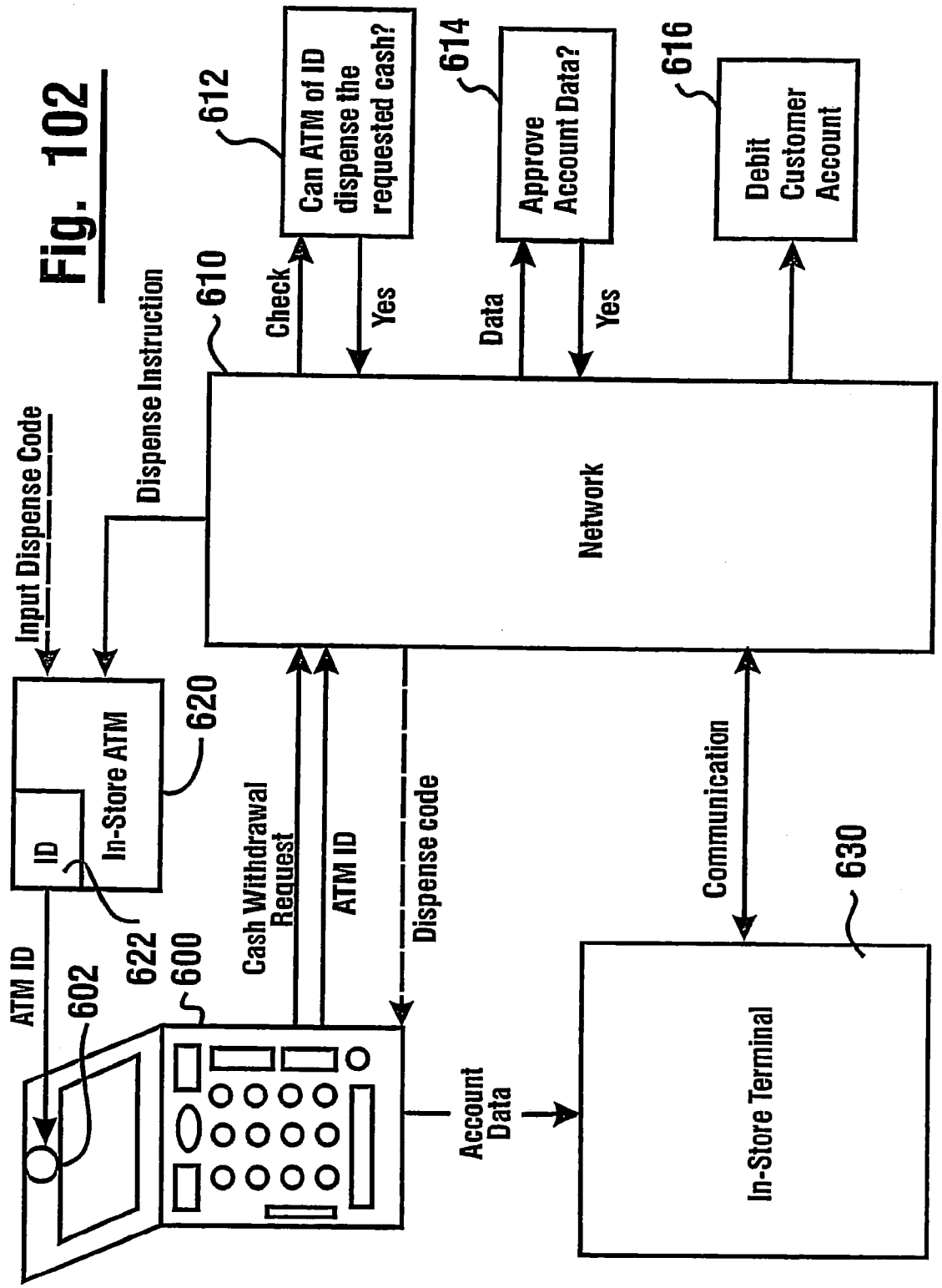
FIG. 102 shows an exemplary form of an arrangement for a cash withdrawal transaction.

An exemplary operation of purchasing cash with a handheld device will now be described with respect to FIG. 101 and FIG. 102. Communication is established between the customer's phone 600 and the store network 610 (step 500). The customer requests a cash withdrawal (step 502). The amount of cash requested may be included in the initial request, or the amount may be transmitted later. The customer has to transmit the necessary information in order to have the cash request granted. The required information may include customer account data, customer signature, account PIN, identity of the ATM, and/or amount of requested cash.

An ATM 620 has an identifier 622, such as a machine ID number or a bar code ID, visibly located thereon. Likewise, the ATM's display screen may have an identifier (e.g., random number, symbols) displayed thereon. The user can point their phone camera 602 at the ATM to obtain an image of the ATM's identifier 622, else the user can enter the identifier (if it is a number) via the phone keys. Hence, the customer can transmit their requested amount of cash along with the ID of an in-store ATM to the host (step 504). The requested amount of cash can likewise be entered via the phone keys. Of course, other known ways of entering data may be used, such as voice to data conversion.

Continuing with the cash purchase, the customer can transmit (step 508) any necessary transaction data (e.g., customer account data, signature, PIN) not already provided via wireless communication from the phone 600 to a transaction system computer 630, such as in a manner previously discussed. The transaction computer can be a local in-store self-checkout terminal 630 which is in communication with the store network 610. The transaction data may or may not be stored in the phone memory prior to its transfer to the store network.

Alternatively, the customer may initially transmit transaction data from the phone to the in-store terminal 630. This data may correspond to just the customer account, signature, and/or PIN. In such a scenario, at this point in the cash purchase process the customer may be requested to provide (via their phone to the network) how much cash they want and the identity of the particular ATM. As previously discussed, the customer can uses their phone to transmit the ATM identifier and the desired amount of cash to the store network. The transmitting may involve a phone line network or the Internet. The phone can be used to transmit the ATM identifier and the cash amount to a network device (or location) remote from the store.

The store network (which may include a secondary financial network) checks the received transaction data to determine 614 whether the requested cash withdrawal should be permitted. With network approval (step 510) of the requested cash withdrawal, the requested cash may then be dispensed via a cash dispenser in the ATM. Responsive to the approval, the store network 610 correlates (e.g., charges, debits, bills, etc.) the customer's account 616 with the cash purchase (step 512), similar to a merchandise purchase. The store network instructs the in-store ATM 620 (i.e., the ATM corresponding to the customer-provided ATM identifier 622) to dispense the requested cash amount. The instruction to the ATM may cause the ATM to immediately dispense the requested cash (step 514). The store may receive a service fee for providing the cash.

Furthermore, instead of instructing the ATM to immediately dispense the cash, the store network can provide (via the phone or a receipt) a code to the customer (step 516). This code (e.g., a number or a combination of numbers/letters) can later be inputted by the customer into the in-store ATM to receive the requested cash. The store network authorizes the ATM to dispense the requested cash amount upon receiving the inputted code (step 518). The ATM may also have a walk-up code input device that does not require conventional user verification input to operate, or other suitable input device. That is, the user does not have to insert an ATM card into the ATM prior to obtaining their cash. For example, the customer can approach the ATM, the customer inputs only the code, the ATM dispenses the cash corresponding to the code, and the customer takes their purchased cash. The ATM input device can have keys that are operative to accept manual input of the code. The ATM input device can also be operative to accept wirelessly communicated input via the phone. Furthermore, the code provided to the customer may be a network code. The network code may be used by the customer at any ATM in any store on the network. Alternatively, other identifiers, such as a biometric feature associated with the user or another type of associated identifier, may be used.

An alternative exemplary operation of purchasing cash will now be described also with respect to FIG. 101 and FIG. 102. This operation includes the additional step (step 506) of the host determining whether the selected ATM is able to perform the requested cash dispensing.

Communication is established (step 500) between the customer's portable hand-held device 600 (e.g., phone) and the store network 610. The customer requests a cash withdrawal (step 502). The customer is instructed to transmit request data (e.g., amount of cash withdrawal and/or ATM identifier). Instructions to the customer may be received via the customer's phone.

Continuing with the cash purchase, the customer transmits (step 504) the cash request data (e.g., amount of cash and/or ATM identifier). The customer may transmit data to the network (or an in-store terminal thereof) via the customer's phone. As previously discussed, the phone camera 602 may be used to transmit an image of an ATM identifier 622.

In certain arrangements the store may be assigned a default ATM. This is particularly useful when the store has a single ATM. The network uses the store's only ATM as the default ATM. Thus, when the customer calls the store's phone number, the network matches the phone number to the store and determines the identity of the store's ATM from a data file. Hence, when a customer initially calls in an in-store cash withdrawal request, the phone number called informs the network which ATM to use. This arrangement can alleviate a customer from having to identify the ATM.

The network 610 may be programmed to check 612 the status and/or ability of the identified ATM to dispense the requested cash amount (step 506). The network confirms the ATM status as valid. Otherwise, the transaction is terminated. In other arrangements, the customer may be given additional options instead of terminating the transaction. For example, the customer may be provided the option of requesting a specifically different (e.g., nearby) ATM on the network, or the option of receiving a network code which enables the customer to receive their cash at any ATM on the network.

After the network confirms the ATM(s) involved in the cash dispense, then the customer is instructed to transmit (step 508) their account data that is to be used for payment. Again, the customer can transmit the account data (e.g., customer account data, signature, PIN) via wireless communication from the phone 600 to an in-store terminal 630 on the network. The network determines 614 (or has another system verify) whether the received account data is valid for payment of the requested cash purchase. The account data is deemed acceptable for payment (step 510), else the transaction is terminated. In other arrangements, the customer may be given another chance to continue the transaction. For example, the customer may be provided the opportunity to transmit different account data (e.g., a different customer account) for payment. If so, the network would again check the validity of the account for purposes of payment.

After the customer's account data is deemed acceptable for payment (step 510), then the store network (or another system with which the network can communicate) correlates (e.g., charges, debits, bills, etc.) the customer's account 616 with the cash purchase (step 512). The store network enables (e.g., authorizes) the indicated ATM to dispense the requested cash. This enablement may include instructing the indicated in-store ATM to immediately dispense the requested cash (step 514). Alternatively, the customer may be provided a code (step 516). The code may be received by the customer via the customer's phone or in some other manner, such as by a paper receipt. Hence, the enablement may include instructing or authorizing the indicated ATM to dispense the requested cash only in response to receiving the inputted code (step 518). Also, if the code is a network code (instead of a code only useable at a specific ATM) then the enablement may include instructing all ATMs on the store network to dispense the requested cash upon receiving the inputted code. As previously discussed, ATMs may have a walk-up code input device or other suitable input devices.

It should be understood that it is within the scope of some embodiments to likewise purchase merchandise or cash from a store using stored value in a user's portable hand-held device (e.g., phone). That is, a purchase can also be made using a phone's stored cash value instead of (or in combination with) the phone's customer account data (and signature and PIN). The phone's stored value can be directly reduced, or the phone can hold the transaction data for later use in providing a charge against the user's account.

Likewise a purchase (of merchandise or cash) can be made with an electronic check, as previously discussed. The store can accrue the total cost of purchase. The user's portable hand-held device (e.g., phone) can send checking account and signature data (e.g., via IF or IR link) to the store computer's check-generating template. As previously discussed, the store computer can have the bank computer seek authorization from the user to carry out the transaction. After confirmation that an electronic check payment has occurred, then the store can complete the purchase, such as by letting the merchandise out of the store without tripping the alarm, or causing the ATM to dispense the requested cash withdrawal. Likewise, a purchase deposit can be made with an electronic check. A bank can receive an imaged check as payment in exchange for a credit/deposit to an account. After confirmation that the electronic check payment has occurred, then the account can be credited the check amount.

Thus, the portable hand-held device (e.g., a phone) also enables a user thereof to make a deposit request instead of or in addition to making a cash withdrawal request. A deposit transaction process can be carried out in a manner similar to making an item/cash transaction purchase process. That is, in a deposit transaction process, an image of an item can be captured by the hand-held device, then a request that includes the image and signature data can be transmitted to a proper authority for processing.

For example, a check deposit request can include an image of the check along with signature data (e.g., check payee/customer signature). As previously discussed, an image of a (paper or electronically displayed) check can be captured by a camera of the hand-held device. The captured check image can be stored in memory of the hand-held device, along with the user's signature data. Additionally, a check deposit request can include account data (e.g., a financial account which is to receive the credited/deposited funds) and/or the check amount. The check deposit request can be transmitted via wireless communication from the hand-held device to a transaction system computer (e.g., a server), such as in a manner previously discussed. The hand-held device can comprise a mobile phone (e.g., cellular phone, satellite phone, portable wireless VOIP, etc.).

The transaction computer can be part of a financial network, a check deposit system, a bank, an automated check handling system, a check processing system, a check clearing house, or another financial entity which used to provide appropriate authority in check deposit transaction processing. Likewise, a previously discussed item purchase transaction or cash withdrawal transaction can be paid for by using a hand-held device to transmit (to a merchant, bank, or ATM) an imaged check as payment therefor. Data can be transmitted from a hand-held device to a computer, such as a server.

Figure 103:
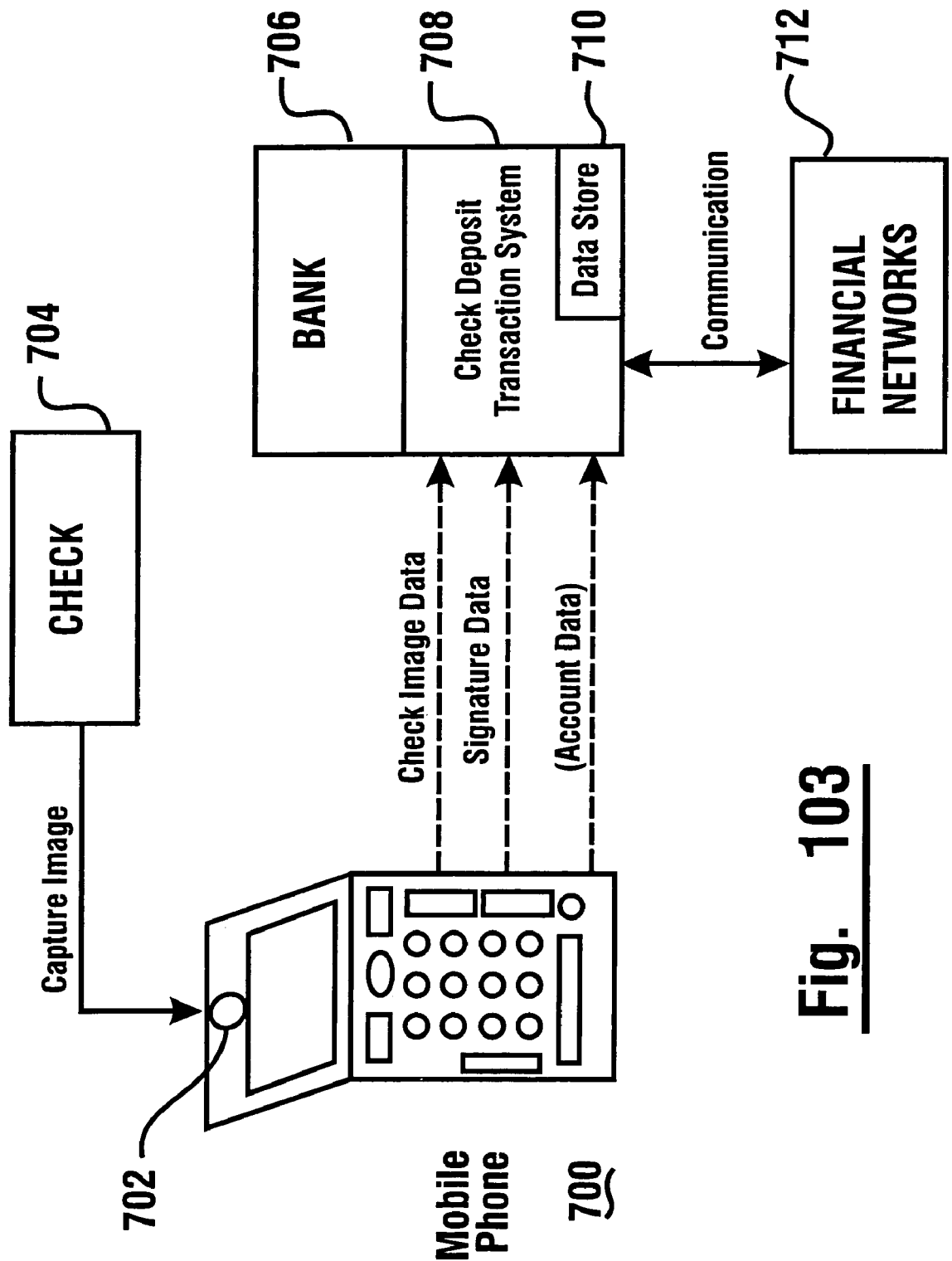
FIG. 103 shows an exemplary form of an arrangement enabling a wireless check deposit transaction.

An exemplary operation of depositing a check with a hand-held device will now be described with respect to FIG. 103. The check 704 may be a payroll check (i.e., paycheck). The customer's hand-held device (phone 700) has an image capturing device (e.g., camera 702). The camera 702 can be used to capture an image of the check 704. The phone 700 also includes at least one computer or processor. The phone 700 can store the captured check image in the phone's programmable memory.

Communication is established between the phone 700 and a financial entity, such as a bank 706 that allows customers to make electronic deposits involving imaged checks. The customer requests a check deposit. The customer has to transmit by phone to the bank 706 the information necessary to enable the bank to carry out the check deposit request. The bank 706 can include or be affiliated with a check deposit transaction system 708 and a data store 710. The system 708 can include a server and the data store 710 can comprise a server data store, where the server is operatively connected to the server data store. The bank 706 can also communicate with its host computer and with other financial/business entities via financial networks 712 for purposes such as data gathering, authorization, account reconciliation, check clearing, etc.

It should be understood that customer may use a phone to make an imaged check deposit by communicating with a transaction host other than a bank. It should be understood that for reasons of brevity, a "bank" as used herein may comprise any of a financial bank, a check deposit transaction system, an agent able to perform check reconciliation, or another entity that receives data from a user phone during a transaction involving an imaged check. Also, the financial bank may comprise the check deposit transaction system, or the check deposit transaction system may instead be an entity separate from the financial bank.

In an exemplary arrangement, the information required from the customer to deposit/cash the check includes at least one image of the check along with data representative of a signature. For example, a check made out to the customer (payee) would require signature data that is representative of the customer's signature. This signature data resides in the phone memory.

The check image data and signature data can be wireless sent together to the bank 706 (or associate thereof) as a whole in one communication, or portions of the necessary information may be separately sent (separate phone transmissions). Also, a third-party business entity may be contracted to act on behalf of the bank to handle deposit transactions involving imaged checks transmitted by customer phones.

As previously discussed, user account data can be stored along with the user signature data in the programmable memory of the user's phone 700. The stored account data can comprise data that is representative of an account (e.g., a checking/savings account number) which is to receive the deposit. Therefore, in an exemplary embodiment, each of signature data representative of the user's signature, account data representative of the user's financial account information, and image data representative of the check are all stored in phone memory.

The account data can also be sent to the bank. Thus, the check image data, signature data, and account data can each be wirelessly transmitted from the user's portable phone 700 to the bank's check deposit transaction system 708. All of the data can be transmitted during a deposit transaction. The bank's transaction system is operative to receive this data transmitted from the customer's phone 700. Wireless communication can be used to transmit/receive data between the customer's phone 700 and the bank's transaction system. By prior agreement, the bank 706 is operative to accept the electronic signature data as customer authorization to cash the check in the check deposit transaction.

The bank computer(s) can review the check data received in an imaged check. Apparatus and process to retrieve and analyze data from imaged checks can be of the type and configuration set forth in U.S. application Ser. No. 11/728,882 filed Mar. 27, 2007, which is incorporated herein by reference in its entirety. The check image processing may include use of (character) recognition software. Following review of the check data, the bank computer can accept/reject the requested deposit transaction. Alternatively, the bank computer may conventionally seek further data/authorization from other financial resources before making a final determination on whether to accept the customer's imaged check for deposit.

The customer's signature (signature data) can then be associated with the check's image by the bank computer in a record of the check deposit transaction. The signature data can be stored in a manner that indicates that the check was legally "signed" by the customer, rendering the check from being legally signed/cashed again by the customer. The record can be stored in a bank data store.

The check image may also be modified by the bank prior to storage thereof. For example, an electronic image may be created that includes both the check image and the signature. A signature image may be made to overlie or overwrite a portion of the original check image. Also, a check image may be electronically "marked" in a manner indicating that the check has been canceled. A canceled mark image may be made to overly or overwrite a portion of an imaged check.

In other embodiments the electronic signature data (e.g., digital signature or digital certificate) may first need to be verified by the bank computer during the transaction prior to approval of the check deposit. One or more data stores may be used in the signature verification process. For example, the signature data transmitted by the phone may be compared to signature data previously stored in a bank data store, or compared to data which is calculated as a function of the transmitted data, the stored data, or both. A substantially positive match of the compared signature data can be a factor in granting the deposit request.

Confirmation of the check deposit into the customer's bank account can be transmitted from the bank (or the check deposit transaction system) to the user's phone. The phone is operative to wirelessly receive this confirmation. The confirmation can be communicated in any communication format, such as e-mail, voice mail, text message, Internet/network protocol, etc. A confirmation with an image file may include an image of the check being marked as canceled by the bank.

In another check deposit embodiment, the customer's account data does not need to be transmitted from the phone to the bank. This is also indicated in FIG. 103, where the wireless transmission of account data is shown in parentheses as being an option. Nor does the account data need to be stored in the phone. Instead, other methods for the bank to identify the customer's deposit account can be used. For example, the customer could be assigned a unique PIN (or code/password) which is linked to a specific deposit account of the customer. Only that customer has that assigned PIN. The bank computer has access to a bank data store which has correlated therein the particular account number with that particular PIN. Thus, the bank computer can retrieve from the data store the account number for that PIN. Therefore, responsive to receiving the customer's PIN, the bank computer can determine which account is to receive the deposit.

The PIN may also be stored in phone memory and transmitted along with the check image and signature to the bank. Alternatively, the PIN can be input into the phone by the customer during the transaction. Such a deposit transaction would require that only the customer signature the financial check image be stored in and transmitted from the phone memory.

In another check deposit embodiment where the customer's account data does not need to be transmitted, the customer's deposit account number can be prelinked to the phone number of the customer's phone. For example, the bank computer could recognize the customer's phone number via caller ID or some other manner. The bank computer can then use a data store to retrieve the particular (customer) deposit account correlated with that particular phone number.

In still other embodiments, a PIN and/or phone number and/or other input may be required by the bank (or other financial/business entity) to determine the deposit account of the imaged check depositor. For example, a bank computer may ask a caller (customer) to confirm the first few letters of the customer's last name, and/or may ask the caller to answer a predetermined question. Customer input can be conventionally provided to the bank via phone keys, speech/voice, and/or other known manners of phone input. A biometric identifier may also be used to determine the deposit account.

In another check deposit transaction embodiment only the check image data needs to be provided to the bank. That is, neither the customer's account data nor the customer's signature data needs to be transmitted from the phone to the bank. As a result, neither the account data nor the signature data needs to be stored in phone memory. For example, a bank may permit a check to be deposited with wording similar to "For Deposit Only" written on the rear side of the check. In such situations, the previous embodiments apply sans the need to transmit any signature data.

Without the need for a customer signature, a customer can simply send to their bank an image of the check needing depositing. The customer/bank can have a preauthorized agreement that any electronic check received by the bank from that customer is to be treated by the bank as already having "For Deposit Only" written thereon (whether or not the back side of the paper check actually has this wording physically written thereon). The bank can identify the appropriate deposit account in a manner previously discussed (e.g., by caller ID, PIN inputted via phone keypad/buttons, etc.). That is, the bank can identify the deposit account to use in the deposit transaction from user-provided data that was not stored in the phone memory, which may comprise manually (keypad) entered input.

Alternatively, instead of transmitting their electronic signature to the bank, the customer can send "For Deposit Only" to the bank. That is, in a check deposit transaction the customer can send (along with the imaged check) an electronic "For Deposit Only" statement in place of their signature. In such situations, the bank can store the statement in linked correlation with the customer via a transaction number, phone number, date/time, etc. The correlated storage of the statement provides retrievable evidence that the statement was indeed provided by the customer. The bank can also overwrite or overlie the customer's statement on a part of an image of the check.

The bank may also require a separate confirmation message from the phone user authorizing that the "For Deposit Only" statement is to be used in regard to their transmitted imaged check. This confirmation can also be stored by the bank in correlated relation with the other data involving the deposit transaction to provide additional evidence of customer authorization.

As previously discussed, an electronic check image can be supplied via a cell phone by a customer to a business entity (bank, deposit transaction system, merchant, etc.) in a transaction involving a financial check, such as a check deposit transaction or payment/purchase by check transaction. The check image may be provided along with electronic signature data, or along with both electronic signature data and deposit account data. Similarly, a check image may be provided along with statement data corresponding to an electronic "For Deposit Only" statement, or along with both statement data and customer account data. As previously discussed, a wireless deposit transaction may entail that the customer provides only the check image. Alternatively, other arrangements may require that much other data be provided by a customer, including authorization input such as a PIN, biometric data, answers to queries, etc. Thus, it should be understood that there are many different arrangements involving the amount and type of data that may need to be provided by a customer in order to conduct a transaction with an imaged check.

The necessary transaction data (image, text, and/or XML) can be wirelessly provided via a customer phone by any communication format capable of being sent from the phone to a bank's computer or server. For example, communication formats may comprise e-mail, text messaging (e.g., SMS), and/or an Internet/network communication protocol (e.g., HTTP, FTP).

A bank may charge a service fee for providing an electronic deposit transaction. The fee may be taken from the value of the check. Thus, the value credited to a user's account may be the check value sans the service fee (and any other fee). Also, the account credit may only be a temporary non-accessible credit or a partially accessible credit. After a predetermined period of time has passed, then the full credit becomes available for use by the account holder (e.g., the phone user). The time delay enables the bank to record the deposit on the actual date of deposit, yet allow for fraud prevention, check clearing time, etc.

In another embodiment, a bank data store (instead of the user's phone) can store the bank customer's signature. By prior customer/bank agreement, the customer authorized the bank to apply their stored electronic signature to check deposits made by that customer. The customer's signature can be stored in correlated relation with any combination of a customer's PIN, phone number, account number, and/or other phone provided input to the bank computer. In response to receiving the unique/correct customer input via the customer's phone, the bank computer can retrieve the correlated customer's signature from its data store. The retrieved signature can then be associated with the check image in performing the check deposit transaction. For example, the bank can store the retrieved signature data in correlation with the received check image data (along with other data, e.g., date, transaction number, amount, etc.) in a transaction record in a bank database.

Of course additional user input may also be required to initially enable the bank to determine (if necessary) the authority of the user to conduct a transaction with the bank. As previously discussed in regard to card memory, a phone memory can also hold data related to an authorized user. A phone can store data related to one or more authorized users of a check deposit transaction system. As previously discussed, such authorizing data can include biometric data. Thus, a biometric identifier may be used as a system access input or password/code.

A phone can include a biometric reading device that is operative to receive biometric data from a phone user. Software operating in the phone (or in a host computer) can determine whether the user can conduct a transaction with the check deposit transaction system. In an exemplary arrangement, the bank provides an outside phone (such as at an ATM) which can be shared by different bank customers authorized access to the check deposit transaction system. A customer can pick up the commonly shared phone, be biometrically recognized through physical contact with the phone as an authorized user, and then proceed with their check deposit transaction. As discussed later, an ATM can also be used to provide cash to a customer for a deposited/cashed check.

Alternatively, software in a user's phone (or a shared phone) can cause biometric data read by the phone's biometric reading device to be sent to a computer of the check deposit transaction system. The system computer is operative to cause the biometric data to be compared with user authorizing data stored in a data store. The system can determine whether the phone user's biometric data substantially corresponds to or matches the user authorizing data. Responsive to a positive determination, the phone user is then authorized to use their phone to conduct transactions with the check deposit transaction system. This arrangement also allows a customer to use someone else's phone (other than their own) which has a biometric reader and camera in a deposit transaction that does not require transmission of account data or signature data.

Also, an ATM can be part of a check depositing/cashing transaction. A customer can provide a transaction system an ATM identifier, as previously discussed. In return for the check, the system can provide the customer a code (as previously discussed) to use at the identified ATM. The customer can then use the code to retrieve cash from the ATM. Thus, some exemplary arrangements allow a customer to essentially cash a check (via an ATM) using wireless transmission of an image of that check (and other data).

Furthermore, a check transaction involving an ATM with a shared phone (as previously discussed) would not need use of a code. Instead, upon approval of the check cashing transaction, cash could be automatically dispensed from the ATM while the customer is still on the shared phone (and located at the ATM).

An exemplary arrangement/system for carrying out a check transaction includes a portable hand-held user device that includes a memory, where the memory has stored therein check image data representative of a check, where the memory has stored therein electronic signature data representative of a signature of a user of the device, wherein the device is operative to wirelessly transmit the check image data and the electronic signature data, where a check deposit transaction system is operative to wirelessly receive the check image data and the electronic signature data transmitted from the device during a check deposit transaction, where the check deposit transaction system is operative to accept the electronic signature data as user-authorized check-signing signature in the check deposit transaction.

An exemplary method of carrying out a check transaction includes storing check image data representative of a check in memory of a portable phone; storing electronic signature data representative of a signature of a user of the device in the memory; transmitting the check image data and the electronic signature data from the portable phone to a check deposit transaction system via wireless communication during a check deposit transaction; accepting the electronic signature data as a user-authorized check-signing signature in the check deposit transaction; and crediting an account for a value associated with the value of the check.

Another exemplary method includes operating a mobile phone to store in phone memory a user signature; operating the phone to take a picture of a financial check; operating the phone to send the picture and the signature to a predetermined location (e.g., bank processor, phone number, etc.) that is operative to perform a check deposit transaction using the picture and the signature.

As can be seen, the exemplary embodiments enable a person to wirelessly deposit a check into their account via a phone (e.g., videophone, picture phone, etc.). The person's transmitted signature can be used by the check cashing/depositing entity as the legally binding check-signing (endorsement) signature in the check deposit transaction. Thus, only an image of the front face of the check needs to be sent to the check depositing entity. As a result, the back side of the check need not be physically signed (via hand written cursive signature) by the person (payee). Nor does the back side of the check need to be imaged.

The exemplary check depositing embodiments also eliminate the need for other check readers. That is, an automated system can carry out a customer transaction involving a check (e.g., check deposit) without the need to mechanically read a tangible check. Embodiments related to using at least one captured check image to complete a check transaction in which the check became jammed in a check accepting machine will be later discussed.

Figure 104:
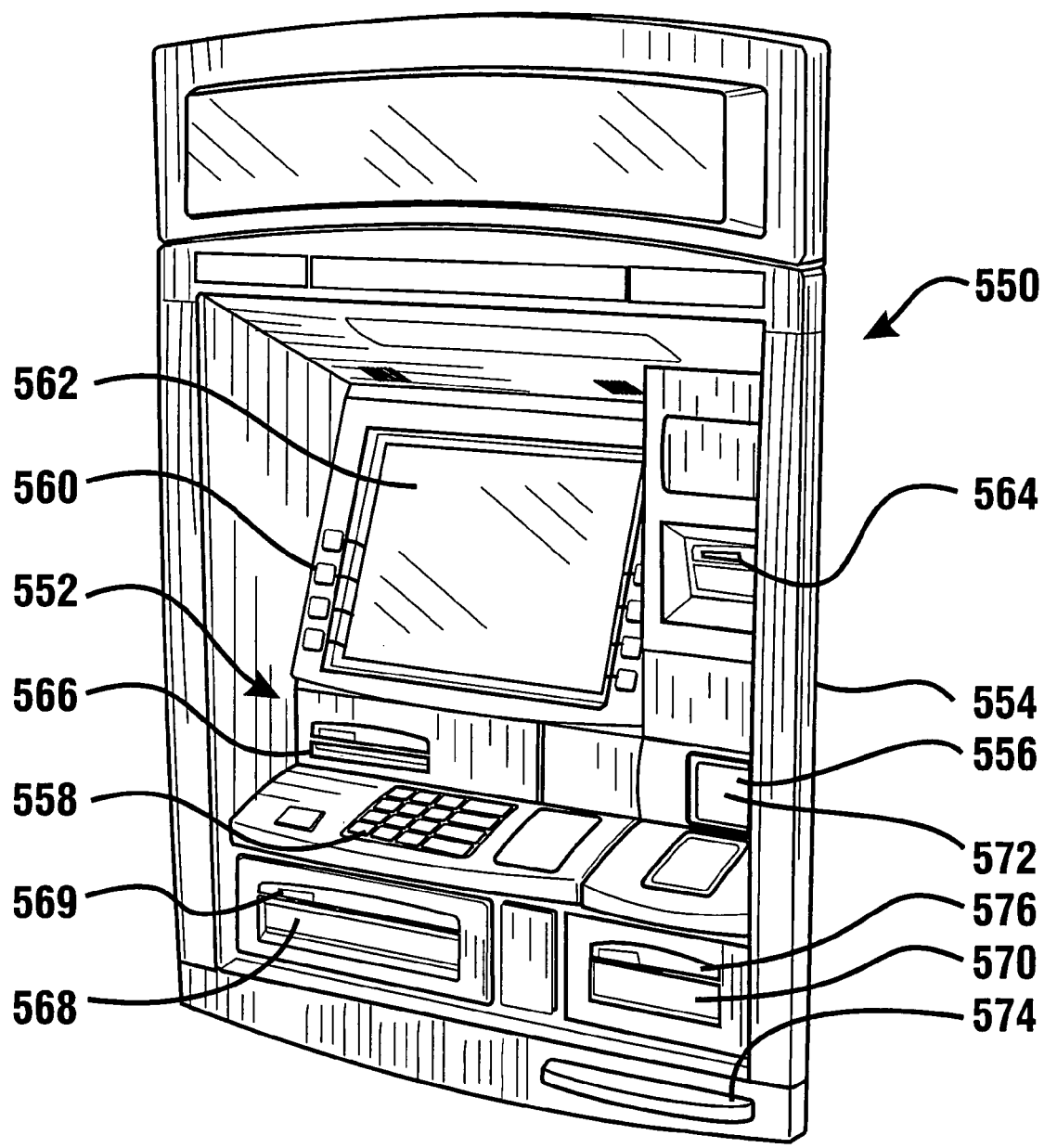
FIG. 104 shows an exemplary form of an automated transaction machine.

A banking system that is controlled by data bearing records can include an automated transaction machine or automated banking machine. The machine enables a user thereof to carry out a transaction. The machine 550 shown in FIG. 104 can be an automated teller machine (ATM). The machine can include one or more cash dispensers that are operative to a dispense cash to users of the machine. The machine can include a fascia 552 which serves as a user interface (or customer interface).

The automated banking machine 550 includes a housing 554 which houses certain components of the machine. The housing 554 includes a door that enables an authorized person to access the interior of the machine. The components of the machine include input and output devices. The input devices may include a reader device schematically indicated 556. The reader device is operative to read data bearing records presented by machine users. Such records can include data corresponding to at least one of the associated user, one or more user financial accounts, and/or other data. In an exemplary arrangement the reader 556 comprises a card reader that is operative to read a customer's card. An exemplary card can include information about the customer thereon or therein, such as the customer's name, account number, and/or other data.

A card reader may comprise a magnetic stripe card reader which is able to read data from magnetic stripes of cards. However, a card reader may also comprise a contactless card reader. A non-contacting card data reading device can be used. For example, a customer bank card can have one or more radio frequency identification (RFID) tags having customer information.

The fascia 552 includes a keypad 558, function keys 560, display 562, receipt outlet slot 564, mini account statement outlet 566, cash dispenser outlet 568 connected to a cash dispenser 569, deposit opening 570, a (RFID) card scanning area 572, and a writing shelf 574. It should be understood that these transaction function devices and features of the described user interface are exemplary, and in other embodiments the user interface may include different components and/or features and/or arrangements.

The keypad 558 can include a plurality of input keys which may be actuated by a customer to provide manual inputs to the machine. The display 562 is viewable by an operator of the machine. The display enables outputs through a display screen. The display may also enable inputs through the display screen. The function keys 560 can be used to permit a customer to respond to screen prompts output by the display 562. Thus, the display can be a display type that enables both outputs and inputs. That is, the display can be both an input and output device.

For example, the display 562 may be a touch screen display which enables outputs through displays on the screen and enables customers to provide inputs by placing a finger adjacent to areas of the screen. A combined input and output device, such as a touch screen display, can provide outputs to a user as well as receiving inputs from the user. The display 562 may include an LCD, plasma, CRT, or other display type that is capable of providing visible indicia, such as still images or motion (continuously moving) video, to a customer.

It should be understood that in various embodiments other types of input devices may be used, such as biometric readers that may be operative to receive customer identifying inputs such as fingerprints, iris scans, retina scans, and face topography data that provide data that is usable to identify a user. One or more camera devices may also be used to serve as input devices for biometric features and the like. Other input devices such as speech or voice recognition devices, facial recognition arrangements, inductance type readers, IR type readers, and other types of devices which are capable of receiving information that identifies (or can be used to identify) a customer and/or their account may also be used. An example of an ATM that uses biometric input devices and other types of input devices is shown in U.S. Pat. No. 6,023,688, the disclosure of which is herein incorporated by reference.

Further output devices associated with the exemplary user interface can include a speaker. A headphone jack can also be used to serve as an output device. A headphone jack may be connected to a headphone provided by a user who is visually impaired to provide the user with voice guidance in the operation of the machine. Alternatively, the machine 550 may provide a headphone for a customer. A microphone can also be used to serve as an input device.

The automated banking machine 550 may also include a receipt provider which is operative to provide users of the machine with receipts reflecting transactions conducted at the machine. A printer device can be used that is operative to print receipts. Transaction receipts may be provided to users through a receipt delivery slot extending through a fascia portion. Exemplary receipt printers that may be used in some embodiments are shown in U.S. Pat. No. 5,729,379 and U.S. Pat. No. 5,850,075, the disclosures of which are herein incorporated by reference in their entirety.

Exemplary machine embodiments may also include other types of printing mechanisms such as statement printer mechanisms, ticket printing mechanisms, check printing mechanisms, and other devices that operate to apply indicia to media in the course of performing transactions carried out with the machine.

In other embodiments, output devices may include devices such as audio speakers, IR transmitters, or other types of devices that are capable of providing outputs which may be perceived by a user either directly or through use of a computing device, article, or other machine. Exemplary automated banking machine features and systems are further shown in U.S. Pat. Nos. 6,705,517; 6,682,068; 6,672,505; and 6,598,023, the disclosures of which are incorporated herein by reference in their entirety.

The machine 550 can also include a deposit acceptance area. The deposit acceptance area is an area through which deposits or deposit documents, such as cash, checks, deposit envelopes, deposit slips, etc., to be deposited by users (or used in a deposit transaction) can be placed into the machine. The deposit acceptance area can include the deposit opening 570. The deposit opening 570 is in operative connection with a deposit accepting device positioned in a secure chest area of the machine. Exemplary types of deposit accepting devices are shown in U.S. Pat. No. 4,884,769 and U.S. Pat. No. 4,597,330, the disclosures of which are herein incorporated by reference in their entirety.

The machine 550 also includes a check reader device 576 that can generate images of checks received through the opening 570. The machine is operative to transmit check images to a remote (bank) computer as part of a transaction. The machine is also operative to store check images locally in a data store or in a database associated with the machine. It should be understood that these input and output devices of the user interface are exemplary and in other embodiments, other or different input and output devices may be used.

The automated banking machine 550 can include one or more internal computers, which may be alternatively referred to herein as processors or controllers. These internal computers can include one or more processors. These processors may be in operative connection with one or more data stores, locally or remotely located. In some embodiments, processors can be located on certain devices within the ATM so as to individually control the operation thereof. Examples such as multi-tiered processor systems are shown in U.S. Pat. No. 6,264,101 and U.S. Pat. No. 6,131,809, the disclosures of which are herein incorporated by reference.

In an exemplary arrangement to conduct transactions, the machine 550 can communicate with one or more computers remotely located from the machine. These remote computers are operative to exchange messages with the machine. For example, the remote computers may be used to authorize and record the occurrence of various transactions.

The machine 550 may communicate through a network with a transaction host, such as a bank or financial transaction entity. The host has at least one computer which is operative to exchange messages and/or communications with the machine. For example, a bank may receive one or more messages from the machine requesting authorization to allow a customer to withdraw $200 from the customer's account. A computer at the bank can operate to determine that such a withdrawal is authorized. The computer, or another computer affiliated therewith, can then return one or more messages to the machine through the network authorizing the machine to allow the withdrawal transaction.

In an exemplary embodiment, at least one processor in the machine 550 is operative to cause the communication of data corresponding to data read from a user's card. The read card data can be sent from the machine to a remote (bank) computer as part of one or more messages. The machine may also communicate other data corresponding to user inputs to the remote computer, such as a personal identification number (PIN), a primary account number (PAN), and/or transaction request data. The remote computer can operate to compare the data corresponding to card data and/or PIN data to stored data, which corresponds to authorized users, in at least one data store associated with the remote computer. Responsive to the user data being recognized as authorized user data by a computer, the remote computer can communicate at least one message to the machine which corresponds to authorization to carry out the requested transaction. The authorization may also require a permissible transaction request from the user.

After the machine 550 conducts the functions to accomplish a transaction, such as dispensing cash or depositing a check, the machine can send one or more messages back through the network to the bank indicating that the transaction was successfully carried out. Of course, these message types are merely exemplary and other transaction messages may be used.

It should be understood that in some embodiments the machine 550 may communicate with other entities and through various networks. For example, in an exemplary embodiment the machine can communicate with computers operated by machine service providers. Such machine servicers may comprise entities which are to be notified of status conditions or malfunctions of the machine, as well as entities who are to be notified of corrective actions. A service person may be able to service a malfunctioning machine. An example of such a system for accomplishing this is shown in U.S. Pat. No. 5,984,178, the disclosure of which is herein incorporated by reference.

Other third parties may also receive notifications from the machine 550. These other parties may include entities responsible for delivering currency to the machine to ensure that the currency supplies in the machine do not become depleted. Further entities may be responsible for removing deposited items from the machine.

Additional entities may be notified of actions at the machine. These additional entities may include entities which hold marketing data concerning consumers and who provide messages which correspond to marketing messages (e.g., advertisements) to be presented to consumers. These additional entities may also be able to communicate with the machine to provide marketing messages to machine users.

Various types of messages may be provided to remote systems and entities by an automated transaction machine depending on the needed machine capabilities in various embodiments and the types of transactions being conducted. Furthermore, machine communication with the various entities can be independent and separate from of any machine communication with the transaction host. That is, communication may occur (directly) between the machine and a third party without involving the transaction host. Different networks, communication paths, and/or addresses can be used to keep the communications isolated. Thus, the machine 550 can keep non financial transaction communication separated from financial transaction communication. The two (or more) open communication paths can also be operated independently simultaneously, with no path contingent on another.

Embodiments related to using at least one captured check image to complete, conclude, or carry out a check transaction in which the check became jammed in a check accepting machine will now be discussed.

As previously discussed, a check transaction system can wirelessly receive check deposit data from a phone in carrying out a check deposit transaction. The phone can be operated by the customer making the check deposit. However, it should be understood that in other exemplary embodiments, authorized persons acting on behalf of an automated banking machine operator can also use a phone to carry out (or complete) a check transaction for a customer.

A paper check may get jammed in a check accepting machine, such as an automated banking machine (e.g., ATM, self-service terminal, a depository, etc.) that accepts checks for deposit, cashing, and/or payment. A paper check inserted into the machine may become jammed therein during handling of the check inside the machine. For example, a check may become stuck in a check transport mechanism. The check may be jammed before the machine can properly credit the customer for the received check. Thus, a situation may exist where both a customer is unable to retrieve their check and there is no transaction record of their check having been received by the machine (e.g., no record of a deposit transaction involving that check).

In an exemplary embodiment, a machine service person can intervene on behalf of a customer to complete a check deposit transaction involving a jammed check. The machine service person may comprise a machine owner, machine operator, transaction assistant, or any other authorized entity permitted access to the machine interior to retrieve a jammed check.

The machine service person can apply the previously discussed electronic check deposit process using a captured image of a check. The authorized person can retrieve the jammed check and then operate one or more devices to read (e.g., scan, image, copy, record, etc.) the check to obtain one or more images thereof. The reading (e.g., scanning, imaging, copying, recording, etc.) can be of one or both sides of the check.

The reading can be carried out with a portable image reader device, such as a camera device or a scanner device. The camera can be in a videophone (e.g., cell phone). As discussed in more detail later, a scanner device can be a type which allows wireless connection to a phone via digital communication technology, such as Bluetooth technology.

In an exemplary embodiment, an authorized machine servicer uses a portable wireless communication device (e.g., cellular phone, satellite phone, portable wireless VOIP, etc.) having a camera in a process of getting an unjammed (or freed or cleared) check to be made of financial record as a deposit in a check deposit transaction. The servicer uses the cell phone to call a designated or predetermined number to identify themself as an authorized servicer of the machine (or of the banking system). The identifier can be a PIN, a code, a servicer ID, the phone's phone number, a digital certificate stored in the phone, and/or other identifying data. The designated number can belong to a check transaction system, such as a transaction host or a transaction completion center.

The servicer uses the camera of the communication device to read and/or obtain at least one image of the front side of the check and at least one image of the back side of the check. The obtained images can be stored in memory of the communication device.

The servicer can also try to duplicate an action of the machine with regard to machine communication of available data during a check transaction. For example, the servicer may access the machine's transaction audit log to get an identifier (e.g., transaction number) for the transaction in which the check became jammed. The transaction identifier may also identify the customer. The transaction identifier may be a customer personal account number (PAN; or a portion thereof) provided by the customer (e.g., read from a user card), or a transaction ID sent from the transaction host, or some other transaction identifying data (e.g., random number generated by the machine, etc.). The machine may also be configured so that it can detect a jammed check, and also have the audit log (or some other type of data store accessible by the servicer) distinguish initiated (fault) transactions involving check jams from other (normal) transactions.

The machine servicer can use their communication device (e.g., cell phone) to carry out or complete the check deposit transaction originally initiated by the customer. The machine servicer (in a manner previously discussed with customers) can use their phone to make an electronic check deposit transaction involving a customer's jammed check. The transaction identifier may also be included in the data sent via the phone to the check transaction system.

The front side of a check contains the checking account number, the routing number of the bank, the name of the entity (payee) to which the check was written, the numerical digits of the transaction amount, written text of the same amount, and the account holder's signature. The rear side of the check includes the endorsing signature. The rear side may also contain an account number. Other reference information may also be written on the front side and/or rear side of the check. Thus, an imaged check (comprising both check sides) can include all of the data necessary to allow a transaction system to carry out a transaction involving the check.

The transaction host can cause the check transaction data received from the phone to be authenticated, cause the check to be cleared, and cause the check amount to be deposited into the appropriate account. The transaction host can also cause the customer to be notified regarding the status of the successful check deposit transaction.

The exemplary arrangement allows an automated banking machine operator (e.g. a bank) to execute a check transaction on behalf of a customer, where the check transaction was previously unsuccessfully carried out by the customer at the machine. The arrangement allows a customer of the machine to have their check deposit transaction fulfilled even if their paper check becomes jammed in the machine. Thus, the exemplary transaction backup process allows the machine operator to provide a guaranteed level of check deposit credit assurance to a customer with regard to any of the customer's (valid) checks received by the machine.

As previously discussed, the type of scanner used may allow wireless transmission of check image data from the scanner to the portable wireless device (e.g., cell phone). In such an arrangement a phone could be used that does not need a camera or reproduction device. Once the phone has received the imaged check data from the scanner, then the check can be electronically deposited using the phone in a manner previously discussed. A machine servicer can operate the phone to transmit the at least one check image while the servicer is still physically located at the machine site and adjacent to the machine.

Prior to sending the check images, one or more of the check images may be reviewed by being displayed (either separately or together) in a display screen of the phone. If the quality of a check image is not visually acceptable to the phone user then a replacement (new) image can be readily obtained.

The scanner may be configured as a pocket-sized scanner. The scanner may comprise a two-sided optical scanner. The scanner configuration may allow for both sides of a check to be read or imaged at the same time. The scanner may also have a better pixel ratio to be able to provide a better read (image) of check data than may be possible with a phone camera. The scanner's read component can be specifically dimensioned to simultaneously quickly scan both sides of a conventionally sized financial check. That is, the scanner device can be purposely configured and manufactured to specifically handle paper checks (i.e., a check-specific scanner device). The check-specific scanner device can also have check-specific software. For example, the software may be used to ensure that data is captured from critical designated areas of a check. The software may also be used to ensure that captured image data meets a quality level that will be acceptable and usable to the transaction system. The software may inform the scanner user of an unacceptable image and that a new (acceptable) image is needed. Alternatively, the phone may have the software instead of (or in addition to) the scanner.

In an exemplary deposit completion process a machine service entity is able to free a jammed document (e.g., check sheet) and obtain image data (via a phone camera and/or a scanner) corresponding to both sides of the document. The image data is then sent via a phone to a check handling transaction system that is affiliated with the machine. It may be the same (or different) system to which the machine normally sends check image data or for which the machine stores check data. The image data received at the transaction system provides evidence of the attempted check transaction by the customer.

The transaction system uses the image data communicated from the phone to finish the check transaction that was started or attempted by the customer, including crediting/debiting associated accounts. The operation of the transaction system to retrieve the necessary particular check data from the image data, and then use the retrieved check data to carry out the check transaction, may be conducted manually, automatically, or a combination thereof. For example, a check transaction center may have personnel specialists that perform analysis of check data received via mobile phone from service personnel in the field. Upon acceptable data review, the specialists can manually enter the financial data to cause an account of the depositor to be credited for the check deposit. The check images can be used in the clearing of the check. The check images can also be provided to the depositor in the form of a returned check.

Figure 105:
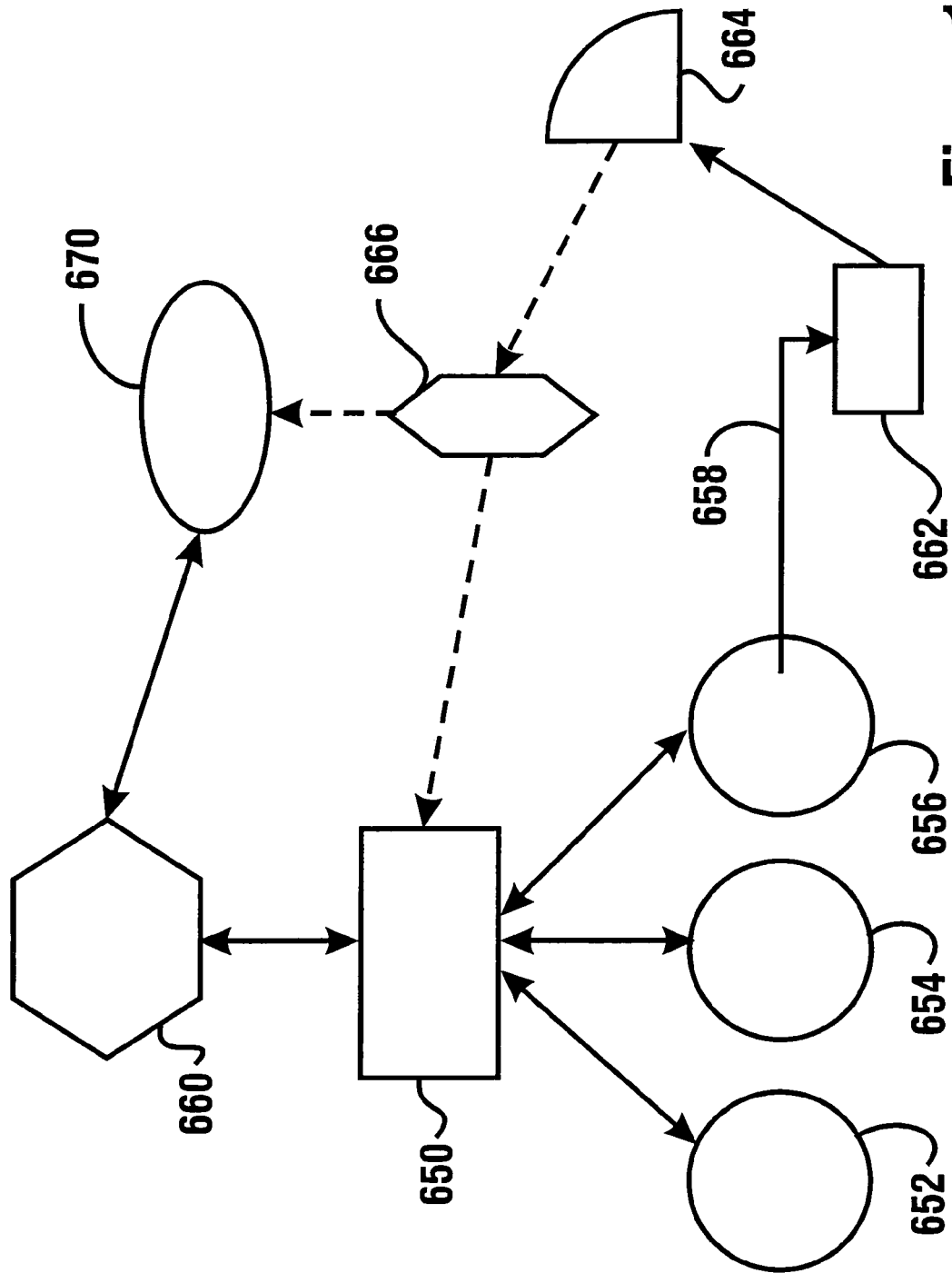
FIG. 105 shows an exemplary form of an arrangement enabling servicer aided completion of a checking transaction initiated at a check accepting machine.

FIG. 105 shows an exemplary arrangement enabling completion of a checking transaction initiated at a check accepting machine in which the check becomes jammed. FIG. 105 shows a banking system comprising at least one transaction host 650 and a plurality of check-accepting machines 652, 654, 656. Each machine is operative to communicate with a host 650 to carry out a financial transaction. The transaction host 650 includes one or more host computers. The transaction host 650 can communicate with a transaction system 660 which may comprise a computer, a bank, a check clearing entity, an accounts settling entity, a financial entity, Federal Reserve, etc. In addition, the transaction system 660 can communicate with a vast financial data exchange network which enables a transaction at the machine 656 to be processed. The transaction system 660 can be a part of the banking system.

A jammed check can be manually retrieved 658 from the machine 656 by an authorized person (machine servicer). A scanner/reader device 664 can be used to capture images of the check 662. The scanner-produced images can then be wirelessly transmitted to a mobile phone 666. Alternatively, the mobile phone 666 can be a camera phone which can be used to directly capture the check images itself. The images (whether captured directly or obtained from a scanner) are stored in the phone 666 in a programmable memory thereof.

The phone 666 can then be used by the authorized person to wirelessly transmit the check images (which can comprise data corresponding to or representative of images) and depositor identifying data (from an audit log, the retrieved check, deposit slip, etc.) to a remote transaction center 670. The transaction center 670 can communicate with the transaction system 660 (if necessary) to carry out check clearing and rebalancing of accounts involved in a check transaction. As a result, the transaction center 670 can carry out (or complete) a check transaction begun at the machine 656.

Alternatively, the phone 666 can be used by the authorized person to wirelessly transmit the check images and depositor identifying data to the transaction host 650 in leu of (or on behalf of) the machine 656. That is, the data transferred from the phone 666 can be routed through the host 650 (instead of through the transaction center 670) in order to reach the transaction system 660. Thus, the phone 666 can be used to send to the transaction host 650 check images which are normally captured and sent by the machine 656 to the transaction host 650. The phone 666 can be used to carry out a function normally performed by the machine 656. The authorized person can function as a transaction assistant or machine assistant in a deposit assistance process.

In a particular deposit assistance process a machine service entity may be unable to obtain a full image of a freed check. For example, a portion of the check may have become unreadable (e.g., torn) during the check freeing process. As a result, the servicer may use a phone to forward image data corresponding to only the available check portion(s) to the affiliated check handling transaction system. Once the check image data has been entered into the system by the servicer, then other personnel associated with the transaction system may be used to analyze the received check image(s) and try to rectify the customer's attempted check transaction.

The received check image data may be determined at the transaction center 670 to contain enough data to complete the check transaction. The analysis performed by transaction center personnel may also include review of a machine's audit log or transaction log. Other factors may also be considered, including review of video (or images) that show the area adjacent to or inside of the machine during a time range that included the check jam time. Captured secondary images that include the check (either inside or outside of the machine) or machine security images (which include the check and/or customer) may be enlarged to provide additional information pertaining to a customer or account identification. Facial or biometric recognition software may also be used in ascertaining data that allows the check transaction to proceed.

In other situations, check image data received by the check transaction system may lack critical transaction data which prevents the check transaction from being fulfilled at the remote secondary level 670. As a result, if the customer's identity can be ascertained (such as in a manner previously discussed), then the customer may be informed by the transaction center 670 of their unsuccessful check transaction. The customer may also be asked to provide additional information to enable the transaction to be processed by the transaction center 670.

As discussed, an electronic backup check deposit transaction can be performed using a portable wireless device, such as a cell phone and/or scanner device. However, in an alternative embodiment the machine servicer can use a machine keyboard to enter data obtained from a freed check in order to perform an accredited deposit of the customer's check. In a further alternative embodiment a phone and a machine keyboard may be used in combination to transmit all of the data necessary to have the check officially entered as a deposit in the banking system.

A freed check can be placed with other checks that were properly received by (and stored in) the machine. Alternatively, a freed check may be destroyed upon receipt by the servicer of successful completion of the checking transaction involving the check. The servicer, while at the machine, may collect or remove all checks stored in the machine.

As discussed, a person (e.g., secondary party) who is authorized to access an interior of a check-accepting machine may use a phone to make a check transaction for a customer (e.g., primary party) by communicating with a check transaction system. Also, the secondary party can separately communicate with the check transaction system independent of both the machine and the customer. That is, the secondary party can act without any additional need of machine communication or customer communication with regard to the check transaction. The secondary party can function as an intermediate or backup depositor in support of the customer. The secondary party can function as both a machine servicer to clear paper jams (e.g., jammed checks) and as a safety net with regard to ensuring system integrity of transactions involving inserted documents.

It should be understood that a "check transaction" or "check deposit" can comprise a check deposit transaction (e.g., a value of a check is credited to an account as a deposit), a check cashing transaction (e.g., exchange of cash for a received check), a check payment transaction (e.g., payment of bills or goods), or any other type of transaction involving a financial check. It should also be understood that a "check transaction system" can comprise any of a transaction host, a financial bank, an agent able to perform check reconciliation, a third party check processor, or any other entity involved in a transaction that includes a check. In an exemplary arrangement, a check transaction system receives check data communicated from a servicer.

As previously discussed, an automated banking machine servicer can be used to complete a check transaction. The transaction may involve a jammed check. It should be understood that a check is deemed a jammed check when it remains inside of the machine without the check transaction having been fully processed by the machine. The machine can't perform the requested transaction involving the check, and the check cannot be returned to the customer. Thus, the check remains in limbo inside of the machine.

It should be understood that a jammed check may include a freely movable check. That is, a jammed check need not be physically fixed or stuck in an unmovable position. For example, a check may simply be positioned out of place (out of alignment) inside of a machine, which prevents the machine from transferring the check to its next location. However, the machine may be able to repeatedly move the jammed check between two positions inside of the machine.

A check may also become jammed as a result of mechanical failure inside the machine. A check may also become jammed as a result of the physical condition of the check received by the machine. For example, the check's condition may prevent the machine from properly handling the check to either carry out the transaction or to return the check to the machine user. It should be understood that a jammed check may include a check in a jammed deposit envelope.

In alternative embodiments an authorized person (servicer) can also assist in performing a transaction in which a check is not jammed inside of an automated transaction machine. For example, the servicer can retrieve deposit envelopes from the machine interior. Each envelope can have one or more checks therein. The deposit envelopes may be stored in a predetermined interior storage location. The servicer (or another person authorized to manually access stored envelopes) can remove checks from retrieved envelopes. The removed checks can then be imaged and sent via a portable hand-held digital wireless communication device to the check deposit transaction system to cause the checks to be entered into the transaction system, in a manner previously discussed. That is, the authorized person can also assist in getting a (not jammed) check moved along in a transaction (e.g., a check deposit, a check payment, etc.) by using the portable hand-held device to capture check images at the machine site. The hand-held communication device (e.g., cell phone) can be used to wirelessly transmit the check images individually or as a batch of images of several different checks to the check transaction center.

It should be understood that the servicer can also retrieve a jammed deposit envelope having one or more checks therein. The jammed envelope can be freed, the check(s) withdrawn from the envelope, the check image(s) captured, and the image(s) forwarded to the appropriate transaction entity to enable the transaction involving the check to be concluded.

Other exemplary embodiments may provide for an automated banking machine to receive deposited paper checks without the need to include check imaging and check reading devices within the machine. This may be accomplished by providing for communication between an external device operated by a customer which can image checks, and the machine. This may include for example a cell phone which includes a camera. The camera may be used to produce one or more images of one or both sides of a paper check. These images may be then transferred to the machine in a wireless manner for purposes of conducting a transaction. In some embodiments the machine may include one or more processors with software that analyzes image data for purposes of resolving the micr line data, amount data and other information. In other embodiments the machine may communicate with one or more remote computers which receive the image and resolve such information. In still other embodiments the machine may rely on customer inputs to the machine for at least a portion of such information. In addition in some embodiments an automated banking machine may include a depository for receiving the check from the user after the check has been imaged by the user with a camera phone or other device externally from the machine. In still other embodiments the user may be instructed to retain the check or to destroy it after the transaction has been completed.

For example in an exemplary embodiment an automated banking machine may operate by requiring a user to input a data bearing record such as a card which includes data which corresponds to one or more financial accounts of the user. In some embodiments this may be a magnetic stripe card, a smart card, a radio frequency identification (RFID) card or other data bearing record from which the information may be read by a card reader within the banking machine.

Once the card data has been read by the machine, in some embodiments the user may be requested to provide a verification input to further identify the user. This may include for example a personal identification number (PIN), a biometric input such as a finger scan, or the machine may capture a facial image using a camera. Other verifying inputs may include inputs such as a voice input, a digital signature or other electronic data from a user's cell phone or other device that can further identify the user.

Once the user identifying data has been input to the automated banking machine, the machine may, responsive to operation of one or more processors therein, cause to be determined that the user is authorized to conduct a transaction. This may be done by comparison of input data to stored data within the automated banking machine or may be accomplished through communication by the automated banking machine to one or more remote computers which operate to compare data corresponding to input data to stored data for purposes of verifying that the user has a right to carry out the transaction.

In a situation in which the user wishes to carry out a check deposit transaction, the user may so indicate by providing appropriate inputs through one or more input devices on the machine. This may include for example providing inputs through a keypad, touch buttons or a touchscreen in response to screen outputs. In response to the user indicating that they wish to conduct a check deposit transaction, the user may be instructed to operate their cell phone or similar device to establish a connection with the banking machine. This may include for example the user dialing a particular number that is output by the machine. Alternatively the cell phone and the machine may establish communications via other wireless communications such as by infrared (IR) or by radio frequency (RF) such as through Bluetooth™ communications.

Thereafter the user may be prompted through outputs from the machine to capture one or more images of the check that they wish to deposit. The user may use the camera on their cell phone or other similar device for purposes of capturing such images. The machine may further instruct the user on the manner in which to transmit these images to the machine. In some embodiments the machine may operate to present the images that have been captured by the user and transmitted to the machine, on a display of the machine so that the images can be reviewed. Further in some embodiments the machine may include software which is operate to analyze the data included in the image, including such data as the micr line, amount or other information that is usable for processing a transaction based on the check. In still other embodiments the machine may include software which analyzes image quality to determine if the image is suitable for electronic processing by the machine and/or other connected systems. In the event that the software analyzing image quality or other data determines that the transmitted image is not of sufficient quality, the user may be instructed to make further attempts at capturing images of all or portions of the check. Alternatively if adequate resolution of the check images cannot be achieved, the machine may operate responsive to at least one processor, to indicate to the user that the transaction cannot be accomplished. Of course these approaches are exemplary.

In a transaction of an exemplary embodiment if the image is suitable the machine may thereafter operate to prompt the user to provide inputs concerning the nature of the transaction being conducted with the check. For example the machine may prompt a user concerning whether the check is to be deposited in and credited to an account, whether cash is to be received in exchange for the check, whether the check is to be used to make payment of a particular bill, whether the amount of the check is to be transferred to a third party, or other activity to be accomplished through operation of the machine. The user may provide appropriate inputs through the machine and/or through their phone or other device to cause the selected transaction to be accomplished.

Once the user has provided appropriate inputs the machine may operate in accordance with its programming to carry out the selected transaction. This may include for example transferring or allocating the amount corresponding to the check to the one or more appropriate accounts in accordance with the user's instructions. In some embodiments where the automated banking machine includes a cash dispenser and the user has requested a dispense of cash, cash may be provided to the user.

The user may also be instructed through operation of the machine as to the action to be taken with regard to the check. This may include for example having the user deposit the check into a slot or other depository opening included on the machine. In other embodiments the user may be requested to retain the check or destroy it. In such embodiments the automated banking machine may operate to communicate through connected systems to store data indicating that the check has been cashed so as to prevent the user from attempting to cash the check a second time. Various other activities may be conducted responsive to operation of the machine to assure that a given check is not cashed on multiple occasions.

Once the transaction has been accomplished the user's card or other item (if it has been held by the machine), may be returned and the machine may operate so as to be ready to conduct a further transaction for another user. Alternatively in other embodiments the machine may be operated based on data received from the user's cell phone in the manner previously discussed. This may avoid the need for the user to provide a card or other inputs directly to the interface devices on the machine. Rather in such embodiments the user may provide data into the interface buttons or touch screen on the user's cell phone. Of course these approaches are exemplary and in other embodiments other approaches may be used.

Thus, the new apparatus and method of exemplary embodiments achieves at least some of the above stated objectives, eliminates difficulties encountered in the use of prior devices and systems, solves problems, and attains the desirable results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations given herein are by way of examples and the invention is not limited to the exact details shown and described.

In the following claims any feature described is a means for performing a function shall be construed as encompassing any means capable of performing the recited function known to those skilled in the art, and shall not be limited to the particular means shown in the foregoing description as performing the recited function or means merely equivalent thereto.

Having described the features, discoveries and principals of the invention, the manner in which it is constructed, operated and utilized, and the advantages and useful results attained; the new and useful structures, devices, elements, arrangements, parts, combinations, systems, equipment, operations, methods, and relationships are set forth in the appended claims.

I claim:

1. A method comprising:
   (a) freeing from a check-accepting automated transaction machine during a machine servicing session that involves an authorized servicer of the machine, a check that became jammed in the machine during an incomplete check deposit transaction involving a customer account,
   wherein the machine includes a check imaging device,
      wherein the machine is operable to cause images captured by the check imaging device, to be transferred to a transaction system remotely located from the machine,
   wherein the servicer is associated with a hand-held mobile device,
      wherein the hand-held mobile device includes programming configured to allow the servicer to cause each respective check freed from being jammed in the machine during a respective incomplete check deposit transaction involving a respective customer account, to be deposited into the respective customer account involved in the respective incomplete check deposit transaction in which the respective check became jammed;
   (b) during the machine servicing session, providing at least one input to the hand-held mobile device to cause the hand-held mobile device to receive both
      image data corresponding to at least one image of the check freed in (a), and
      non image data usable to identify the incomplete check deposit transaction; and
   (c) providing at least one input to the hand-held mobile device to cause to be sent to the transaction system, both the image data and the non image data received in (b),
      wherein the sending causes an amount associated with the check freed in (a) to be deposited into the customer account involved in the incomplete check deposit transaction in which the check became jammed.

2. The method according to claim 1 wherein (a)-(c) are performed by the authorized servicer.

3. The method according to claim 1 wherein (c) occurs during the machine servicing session.

4. The method according to claim 1 wherein during (a) and (b) the authorized servicer is located on site of the machine.

5. The method according to claim 1 wherein in (b) and (c) the hand-held mobile device comprises a mobile phone, wherein the mobile phone includes a camera, wherein (b) includes operating the camera to capture the at least one image.

6. The method according to claim 1 wherein the transaction system comprises a transaction host for a plurality of check-accepting automated transaction machines including the machine, wherein (c) includes causing both the image data and the non image data to be sent to the transaction host.

7. A method comprising:
   (a) manually retrieving from an interior area of a check-accepting automated transaction machine, a paper check situated therein during an uncompleted check deposit transaction involving the machine, the check, and a financial account,
      wherein the machine includes a transaction identifier data store including a transaction identifier that was computer-associated with the transaction prior to the transaction becoming uncompleted;
   (b) subsequent to (a), providing at least one input to a hand-held image-capturing device to cause the hand-held image capturing device to capture at least one image of at least a portion of the check retrieved in (a);
   (c) obtaining the transaction identifier from the transaction identifier data store; and
   (d) providing at least one input to at least one hand-held device,
      wherein the at least one input causes
         the at least one image captured in (b), and
         the transaction identifier obtained in (c),
      to be sent to a remotely located transaction center capable of allowing the check deposit transaction to be completed with the financial account;
   wherein (a)-(d) are performed by a machine service person authorized to manually access the interior area.

8. The method according to claim 7 wherein (a) includes manually freeing the check from being jammed in the machine.

9. The method according to claim 7 wherein the hand-held image-capturing device comprises a mobile phone that includes a camera, wherein (b) includes providing at least one input to the mobile phone to cause the camera to capture the at least one image.

10. The method according to claim 7
wherein the at least one hand-held device includes the hand-held image-capturing device,
wherein the hand-held image-capturing device comprises a camera,
wherein the at least one hand-held device comprises a mobile phone,
wherein the mobile phone includes the camera,
wherein (b) includes providing at least one input to the mobile phone to cause the camera to capture the at least one image,
wherein (d) includes providing at least one input to the mobile phone that causes the at least one image and the transaction identifier to be sent to the transaction center.

11. The method according to claim 7 wherein (b) includes providing the at least one input while the machine service person is located on site of the machine.

12. The method according to claim 11 wherein (d) includes providing the at least one input while the machine service person is located on site of the machine.

13. The method according to claim 7 wherein the transaction center includes a transaction host for a plurality of check-accepting automated transaction machines, wherein (d) includes causing the at least one image to be sent to the transaction host.

14. A method comprising:
(a) manually accessing an interior area of a check accepting machine,
wherein the interior area includes a check jammed therein,
wherein the jam occurred prior to completion of a transaction involving the machine, the check, and a financial account,
wherein the transaction is associated with at least one transaction identifier stored in at least one data store which does not include the check,
wherein the check has a financial value;
(b) subsequent to (a), manually freeing the check from being jammed in the interior area
(c) manually operating a mobile phone including a camera to capture at least one image of the check freed in (b);
(d) accessing the at least one transaction identifier stored in at least one data store;
(e) manually operating the mobile phone to cause the mobile phone to receive the at least one transaction identifier accessed in (d); and
(f) manually operating the mobile phone to cause the mobile phone to wirelessly send to a transaction system remotely located from the machine, both the at least one image captured in (c) and the at least one transaction identifier received in (e),
wherein the sending allows the financial value to be deposited into the financial account;
wherein (a)-(f) are performed by an authorized servicer of the machine.

15. The method according to claim 14 wherein (a)-(f) are performed while the authorized servicer is located on site of the machine.

16. The method according to claim 14 wherein the at least one data store includes an audit log of the machine, and wherein (d) includes accessing a transaction identifier from the audit log.

17. The method according to claim 16 wherein (e) includes manually inputting into the phone, the transaction identifier accessed in (d).

18. A method comprising:
(a) during a servicing operation, freeing from a check-accepting automated banking machine, a check that became jammed in the machine during a customer session with the machine,
wherein the customer session is associated with session identifying data usable to identify the customer session in which the check became jammed,
wherein the machine includes a check imaging device operative to capture images of checks received into the machine,
wherein the machine is operative to transfer captured check images to a transaction system remotely located from the machine;
(b) during the servicing operation, operating a mobile phone that includes a camera to capture at least one image of the check freed in (a);
(c) obtaining the session identifying data from an audit log of the machine; and
(d) during the servicing operation, operating the mobile phone to transfer to the transaction system, both
check image data corresponding to the at least one image captured in (b), and
the session identifying data obtained in (c).

19. The method according to claim 18 wherein in (c) the session identifying data includes a transaction identifier.

* * * * *